(12) United States Patent
Nagaraja Rao et al.

(10) Patent No.: US 10,045,082 B2
(45) Date of Patent: Aug. 7, 2018

(54) METHODS AND APPARATUS TO CORRECT ERRORS IN AUDIENCE MEASUREMENTS FOR MEDIA ACCESSED USING OVER-THE-TOP DEVICES

(71) Applicant: The Nielsen Company (US), LLC, New York, NY (US)

(72) Inventors: Kumar Nagaraja Rao, Fremont, CA (US); Kamer Toker Yildiz, Campbell, CA (US); Jennifer Haskell, Sunnyvale, CA (US); Cristina Ion, Belmont, CA (US); Mimi Zhang, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/967,355

(22) Filed: Dec. 13, 2015

(65) Prior Publication Data

US 2017/0006342 A1 Jan. 5, 2017

Related U.S. Application Data

(60) Provisional application No. 62/188,380, filed on Jul. 2, 2015.

(51) Int. Cl.
*H04N 21/466* (2011.01)
*H04N 21/442* (2011.01)
(Continued)

(52) U.S. Cl.
CPC ......... *H04N 21/4663* (2013.01); *G06Q 30/00* (2013.01); *H04N 21/252* (2013.01);
(Continued)

(58) Field of Classification Search
CPC ............. H04N 21/4663; H04N 21/252; H04N 21/25883; H04N 21/25891;
(Continued)

(56) References Cited

U.S. PATENT DOCUMENTS 4,621,325 A 11/1986 Naftzger et al.
4,658,290 A 4/1987 McKenna et al.
(Continued)

FOREIGN PATENT DOCUMENTS

AU 2013205736 5/2013
CN 1898662 1/2007
(Continued)

OTHER PUBLICATIONS

United States Patent and Trademark Office, "Final Office Action," issued in connection with U.S. Appl. No. 13/963,737, dated Sep. 21, 2015 (14 pages).
(Continued)

*Primary Examiner* — Alexander Q Huerta
(74) *Attorney, Agent, or Firm* — Hanley, Flight & Zimmerman, LLC

(57) ABSTRACT

Methods and apparatus to correct errors in measuring audiences of over-the-top media are disclosed. In some examples, the methods and apparatus identify a first set of data from a first data source, the first set of data different from a second set of data from a second data source. In some examples, the methods and apparatus generate a third set of data based on the second set of data from the second data source. In some examples, the methods and apparatus generate a model based on a difference between the first set of data and the third set of data. In some examples, the methods and apparatus apply the model to the first set of data. In some examples, the methods and apparatus assign viewership to an impression associated with the first set of data by imput-
(Continued)

ing viewership associated with the second set of data to the first set of data.

20 Claims, 15 Drawing Sheets

(51) Int. Cl.
| | |
|---|---|
| H04N 21/81 | (2011.01) |
| H04N 21/258 | (2011.01) |
| H04N 21/45 | (2011.01) |
| H04N 21/25 | (2011.01) |
| G06Q 30/00 | (2012.01) |

(52) U.S. Cl.
CPC . *H04N 21/25883* (2013.01); *H04N 21/25891* (2013.01); *H04N 21/44222* (2013.01); *H04N 21/4532* (2013.01); *H04N 21/4661* (2013.01); *H04N 21/4667* (2013.01); *H04N 21/812* (2013.01)

(58) Field of Classification Search
CPC ......... H04N 21/2665; H04N 21/44222; H04N 21/4532; H04N 21/466; H04N 21/4667
See application file for complete search history.

(56) References Cited

U.S. PATENT DOCUMENTS

| | | | |
|---|---|---|---|
| 5,113,518 A | 5/1992 | Durst, Jr. et al. |
| 5,214,780 A | 5/1993 | Ingoglia et al. |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Feliciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,637,029 B1 | 10/2003 | Maissel et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,546,370 B1 | 6/2009 | Acharya et al. |
| 7,590,568 B2 | 9/2009 | Blumenau |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,743,394 B2 | 6/2010 | Smith et al. |
| 7,756,974 B2 | 7/2010 | Blumenau |
| 7,788,216 B2 | 8/2010 | Li et al. |
| 7,805,332 B2 | 9/2010 | Wilson |
| 7,853,969 B2 | 12/2010 | Smith et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,091,101 B2 | 1/2012 | Smith et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,151,291 B2 | 4/2012 | Ramaswamy |
| 8,180,112 B2 | 5/2012 | Kurtz et al. |
| 8,229,780 B2 | 7/2012 | Davidow et al. |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,307,458 B2 | 11/2012 | Kasahara et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,494,897 B1 | 7/2013 | Dawson |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,514,907 B2 | 8/2013 | Wright et al. |
| 8,543,454 B2 | 9/2013 | Fleischman et al. |
| 8,549,552 B2 | 10/2013 | Ramaswamy et al. |
| 8,560,683 B2 | 10/2013 | Funk et al. |
| 8,600,796 B1 | 12/2013 | Sterne et al. |
| 8,626,901 B2 | 1/2014 | Pugh et al. |
| 8,631,122 B2 | 1/2014 | Kadam et al. |
| 8,660,895 B1 | 2/2014 | Saurabh et al. |
| 8,676,740 B2 | 3/2014 | Ueki |
| 8,683,504 B2 | 3/2014 | Ramaswamy |
| 8,688,524 B1 | 4/2014 | Ramalingam et al. |
| 8,699,855 B2 | 4/2014 | Harper et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,843,951 B1 | 9/2014 | Sherrets et al. |
| 8,856,235 B2 | 10/2014 | Zhou et al. |
| 8,898,689 B2 | 11/2014 | Georgakis |
| 8,909,638 B2 | 12/2014 | Lin et al. |
| 8,909,771 B2 | 12/2014 | Heath |
| 8,910,195 B1 | 12/2014 | Barney et al. |

(56) References Cited

U.S. PATENT DOCUMENTS

| | | |
|---|---|---|
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,071,886 B2 | 6/2015 | Shkedi |
| 9,075,865 B2 | 7/2015 | Lin et al. |
| 9,083,853 B2 | 7/2015 | Shkedi |
| 9,084,013 B1 | 7/2015 | Arini et al. |
| 9,092,797 B2 | 7/2015 | Perez et al. |
| 9,105,053 B2 | 8/2015 | Cao et al. |
| 9,117,217 B2 | 8/2015 | Wilson et al. |
| 9,210,208 B2 | 12/2015 | Ramaswamy et al. |
| 9,215,288 B2 | 12/2015 | Seth et al. |
| 9,215,489 B2 | 12/2015 | Williams et al. |
| 9,215,502 B1 | 12/2015 | Sherrets et al. |
| 9,237,138 B2 | 1/2016 | Bosworth et al. |
| 9,269,049 B2 | 2/2016 | McCann et al. |
| 9,313,294 B2 | 4/2016 | Perez et al. |
| 9,491,090 B1 | 11/2016 | Kumar et al. |
| 9,582,809 B2 | 2/2017 | Perez et al. |
| 2002/0099609 A1 | 7/2002 | Nascenzi et al. |
| 2002/0129368 A1 | 9/2002 | Schlack et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0074252 A1 | 4/2003 | Chandler-Pepelnjak et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2003/0229900 A1 | 12/2003 | Reisman |
| 2004/0088212 A1 | 5/2004 | Hill |
| 2004/0107125 A1 | 6/2004 | Guheen et al. |
| 2004/0167928 A1 | 8/2004 | Anderson et al. |
| 2004/0186840 A1 | 9/2004 | Dettinger et al. |
| 2005/0106550 A1 | 5/2005 | Hayashi et al. |
| 2005/0144069 A1 | 6/2005 | Wiseman et al. |
| 2005/0166233 A1 | 7/2005 | Beyda et al. |
| 2005/0223093 A1 | 10/2005 | Hanson et al. |
| 2005/0257141 A1 | 11/2005 | Brandrud et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0156532 A1 | 7/2007 | Nyhan et al. |
| 2007/0198327 A1 | 8/2007 | Yazdani et al. |
| 2007/0208640 A1 | 9/2007 | Banasiak et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0097806 A1 | 4/2008 | Hoover et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1* | 12/2008 | Doe ............ G06Q 30/0204 705/7.33 |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0157512 A1 | 6/2009 | King |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0300675 A1 | 12/2009 | Shkedi |
| 2009/0307084 A1 | 12/2009 | Monighetti et al. |
| 2009/0327026 A1 | 12/2009 | Bistriceanu et al. |
| 2010/0004977 A1 | 1/2010 | Marci et al. |
| 2010/0010866 A1 | 1/2010 | Bal et al. |
| 2010/0017049 A1* | 1/2010 | Swearingen ......... G08G 5/0021 701/3 |
| 2010/0046553 A1 | 2/2010 | Daigle et al. |
| 2010/0076814 A1 | 3/2010 | Manning |
| 2010/0088152 A1 | 4/2010 | Bennett |
| 2010/0088373 A1 | 4/2010 | Pinkham |
| 2010/0070621 A1 | 5/2010 | Urdan et al. |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191689 A1* | 7/2010 | Cortes ............... G06F 17/30784 706/46 |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0087519 A1 | 4/2011 | Fordyce, III et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | Von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1* | 3/2012 | Perez ............... G06Q 30/0201 707/810 |
| 2012/0078725 A1 | 3/2012 | Maitra et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0143713 A1 | 7/2012 | Dittus et al. |
| 2012/0173701 A1 | 7/2012 | Tenbrock |
| 2012/0185274 A1 | 7/2012 | Hu |
| 2012/0192253 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1* | 9/2012 | Mazumdar ............ H04L 43/04 709/224 |
| 2012/0265606 A1 | 10/2012 | Patnode |

(56) References Cited

U.S. PATENT DOCUMENTS

| | | |
|---|---|---|
| 2012/0302222 A1 | 12/2012 | Williamson et al. |
| 2012/0310729 A1 | 12/2012 | Dalto et al. |
| 2012/0311017 A1 | 12/2012 | Sze et al. |
| 2012/0331137 A1 | 12/2012 | Olsen et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1* | 6/2013 | Srivastava .......... G06Q 30/0241 709/224 |
| 2013/0159499 A1 | 6/2013 | Besehanic |
| 2013/0198125 A1 | 8/2013 | Oliver et al. |
| 2013/0204694 A1 | 8/2013 | Banister et al. |
| 2013/0210455 A1 | 8/2013 | Carlsson et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0254143 A1 | 9/2013 | Ueki et al. |
| 2013/0254787 A1* | 9/2013 | Cox ................ G06Q 30/02 725/13 |
| 2013/0262181 A1 | 10/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2013/0339991 A1 | 12/2013 | Ricci |
| 2014/0033317 A1 | 1/2014 | Barber |
| 2014/0040171 A1 | 2/2014 | Segalov et al. |
| 2014/0067950 A1 | 3/2014 | Winograd |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0173646 A1 | 6/2014 | Ramaswamy |
| 2014/0233430 A1 | 8/2014 | Russell |
| 2014/0279074 A1 | 9/2014 | Chen et al. |
| 2014/0282665 A1 | 9/2014 | Arini |
| 2014/0298025 A1 | 10/2014 | Burbank et al. |
| 2014/0310058 A1 | 10/2014 | Aral et al. |
| 2014/0324544 A1 | 10/2014 | Donato et al. |
| 2014/0324545 A1 | 10/2014 | Splaine et al. |
| 2014/0337104 A1* | 11/2014 | Splaine .............. G06Q 30/0204 705/7.33 |
| 2014/0347991 A1 | 11/2014 | Blicker |
| 2015/0006752 A1* | 1/2015 | O'Hare ............... H04L 65/4069 709/231 |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0052245 A1 | 2/2015 | McMillan |
| 2015/0181267 A1* | 6/2015 | Morales ............ H04N 21/25883 725/14 |
| 2015/0186403 A1 | 7/2015 | Srivastava et al. |
| 2015/0189500 A1 | 7/2015 | Bosworth et al. |
| 2015/0193813 A1 | 7/2015 | Toupet et al. |
| 2015/0193816 A1* | 7/2015 | Toupet .............. G06Q 30/0244 705/14.43 |
| 2015/0222951 A1 | 8/2015 | Ramaswamy |
| 2015/0262207 A1* | 9/2015 | Rao .................... G06Q 30/0203 705/7.32 |
| 2015/0278858 A1 | 10/2015 | Lyons et al. |
| 2015/0332297 A1 | 11/2015 | Perez et al. |
| 2015/0341684 A1 | 11/2015 | Kitts et al. |
| 2016/0189182 A1 | 6/2016 | Sullivan et al. |
| 2016/0191970 A1* | 6/2016 | Sheppard ........... G06Q 30/0204 725/14 |
| 2016/0269783 A1* | 9/2016 | Mowrer ............. H04N 21/42203 |
| 2016/0350773 A1 | 12/2016 | Sullivan et al. |
| 2017/0004526 A1* | 1/2017 | Morovati ........... G06Q 30/0254 |
| 2017/0011420 A1 | 1/2017 | Sullivan et al. |
| 2017/0064411 A1 | 3/2017 | Goli et al. |

FOREIGN PATENT DOCUMENTS

| | | |
|---|---|---|
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| CN | 104584564 | 4/2015 |
| EP | 1059599 | 12/2000 |
| EP | 1379044 | 1/2004 |
| GB | 2176639 | 12/1986 |
| JP | 07262167 | 10/1995 |
| JP | 2001084272 | 3/2001 |
| JP | 2001282982 | 10/2001 |
| JP | 2001357192 | 12/2001 |
| JP | 2002163562 | 6/2002 |
| JP | 2002373152 | 12/2002 |
| JP | 2003044396 | 2/2003 |
| JP | 2003067289 | 3/2003 |
| JP | 2003519877 | 6/2003 |
| JP | 2004504674 | 2/2004 |
| JP | 2006127320 | 5/2006 |
| JP | 2006127321 | 5/2006 |
| JP | 2007052633 | 3/2007 |
| JP | 2008234641 | 10/2008 |
| JP | 2009181459 | 8/2009 |
| JP | 2010039845 | 2/2010 |
| JP | 2010257448 | 11/2010 |
| JP | 2012068828 | 4/2012 |
| JP | 2012093970 | 5/2012 |
| KR | 20020037980 | 5/2002 |
| KR | 100765735 | 10/2007 |
| KR | 20090020558 | 2/2009 |
| KR | 20100094021 | 8/2010 |
| KR | 20110017895 | 2/2011 |
| KR | 1020110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 9809447 | 3/1998 |
| WO | 0041115 | 7/2000 |
| WO | 0152168 | 7/2001 |
| WO | 154034 | 7/2001 |
| WO | 0207054 | 1/2002 |
| WO | 03027860 | 4/2003 |
| WO | 2005013072 | 2/2005 |
| WO | 2005024689 | 3/2005 |
| WO | 2005111897 | 11/2005 |
| WO | 2008150575 | 12/2008 |
| WO | 2010083450 | 7/2010 |
| WO | 2010088372 | 8/2010 |
| WO | 2010095867 | 8/2010 |
| WO | 2010104280 | 9/2010 |
| WO | 2010104285 | 9/2010 |
| WO | 200152168 | 7/2011 |
| WO | 2011097624 | 8/2011 |
| WO | 2011127027 | 10/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |

US 10,045,082 B2
Page 5

(56) References Cited

FOREIGN PATENT DOCUMENTS

| WO | 2014059319 | 4/2014 |
|---|---|---|
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

State Intellectual Property Office of China, "Second Office Action," issued in connection with Chinese Patent Application No. 201180045957.2, dated Jul. 29, 2015 (5 pages).

Japan Patent Office, "Notice of Reasons for Rejection," issued in connection with Japanese Patent Application No. P2015-0524512, dated Jun. 30, 2015 (6 pages).

Taboga, "Linear combinations of normal random variables," from Statlect—The Digital Textbook, 2010, retrieved from <http://www.statlect.com/normal_distribution_linear_combinations.htm>, retrieved on Nov. 23, 2015 (4 pages).

IP Australia, " Patent Examination Report No. 1," issued in connection with Australian Patent Application No. 2013204953, dated Dec. 23, 2014 (5 pages).

United States Patent and Trademark Office, "Notice of Allowance," issued in connection with U.S. Appl. No. 14/641,982, dated Sep. 2, 2015 (13 pages).

Read et al., "Classifier Chains for Multi-Label Classification," Machine Learning, Jun. 30, 2011 (16 pages).

United States Patent and Trademark Office, "Non-Final Office Action," issued in connection with U.S. Appl. No. 14/463,309, dated Aug. 5, 2015 (10 pages).

International Searching Authority, "International Search Report," issued in connection with International Patent Application No. PCT/US2014/068621, dated Feb. 27, 2015 (3 pages).

International Searching Authority, "Written Opinion," issued in connection with International Patent Application No. PCT/US2014/068621, dated Feb. 27, 2015 (7 pages).

International Bureau, "International Preliminary Report on Patentability," issued in connection with International Patent Application No. PCT/US2013/057045, dated Mar. 3, 2015 (6 pages).

International Searching Authority, "International Search Report," issued in connection with International Patent Application No. PCT/US2013/057045, dated Dec. 27, 2013 (3 pages).

International Searching Authority, "Written Opinion," issued in connection with International Patent Application No. PCT/US2013/057045, dated Dec. 27, 2013 (5 pages).

International Searching Authority, "International Search Report," issued in connection with International Patent Application No. PCT/US2014/068623, dated Mar. 23, 2015 (3 pages).

International Searching Authority, "Written Opinion," issued in connection with International Patent Application No. PCT/US2014/068623, dated Mar. 23, 2015 (8 pages).

International Searching Authority, "International Search Report," issued in connection with International Patent Application No. PCT/US2014/068202, dated Apr. 10, 2015 (3 pages).

International Searching Authority, "Written Opinion," issued in connection with International Patent Application No. PCT/US2014/068202, dated Apr. 10, 2015 (7 pages).

International Searching Authority, "International Search Report and Written Opinion," issued in connection with International Patent Application No. PCT/US2014/031342, dated Jul. 28, 2014 (13 pages).

International Searching Authority, "Written Opinion," issued in connection with International Patent Application No. PCT/US2014/035156, dated Aug. 25, 2014 (5 pages).

International Searching Authority, "International Search Report," issued in connection with International Patent Application No. PCT/US2014/068165, dated Feb. 25, 2015 (3 pages).

International Searching Authority, "Written Opinion," issued in connection with International Patent Application No. PCT/US2014/068165, dated Feb. 25, 2015 (5 pages).

International Searching Authority, "International Search Report and Written Opinion," issued in connection with International Patent Application No. PCT/US2014/034389, dated Sep. 5, 2014 (15 pages).

International Searching Authority, "International Search Report and Written Opinion," issued in connection with International Patent Application No. PCT/US2014/035683, dated Sep. 12, 2014 (13 pages).

International Searching Authority, "International Search Report and Written Opinion," issued in connection with International Patent Application No. PCT/US2014/037064, dated Sep. 12, 2014 (9 pages).

International Searching Authority, "International Search Report," issued in connection with International Patent Application No. PCT/US2014/068168, dated Mar. 2, 2015 (3 pages).

International Searching Authority, "Written Opinion," issued in connection with International Patent Application No. PCT/US2014/068168, dated Mar. 2, 2015 (5 pages).

International Searching Authority, "International Preliminary Report on Patentability," issued in connection with International Patent Application No. PCT/US2011/0052623, dated Mar. 26, 2013 (5 pages).

International Searching Authority, "International Preliminary Report on Patentability," issued in connection with International Patent Application No. PCT/US2012/026760, dated Sep. 24, 2013 (4 pages).

International Searching Authority, "International Search Report," issued in connection with International Patent Application No. PCT/US2011/052623, dated Mar. 8, 2012 (3 pages).

International Searching Authority, "Written Opinion," issued in connection with International Patent Application No. PCT/US2011/052623, dated Mar. 8, 2012 (4 pages).

International Searching Authority, "International Search Report," issued in connection with International Patent Application No. PCT/US2012/026760, dated Jan. 2, 2013 (3 pages).

International Searching Authority, "Written Opinion," issued in connection with International Patent Application No. PCT/US2012/026760, dated Jan. 2, 2013 (3 pages).

International Searching Authority, "International Search Report," issued in connection with International Patent Application No. PCT/US2013/025687, dated Jun. 2, 2013 (5 pages).

International Searching Authority, "Written Opinion," issued in connection with International Patent Application No. PCT/US2013/025687, dated Jun. 2, 2013 (5 pages).

International Searching Authority, "International Search Report," issued in connection with International Patent Application No. PCT/US2011/065881, dated Jul. 9, 2012 (3 pages).

International Searching Authority, "Written Opinion," issued in connection with International Patent Application No. PCT/US2011/065881, dated Jul. 9, 2012 (6 pages).

International Searching Authority, "International Search Report and Written Opinion," issued in connection with International Patent Application No. PCT/US2013/045211, dated Feb. 25, 2014 (13 pages).

International Searching Authority, "International Search Report," issued in connection with International Patent Application No. PCT/US2011/052762, dated Aug. 22, 2012 (3 pages).

International Searching Authority, "Written Opinion," issued in connection with International Patent Application No. PCT/US2011/052762, dated Aug. 22, 2012 (4 pages).

International Searching Authority, "International Search Report and Written Opinion," issued in connection with International Patent Application No. PCT/US2014/050551, dated Nov. 24, 2014 (11 pages).

International Searching Authority, "International Preliminary Report on Patentability," issued in connection with International Patent Application No. PCT/US2013/045211, dated Dec. 16, 2014 (8 pages).

(56) References Cited

OTHER PUBLICATIONS

IP Australia, "Patent Examination Report No. 1," issued in connection with Australian Patent Application No. 2014262739, dated May 29, 2015 (4 pages).
IP Australia, "Patent Examination Report No. 1," issued in connection with Australian Patent Application No. 2014260163, dated Apr. 21, 2015 (3 pages).
IP Australia, "Patent Examination Report No. 1," issued in connection with Australian Patent Application No. 2013204354, dated Nov. 14, 2014 (3 pages).
IP Australia, " Patent Examination Report No. 1," issued in connection with Australian Patent Application No. 2011349435, dated Nov. 4, 2014 (3 pages).
IP Australia, "Patent Examination Report No. 1," issued in connection with Australian Patent Application No. 2013203898, dated Nov. 27, 2014 (4 pages).
IP Australia, "Patent Examination Report No. 1," issued in connection with Australian Patent Application No. 2011374955, dated Sep. 25, 2014 (3 pages).
IP Australia, "Patent Examination Report No. 1," issued in connection with Australian Patent Application No. 2013205736, dated Jun. 18, 2013 (2 pages).
IP Australia, "Patent Examination Report No. 1," issued in connection with Australian Patent Application No. 2013204865, dated Dec. 22, 2014 (3 pages).
International Searching Authority, "International Search Report," issued in connection with International Patent Application No. PCT/US2014/035156, dated Aug. 25, 2014 (5 pages).
Albanesius, "Facebook Issues Fix for Several Tracking Cookies," Sep. 28, 2011 (2 pages).
Braverman, "Are the Online Marketing Efforts of TV Shows and Programs Worthwhile?," Harris, A Nielsen Company, Mar. 30, 2011, 5 pages.
Peter J. Danaher, "A Canonical Expansion Model for Multivariate Media Exposure Distributions: A Generalization of the Duplication of Viewing Law," Journal of Marketing Research, Aug. 1991, 7 pages.
Enoch et al., "Cracking the Cross-Media Code," Journal od Advertising Research, Jun. 2010, 13 pages.
Headen et al., "The Duplication of Viewing Law and Television Media Schedule Evaluation," Journal of Marketing and Reasearch, vol. XVI, Aug. 1979, 333-40, 9 pages.
Huang et al., "Modeling the Audience's Banner ad Exposure for Internet Advertising Planning," Journal of Advertising, vol. 35, No. 2, Summer 2006, pp. 123-136, 15 pages.
The Nielsen Company, "How Teens Use Media," Jun. 2009, 17 pages.
Arbitron, "The Infinite Dial 2011: Navigating Digital Platforms," Edison Research, 2011, 83 pages.
Rust et al., "A Comparative Study of Television Duplication Models," Journal of Adverstising, vol. 10, No. 3, 1981, pp. 42-46, 6 pages.
Jim Edwards, "Apple Wants More Advertisers to Use Its iPhone Tracking System," Business Insider, Jun. 13, 2013, 2 pages.
Facebook, "Measuring Conversions on Facebook, Across Devices and in Mobile Apps," Aug. 2014, 3 pages.
Georg et al., "How Many Millenials Visit YouTube? Estimating Unobserved Events From Incomplete Panel Data Conditioned on Demographic Covariates," Google Inc., Apr. 27, 2015, 27 pages.
Georg et al., "How Many People Visit YouTube? Imputing Missing Events in Panels With Excess Zeros," Google Inc., 2015, 8 pages.
Adam, "Privacy Preserving Integration of Health Care Data," AMIA Annual Symposium Proceedings, 2007, 6 pages.
Emil Protalinski, "Facebook denies cookie tracking allegations," ZDNet, Sep. 25, 2011, 2 pages.
Emil Protalinski, "Facebook fixes cookie behavior after logging out," ZDNet, Sep. 27, 2011, 2 pages.
Emil Protalinski, "US congressman ask FTC to investigate Facebook cookies," ZDNet, Sep. 28, 2011, 2 pages.

Fliptop, "Fliptop Person API Documentation," https://developer.fliptop.com/documentation, May 7, 2013, 6 pages.
Fliptop, "Features," www.fliptop.com/features#social_matching, May 7, 2013, 3 pages.
Fliptop, "What is Fliptop?," May 7, 2013, www.fliptop.com/about_us, 1 page.
Webmaster World, "How to get the address of the current page (in browser) with Javascript," Sep. 28, 2005, 4 pages.
William Launder, "Media Journal: Nielsen to Test Online—TV Viewing Tool," Corporate Intelligence, Apr. 30, 2013, 2 pages.
Wikipedia, "Mental Poker," https://en.wikipedia.org/wiki/Mental_poker, page last modified on Jan. 12, 2010, 5 pages.
Nielsen, "Nielsen Unveils New Online Advertising Measurement," http://nielsen.com/us/en/insights/press-room/2010/
nielsen_unveils_newonlineadvertisingmeasure . . . , 2010, The Nielsen Company, 3 pages.
Nik Cubrilovic, "Logging out of Facebook is not enough," New Web Order, Sep. 25, 2011, 3 pages.
Rapleaf, "Rapleaf | Fast. Simple. Secure.," copyright 2013, www.rapleaf.com/why-rapleaf/, 3 pages.
Rapleaf, "Frequently Asked Questions," copyright 2013, www.rapleaf.com/about-us/faq/#where, 3 pages.
Rapleaf, "The Consumer Data Marketplace," copyright 2013, http://www.rapleaf.com/under-the-hood/, 2 pages.
Amol Sharma, "Nielsen Gets Digital to Track Online TV Viewers," The Wall Street Journal, WSJ.com, Apr. 30, 2013, 3 pages.
Steve Coffey, "Internet Audience Measurement: A Practitioner's View," Journal of Interactive Advertising, vol. 1 No. 2, Spring 2001,pp. 10-17, 8 pages.
Tanzina Vega, "Nielsen Introduces New Ad Measurement Product," Media Decoder, The New York Times, Sep. 27, 2010, 7 pages.
Suzanne Vranica, "Nielsen Testing a New Web-Ad Metric," The Wall Street Journal, Sep. 23, 2010, 2 pages.
Hothorn, "Unbiased Recursive Partitioning: A Conditional Inference Framework," Journal of Computational and Graphical Statistics,vol. 15, No. 3, pp. 651-674, copyright 2006 American Statistical Association, Institute of Mathematical Statistics, and Interface Foundation of North America, 21 pages.
United States Patent and Trademark Office, "Non-Final Office Action," issued in connection with U.S. Appl. No. 15/151,182, dated Feb. 8, 2017, 15 pages.
United States Patent and Trademark Office, "Notice of Allowance," issued in connection with U.S. Appl. No. 15/151,182, dated Aug. 2, 2017, 40 pages.
IP Australia, "Patent Examination Report No. 1," issued in connection with application No. 2011305429 dated Apr. 17, 2014, 4 pages.
Canadian Intellectual Property Office, "Examination Search Report," issued in connection with Application No. 2,810,541 dated Jan. 20, 2015, 3 pages.
Canadian Intellectual Property Office, "Examination Search Report," issued in connection with Application No. 2,873,128, dated Jan. 7, 2015, 3 pages.
Canadian Intellectual Property Office, Office Action, issued in connection with Canadian Patent Application No. 2,810,264, dated Nov. 27, 2014, 5 pages.
Canadian Intellectual Property Office, "Office Action," issued in connection with application No. 2,936,701 dated May 10, 2017, 4 pages.
Canadian Intellectual Property Office, "Office Action," issued in connection with Canadian Patent Application No. 2,819,268, dated Nov. 24, 2014, 4 pages.
European Patent Office, "Communication pursuant to Ruled 70(2) and 70a(2) EPC," issued in connection with application No. 14885507.5 dated Jul. 18, 2017, 1 page.
European Patent Office, "Extended European Search Report," issued in connection with application No. EP 12760524.4, dated Aug. 18, 2014, 8 pages.
European Patent Office, "Extended European Search Report," issued in connection with application No. EP 14004028.8, dated Apr. 9, 2015, 7 pages.
European Patent Office, "Search Report," issued in connection with application No. 14885507.5 dated Jun. 29, 2017, 6 pages.

(56) References Cited

OTHER PUBLICATIONS

European Patent Office, "Extended European Search Report," issued in connection with European Patent Application No. 14004028.8, dated Apr. 9, 2015, 7 pages.
International Searching Authority, "International Preliminary Report on Patentability," issued in connection with application No. PCT/US2012/026760, dated Sep. 24, 2013, 4 pages.
International Searching Authority, "International Preliminary Report on Patentability," issued in connection with International Patent Application No. PCT/US2015/067917, dated Jul. 13, 2017, 8 pages.
International Searching Authority, "International Preliminary Report on Patentability," issued in connection with PCT Application No. PCT/US2014/068623, dated Sep. 13, 2016, 9 pages.
International Searching Authority, "International Search Report and Written Opinion," issued in connection with International Patent Application No. PCT/US2015/067917, dated May 23, 2016, 11 pages.
International Searching Authority, "Written Opinion," issued in connection with application No. PCT/US2011/052623, dated Mar. 8, 2012, 4 pages.
IP Australia, "Examination Report No. 1," issued in connection with application No. AU 2015264866, dated Dec. 19, 2016, 2 pages.
IP Australia, "Examination Report No. 2," issued in connection with application No. AU 2012231667, dated Feb. 10, 2015, 3 pages.
IP Australia, "Examination Report No. 2," issued in connection with application No. AU 2015264866, dated May 26, 2017, 3 pages.
IP Australia, "Examination Report," issued in connection with application No. 2014386191 dated Feb. 10, 2017, 3 pages.
IP Australia, "Notice of Acceptance," issued in connection with Australian Patent Application No. 2011374955, dated Aug. 24, 2015, 2 pages.
IP Australia, "Notice of Grant," issued in connection with Australian Patent Application No. 2011374955, dated Dec. 17, 2015, 1 page.
IP Australia, "Patent Examination Report No. 1," issued in connection with Application No. 2011349435, dated Nov. 4, 2014, 3 pages.
IP Australia, "Notice of Acceptance," issued in connection with Australian Patent Application No. 2012231667, dated May 15, 2015, 3 pages.
IP Australia, "Notice of Acceptance," issued in connection with Australian Patent Application No. 2014262739, dated Oct. 30, 2015, 2 pages.
Japanese Patent Office, "Notice of Allowance," issued in connection with Japanese Patent Application No. P2013-544887, dated May 26, 2015, 5 pages.
Japanese Patent Office, "Notice of Reasons for Rejection," issued in connection with Japanese Patenet Application No. P2014-005867 dated Apr. 15, 2014, 10 pages.
Japanese Patent Office, "Final Rejection," issued in connection with Japanese Patent Application No. P2014-005867 dated Aug. 26, 2014, 8 pages.
Japanese Patent Office, "Notice of Allowance," issued in connection with Japanese Patent Application No. 2014-005867 dated Jun. 9, 2015, 3 pages.
Japanese Patent Office, "Notice of Allowance," issued on connection with application No. 2016-556957, dated Oct. 3, 2017, 3 pages.
Japanese Patent Office, "Notice of Reasons for Rejection," issued in connection with Japanese Patent Application No. P2014-005867 dated Feb. 17, 2015, 6 pages.
Japanese Patent Office, "Notice of Reasons for Rejection," issued in connection with Japanese Patent Application No. P2015-078539 dated Jul. 14, 2015, 6 pages.
Japanese Patent Office, "Office Action" with English translation, issued in connection with application No. JP 2013-544887, dated Aug. 12, 2014, 21 pages.
Japanese Patent Office, "Office Action," issued in connection with Japanese Patent Application No. 2013546286, dated Aug. 26, 2014, 5 pages.
Jennings et al., "Adding Adaptive Models Makes Neural Net Fraud Models More Robust," FICO Blog, Sep. 7, 2011, 4 pages.

Patent Cooperation Treaty, "International Search Report and Written Opinion," issued in connection with Application No. PCT/US2014/035683, dated Sep. 12, 2014, 13 pages.
United States Patent and Trademark Office, "Non-Final Office Action," issued in connection with U.S. Appl. No. 13/756,493, dated Nov. 19, 2014, 13 pages.
United States Patent and Trademark Office, "Non-Final Office Action," issued in connection with U.S. Appl. No. 13/915,381, dated Jan. 30, 2015, 51 pages.
United States Patent and Trademark Office, "Non-Final Office Action," issued in connection with U.S. Appl. No. 14/014,044, dated Jul. 2, 2015, 69 pages.
United States Patent and Trademark Office, "Non-Final Office Action," issued in connection with U.S. Appl. No. 14/014,050, dated May 28, 2015, 20 pages.
United States Patent and Trademark Office, "Non-Final Office Action," issued in connection with U.S. Appl. No. 14/025,567, dated Aug. 6, 2015, 59 pages.
United States Patent and Trademark Office, "Non-Final Office Action," issued in connection with U.S. Appl. No. 14/025,575, dated Apr. 16, 2015, 72 pages.
United States Patent and Trademark Office, "Non-Final Office Action," issued in connection with U.S. Appl. No. 14/560,947, dated Mar. 11, 2016, 68 pages.
United States Patent and Trademark Office, "Non-Final Office Action," issued in connection with U.S. Appl. No. 14/014,044, dated Apr. 8, 2016, 21 pages.
United States Patent and Trademark Office, "Notice of Allowance and Fee(s) Due," issued in connection with U.S. Appl. No. 13/690,915, dated Apr. 9, 2014, 28 pages.
United States Patent and Trademark Office, "Notice of Allowance," issued in connection with U.S. Appl. No. 13/239,005, dated Nov. 27, 2013, 46 pages.
United States Patent and Trademark Office, "Notice of Allowance," issued in connection with U.S. Appl. No. 13/396,071, dated Oct. 24, 2014, 31 pages.
United States Patent and Trademark Office, "Notice of Allowance," issued in connection with U.S. Appl. No. 13/513,148, dated Nov. 5, 2012, 27 pages.
United States Patent and Trademark Office, "Notice of Allowance," issued in connection with U.S. Appl. No. 13/690,915, dated Jun. 5, 2015, 64 pages.
United States Patent and Trademark Office, "Notice of Allowance," issued in connection with U.S. Appl. No. 13/691,175, dated Jan. 27, 2014, 15 pages.
United States Patent and Trademark Office, "Notice of Allowance," issued in connection with U.S. Appl. No. 13/691,175, dated May 9, 2014, 6 pages.
United States Patent and Trademark Office, "Notice of Allowance," issued in connection with U.S. Appl. No. 13/756,493, dated Mar. 17, 2015, 15 pages.
United States Patent and Trademark Office, "Notice of Allowance," issued in connection with U.S. Appl. No. 13/756,493, dated May 20, 2014, 32 pages.
United States Patent and Trademark Office, "Notice of Allowance," issued in connection with U.S. Appl. No. 13/915,381, dated Jun. 8, 2015, 44 pages.
United States Patent and Trademark Office, "Notice of Allowance," issued in connection with U.S. Appl. No. 13/995,864, dated Oct. 28, 2014, 39 pages.
United States Patent and Trademark Office, "Notice of Allowance," issued in connection with U.S. Appl. No. 14/500,297, dated May 21, 2015, 31 pages.
United States Patent and Trademark Office, "Office Action," issued in connection with U.S. Appl. No. 14/014,050, dated Sep. 12, 2014, 32 pages.
United States Patent and Trademark Office, "Advisory Action," issued in connection with U.S. Appl. No. 13/209,292, dated Dec. 24, 2014, 3 pages.
United States Patent and Trademark Office, "Corrected Notice of Allowability," issued in connection with U.S. Appl. No. 13/690,915, dated Nov. 6, 2014, 2 pages.

(56) References Cited

OTHER PUBLICATIONS

United States Patent and Trademark Office, "Final Office Action," issued in connection with U.S. Appl. No. 13/209,292, dated Sep. 10, 2014, 11 pages.

United States Patent and Trademark Office, "Final Office Action," issued in connection with U.S. Appl. No. 14/014,044, dated Nov. 30, 2015, 22 pages.

United States Patent and Trademark Office, "Non-Final Office Action," issued in connection with U.S. Appl. No. 14/809,888, dated Apr. 29, 2016, 14 pages.

United States Patent and Trademark Office, "Notice of Allowance," issued in connection with U.S. Appl. No. 13/209,292, dated Feb. 17, 2015, 15 pages.

United States Patent and Trademark Office, "Notice of Allowance," issued in connection with U.S. Appl. No. 13/690,915, dated Jun. 24, 2014, 6 pages.

United States Patent and Trademark Office, "Notice of Allowance," issued in connection with U.S. Appl. No. 14/809,888, dated Oct. 19, 2016, 24 pages.

United States Patent and Trademark Office, "Supplemental Notice of Allowability," issued in connection with U.S. Appl. No. 13/209,292, dated Jun. 30, 2015, 2 pages.

United States Patent and Trademark Office, "Supplemental Notice of Allowability," issued in connection with U.S. Appl. No. 14/641,982, dated Sep. 23, 2015, 2 pages.

United States Patent and Trademark Office, "Supplemental Notice of Allowability," issued in connection with U.S. Appl. No. 13/690,915, dated Jul. 8, 2014, 3 pages.

IP Australia, "Patent Examination Report No. 2", issued in connection with Australian Application No. 2014386191, dated Oct. 25, 2017, 3 pages.

United States Patent and Trademark Office, "Examiner's Answer to Appeal Brief," issued in connection with U.S. Appl. No. 14/560,947, dated Aug. 4, 2017, 15 pages.

United States Patent and Trademark Office, "Non-Final Office action," issued in connection with U.S. Appl. No. 14/957,258, dated Oct. 18, 2017, 61 pages.

Korean Patent Office, "Notice of Preliminary Rejection," issued in connection with Korean Patent application No. 10-2016-7024073, dated Dec. 29, 2017, 5 pages.

\* cited by examiner

US 10,045,082 B2

METHODS AND APPARATUS TO CORRECT ERRORS IN AUDIENCE MEASUREMENTS FOR MEDIA ACCESSED USING OVER-THE-TOP DEVICES

RELATED APPLICATION

This patent claims the benefit under 35 U.S.C. § 119(e), of U.S. Provisional Patent Application Ser. No. 62/188,380 entitled, "METHODS AND APPARATUS TO CORRECT ERRORS IN AUDIENCE MEASUREMENTS FOR MEDIA ACCESSED USING OVER THE TOP DEVICES," which was filed on Jul. 2, 2015 and is hereby incorporated by reference in its entirety.

FIELD OF THE DISCLOSURE

This disclosure relates generally to monitoring audiences of media and, more particularly, to methods and apparatus to correct errors in audience measurements for media accessed using over-the-top devices.

BACKGROUND

In recent years, over-the-top devices have become a primary source for media presentation. Media delivered through over-the-top devices is accessed from Internet sources via Internet protocol (IP) communications. Over-the-top devices may be used by any users or households having Internet access. For example, users can use over-the-top devices to access live programming, video on demand services, user-generated media, and/or other types of media.

DETAILED DESCRIPTION

Figure 1:
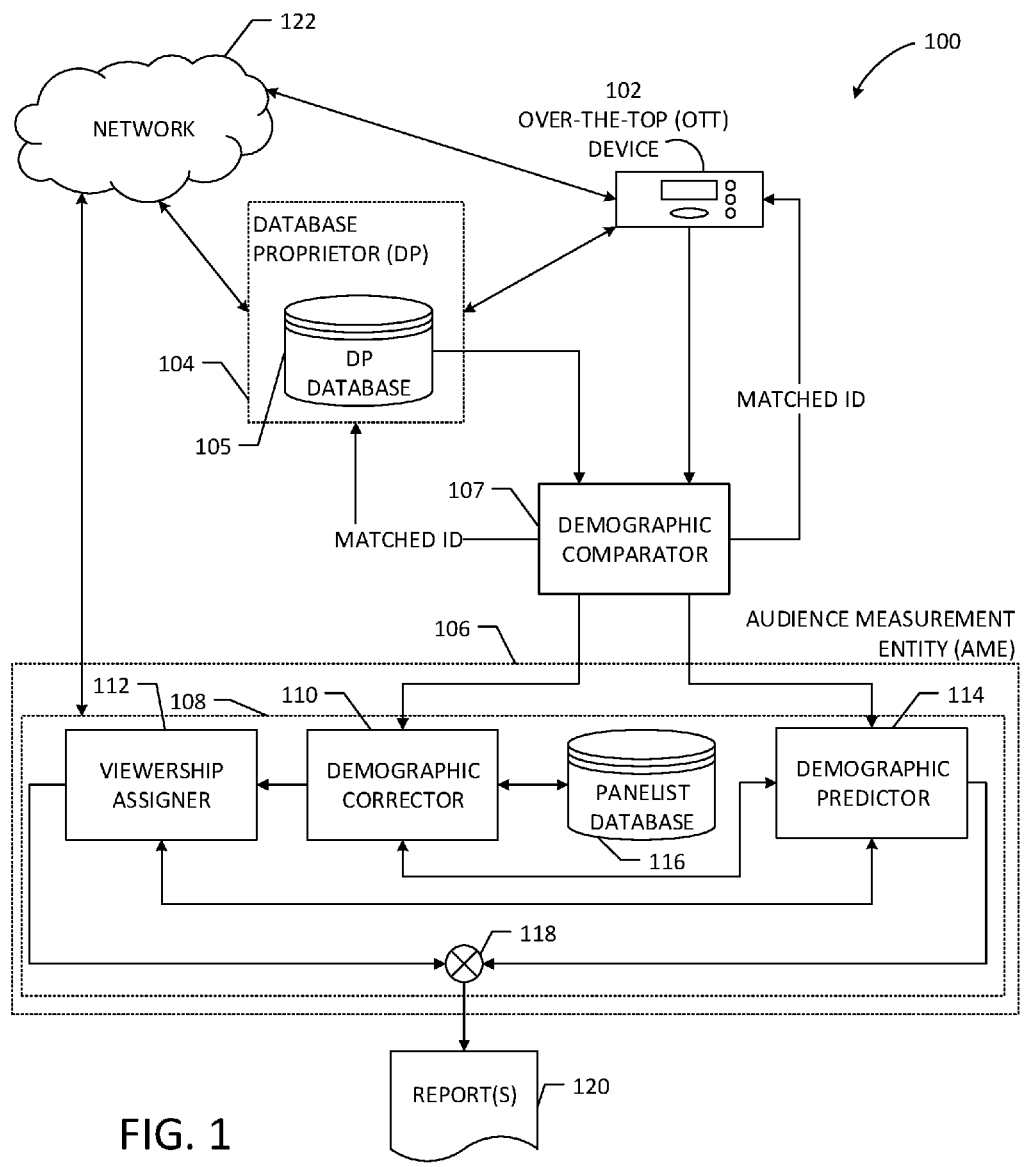
FIG. 1 illustrates an example apparatus to correct demographic impressions, assign viewership, and predict demographics from information obtained from over-the-top (OTT) devices and database proprietors.

Examples disclosed herein correct demographic impression information for any type of media (e.g., content and/or advertisements) broadcast through over-the-top ("OTT") devices.

As used herein, over-the-top refers to the delivery of audio, video, and/or other media over the Internet without a multiple-system operator being involved in the control and/or distribution of the media. For example, over-the-top media is distributed from one or more third parties to an end user through an Internet-enabled device. Example OTT devices include, without limitation, Roku® devices, Apple TV® devices, Samsung Smart TV® devices, Chromecast devices, Amazon® Fire TV devices, etc. While examples disclosed herein generally refer to OTT devices, such examples may apply to any media delivered via satellite, cable television, radio frequency (RF) terrestrial broadcast, the Internet (e.g., internet protocol television (IPTV)), television broadcasts, radio broadcasts and/or any other type of transmission for delivering media where little, none, or incorrect demographic impression information exists.

As used herein, an impression is defined to be an event in which a home or individual is exposed to corresponding media. Thus, an impression represents a home or an individual having been exposed to media (e.g., an advertisement, content, a group of advertisements, and/or a collection of content). In Internet media access, a quantity of impressions or impression count is the total number of times media (e.g., content, an advertisement or advertisement campaign) has been accessed by an Internet audience.

Media includes advertising and/or content. Example types of media include web pages, text, images, streaming video, streaming audio, movies, and/or any other type of content and/or advertisements. In some examples, media includes user-generated media that is, for example, uploaded to media upload sites such as YouTube® and subsequently downloaded and/or streamed by one or more client devices for playback. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

In examples disclosed herein, an impression is associated with the demographics of the person corresponding to the impression to track a person's exposure to media. As used herein, a demographic impression is defined to be an impression that is associated with a characteristic (e.g., a demographic characteristic: age, gender, geographic location, race/ethnicity, income level, education level, religion, etc.) of the person(s) exposed to the media. Mapping demographics to impressions provides, in some examples, measurements of media exposure and/or audience behavior across numerous demographic groups (e.g., different ages, different genders, etc.). These numerous demographic groups (e.g., different ages) are sometimes referred to as "demographic buckets." For example, demographic buckets may be defined for ages 2-12, 13-14, 15-17, 18-20, 21-24, 25-29, 30-34, 35-39, 40-44, 45-49, 50-54, 55-64, 65+ and for each gender (e.g., male and female).

To associate demographics to an impression, the demographics of the person corresponding to the impression (or someone with similar demographics) must be known. Some OTT devices employ a user-registration model that may be used to obtain user demographics. As used herein, a user-registration model is a model in which users subscribe to media-delivery services by creating an account and providing demographic-related information about themselves. For example, such accounts are created with manufacturers of the example OTT devices and/or media service providers that enable media delivery to the example OTT devices. In some instances, OTT device user-registration models provide only partial demographic data (e.g., age and/or email address) for a person or for a household ("HH") (e.g., one person registers the example OTT device and multiple people use the device). As such, user-registration models for OTT devices may not produce highly accurate demographic information about audience member that access media via the example OTT devices.

Often OTT devices provide media (e.g., content and/or advertising) without tracking exposures (e.g., impressions) to the media. As a result, demographics are unknown for audiences exposed to the media. Prior techniques that collect impressions for online media accesses identify associated demographic information by using locally-installed panelist meter software on a personal computer and/or cookies to associate demographic data to collected impressions.

Typically, OTT devices do not operate with cookies. Additionally, OTT devices are not easily configurable for the installation and running of panelist meter software. In some examples, OTT devices have corresponding identification, such as OTT device identifiers ("IDs"), which can be used to collect demographic impressions by associating impressions with demographics known to correspond to the example OTT device IDs (e.g., based on OTT service user account information. However, if such device IDs are blocked, changed, or otherwise obscured (e.g., by users of the example OTT devices), demographics would not be associated with impressions because the obscured OTT device IDs could not properly identify such demographics. As such, current techniques arbitrarily spread impressions from OTT devices with obscured OTT device IDs across various demographic buckets in an attempt to associate demographics with such impressions.

Examples disclosed herein can be used to increase the demographic accuracy of demographic impressions corresponding to OTT devices. Examples disclosed herein leverage panelist information and demographic information collected by database proprietors to increase the accuracy of demographic impressions associated with OTT devices. For example, database proprietors gather detailed demographics (e.g., age, gender, geographic location, race, income level, education level, religion, etc.) of their subscribers during user registrations. Database proprietor, as used herein, refers to any entity having a network-accessible database storing and/or maintaining records or profiles identifying demographics of users having accounts therewith. Such database proprietors include, for example, social networking sites (e.g., Facebook®, Twitter®, MySpace®, etc.), multi-service providers (e.g., Google®, Yahoo!®, MSN®, Apple iTunes®, etc.), media delivery service providers (e.g., service providers that provide media delivery services for Roku® devices, Apple TV® devices, Google® TV devices, Chromecast devices, Samsung Smart TV® devices, Amazon® Fire TV devices, etc.), online retailer sites (e.g., Amazon.com, Buy.com, etc.), credit reporting services (e.g., Experian®), and/or any other web service(s) site that maintains user registration records.

In the examples of social networking sites (e.g., Facebook®, Google+®, etc.), user demographics are plentiful because users create detailed profiles to represent themselves online. In some instances, people registered with a database proprietor are also registered with OTT device service providers. In some examples, the database proprietor and the example OTT device service provider have the same or substantially similar demographic data for the same person and/or household registered with both services. In other examples, database proprietors and OTT device service providers have significantly different demographic data for the same person.

In examples disclosed herein, demographics corresponding to registered users of an OTT device (or other similar device) are compared to demographics corresponding to registered users of database proprietors to identify matches. In some examples disclosed herein, no matches occur between OTT devices (or other similar devices) and database proprietors. This may occur because there is little to no demographic data (e.g., age, gender, etc.) available for a registrant through an OTT device. For example, the example OTT device registration process may not require the demographic inputs for age or gender to register for media delivery services. Additionally or alternatively, there may be little to no demographic data (e.g., age, gender, etc.) available for the registrant through a database proprietor. In some examples, an OTT device registrant is not associated with any database proprietors. In some examples, demographic data that exists for the registrant through an OTT device contradicts demographic data available through a database proprietor. Such circumstances can lead to impressions with unknown demographics when an audience measurement entity processes impressions from OTT devices to associate them with demographics from database proprietors. For example, impressions collected based on media accessed through OTT devices are associated with no one in particular or are labeled as "unknown" because they do not match any user registered with a database proprietor. Empty demographics or non-attributions of demographics to impressions lead to gaps in overall audience metrics, which decreases the accuracy of audience measurements.

In other examples disclosed herein, there are matches between demographics corresponding to the example OTT device registrants and demographics corresponding to database proprietor registrants. For example, a match occurs when a user uses the same or substantially similar basic demographic information (e.g., age and gender) to register across multiple services such as an OTT device service and a database proprietor service. In other examples, more detailed demographics (e.g., personal income, viewing habits, social security number, credit card number, etc.) are required across user registrations to confirm a match indicative of a same person registered with, for example, the example OTT device service and the database proprietor. By matching demographics from an OTT device with demographics from database proprietors, examples disclosed herein combine, correct, and/or adjust demographics from OTT device services and/or database proprietors to generate more accurate and/or more detailed demographics and demographic impressions.

In some instances, demographics from OTT devices, database proprietors, and/or other demographic databases are not always accurate, even when matches are used to combine demographics from OTT device services and database proprietors. Misattribution errors (e.g., designating impressions with incorrect demographics) can sometimes occur for demographic impressions, such as, for example, where the actual age of the person corresponding to the impression is different that than the reported age of the person. For example, a potential subscriber to a database proprietor (e.g., Facebook®, Yahoo! ®, Google®, Experian®, etc.) is prevented from registering therewith if he or she is below a required age (e.g., thirteen, eighteen, twenty-one, etc.) or alternate demographic requirement. Accordingly, in some examples, the potential subscriber often provides false, but required, conforming demographic information to register. Consequently, impressions associated with the demographics of the example subscriber from the example database proprietor potentially will be misattributed to an incorrect demographic group. In some examples, misattribution errors decrease the accuracy of audience measurements.

Additionally, while a first user having a first demographic in a household registers an OTT device and has associated demographic data within a database proprietor, another user (e.g., a second user, third user, a fourth user, etc.) with a different demographic in the same household may use the same OTT device as the first user. Thus, the demographics of the actual user will not match those of household members who register the OTT device. In some examples, the example OTT device has a device identification (ID) and user profiles. However, impressions are often linked to the device ID and not the user profiles, because the user profiles do not require separate registration (and therefore, demographic data entry). For example, in households with multiple people, more than one person may share the example OTT device (and thus, its device ID) to access media without providing an indication of which member of the household is using the device (e.g., an 8-year old male child using the example OTT device ID registered to his 35-year old mother). In such examples, the impression data generated while the 8-year old male child was using the example OTT device would be misattributed to the 35-year old mother. As such, impressions can be misattributed to the wrong household member. Such misattributions reduce the accuracy of audience measurement.

To improve accuracies of demographic impressions and audience measurement in general, examples disclosed herein obtain household-level matched impressions from OTT devices and database proprietors, correct misattribution errors in matched impressions, predict the demographics of non-matched impressions, and assign members of a household to particular impressions.

Traditionally, audience measurement entities (also referred to herein as "AME" and/or "ratings entities") determine demographic reach, exposure, and other data for advertising and media programming based on registered panel members. That is, an audience measurement entity enrolls people who consent to being monitored into a panel. During enrollment, the audience measurement entity receives demographic information from the enrolling people so that subsequent correlations are made between media exposures to those panelists and different demographic markets. Often, the panelist data is the most accurate, but also the smallest in sample size. Unlike traditional techniques in which audience measurement entities rely solely on their own panel member data to collect demographics-based audience measurements, example methods, apparatus, and/or articles of manufacture disclosed herein compare demographic information stored by an audience measurement entity with demographic information from other entities (e.g., database proprietors) that operate based on user-registration models.

Examples disclosed herein apply panelist data to demographics information from external sources (e.g., database proprietors, OTT devices, etc.), to extend or supplement the coverage, accuracy, and/or completeness of an AME's demographics-based audience measurements. Examples disclosed herein provide the AME with monitoring data (e.g., demographic impressions) for people are not part of or who would not otherwise have joined an audience measurement panel.

To increase the likelihood that measured viewership is accurately attributed to the correct demographics, examples disclosed herein use demographic information stored by the audience measurement entity as well as demographic information stored by one or more database proprietors. Examples disclosed herein supplement demographic information maintained by a ratings entity (e.g., an AME such as The Nielsen Company of Schaumburg, Ill., United States of America, that collects media exposure measurements and/or demographics) with demographic information from one or more different database proprietors. Additionally, examples disclosed herein supplement and/or correct demographic information maintained by the one or more different database proprietors with demographic information from the ratings entity.

The use of demographic information from disparate data sources (e.g., high-quality demographic information from the panels of an audience measurement company and/or registered user data of web service providers) provides improved reporting effectiveness of metrics for both online and offline advertising campaigns and/or media (e.g., downloaded and/or streamed video and/or audio media). Examples disclosed herein use registration data from OTT device registrants, database proprietor registrants, and AME panelists to correct demographic impressions of OTT device users, to predict the demographics of missing members of a household, and to assign members of a household to particular impressions.

Examples disclosed herein identify AME panelists who are also registrants of a database proprietor and an OTT device. Examples disclosed herein analyze panelist demographic information as submitted to the AME Panel database against panelist demographic information submitted to the database proprietor and OTT device service provider. In the illustrated example, the AME panelist demographics are used to correct the database proprietor demographics of such AME panelists. Examples disclosed herein build a model based on the corrections. Examples disclosed herein apply the example model to the entirety of the database proprietor's demographic information (e.g., non-panelist demographic information) to correct deficiencies in the database proprietor's demographics.

Examples disclosed herein additionally assign viewership to particular demographic impressions and predict demographics missing or unknown in the database proprietor's demographics. In some examples, assigning viewership may utilize methods and apparatus disclosed in U.S. patent application Ser. No. 14/313,390 entitled "METHODS AND APPARATUS TO CHARACTERIZE HOUSEHOLDS WITH MEDIA METER DATA" filed on Jun. 24, 2014, which is hereby incorporated herein by reference in its entirety.

An example method includes identifying, via a processor, a first set of data from a first data source, the first set of data different from a second set of data from a second data source, generating, via the processor, a third set of data based on the second set of data from the second data source, generating, via the processor, a model based on a difference between the first set of data and the third set of data, applying, via the processor, the model to the first set of data, and assigning, via the processor, viewership to an impression associated with the first set of data by imputing viewership associated with the second set of data to the first set of data.

In some examples, the second set of data is data from panelists enlisted in audience measurement.

In some examples, the generating of the third set of data includes identifying a demographic bucket, determining whether the demographic bucket exists in a household based on an independent binary model, and determining the number of members in the household associated with the demographic bucket based on a demographic distribution associated with the second set of data.

In some examples, the independent binary model is a machine learning algorithm generated based on at least one of a household size, age, gender, person status, income, education, or ethnicity.

In some examples, the machine learning algorithm is at least one of a classification and regression tree ("CART"), log it, conditional inference tree ("ctree"), random forest, neural networks, or bootstrap aggregate decision trees.

In some examples, the assigning of the viewership to the impression includes, identifying viewing history associated with the second set of data, determining a first time associated with a first demographic viewing a media presentation in a first household associated with the second set of data, determining a second time associated with the first demographic and a second demographic viewing the media presentation in the household, determining a first probability that the first demographic viewed the media presentation by dividing the first time by the second time, identifying a first person in the first household associated with the second set of data having a second probability similar to the first probability, and imputing a viewing history of the first person to a second person in a second household associated with the first set of data.

In some examples, the identifying of the first person in the first household associated with the second set of data having the second probability similar to the first probability includes identifying a third person in the first household associated with the second set of data, ranking the first and third person based on a first highest probability, identifying a fourth person in the second household associated with the first set of data, ranking the second and fourth person based on a second highest probability, and identifying the first person has the second probability similar to the first probability when the first person has the first highest probability and the second person has the second highest probability.

In some examples, the first set of data from the first data source has a fourth set of data missing, further including linearly scaling the first set of data to accommodate for the missing fourth set of data.

An example apparatus includes a demographic corrector to identify a first set of data from a first data source, the first set of data different from a second set of data from a second data source, generate a third set of data based on the second set of data from the second data source, generate a model based on a difference between the first set of data and the third set of data, apply the model to the first set of data, and a viewership assigner to assign viewership to an impression associated with the first set of data by imputing viewership associated with the second set of data to the first set of data.

In some examples, the second set of data is data from panelists enlisted in audience measurement.

In some examples, the demographic corrector is to identify a demographic bucket, determine whether the demographic bucket exists in a household based on an independent binary model, and determine the number of members in the household associated with the demographic bucket based on a demographic distribution associated with the second set of data.

In some examples, the independent binary model is a machine learning algorithm generated based on at least one of a household size, age, gender, person status, income, education, or ethnicity.

In some examples, the machine learning algorithm is at least one of CART, log it, ctree, random forest, neural networks, or bootstrap aggregate decision trees.

In some examples, the viewership assigner is to identify viewing history associated with the second set of data, determine a first time associated with a first demographic viewing a media presentation in a first household associated with the second set of data, determine a second time associated with the first demographic and a second demographic viewing the media presentation in the household, determine a first probability that the first demographic viewed the media presentation by dividing the first time by the second time, identify a first person in the first household associated with the second set of data having a second probability similar to the first probability, and impute a viewing history of the first person to a second person in a second household associated with the first set of data.

In some examples, the viewership assigner is to identify a third person in the first household associated with the second set of data, rank the first and third person based on a first highest probability, identify a fourth person in the second household associated with the first set of data, rank the second and fourth person based on a second highest probability, and identify the first person has the second probability similar to the first probability when the first person has the first highest probability and the second person has the second highest probability.

In some examples, the first set of data from the first data source has a fourth set of data missing from the first set of data, further including a demographic predictor to linearly scale the first set of data to accommodate for the missing fourth set of data.

An example tangible computer readable storage medium includes instructions that, when executed, cause a machine to at least identify a first set of data from a first data source, the first set of data different from a second set of data from a second data source, generate a third set of data based on the second set of data from the second data source, generate a model based on a difference between the first set of data and the third set of data, apply the model to the first set of data, and assign viewership to an impression associated with the first set of data by imputing viewership associated with the second set of data to the first set of data.

In some examples, the second set of data is data from panelists enlisted in audience measurement.

In some examples, the instructions, when executed, further cause the machine to identify a demographic bucket, determine whether the demographic bucket exists in a household based on an independent binary model, and determine the number of members in the household associated with the demographic bucket based on a demographic distribution associated with the second set of data.

In some examples, the independent binary model is a machine learning algorithm generated based on at least one of a household size, age, gender, person status, income, education, or ethnicity.

In some examples, the machine learning algorithm is at least one of CART, log it, ctree, random forest, neural networks, or bootstrap aggregate decision trees.

In some examples, the instructions, when executed, further cause the machine to identify viewing history associated with the second set of data, determine a first time associated with a first demographic viewing a media presentation in a first household associated with the second set of data, determine a second time associated with the first demographic and a second demographic viewing the media presentation in the household, determine a first probability that the first demographic viewed the media presentation by dividing the first time by the second time, identify a first person in the first household associated with the second set of data having a second probability similar to the first probability, and impute a viewing history of the first person to a second person in a second household associated with the first set of data.

In some examples, the instructions, when executed, further cause the machine to identify a third person in the first household associated with the second set of data, rank the first and third person based on a first highest probability, identify a fourth person in the second household associated with the first set of data, rank the second and fourth person based on a second highest probability, and identify the first person has the second probability similar to the first probability when the first person has the first highest probability and the second person has the second highest probability.

In some examples, the first set of data from the first data source has a fourth set of data missing from the first set of data, further including a demographic predictor to linearly scale the first set of data to accommodate for the missing fourth set of data.

FIG. 1 illustrates an example system 100 with an example over-the-top ("OTT") device 102, an example database proprietor ("DP") 104 having a DP database 105, and an example audience measurement entity ("AME") 106. An example demographic comparator 107 communicates with the example OTT device 102 (and/or an OTT device service provider of the example OTT device 102) and the example database proprietor 104 and/or DP database 105 to create demographic impressions, as further discussed in conjunction with FIGS. 2 and 3.

The example demographic comparator 107 compares demographic information from the example database proprietor 104 with information identified by the example OTT device 102 (e.g., information sent to a proprietor of the example OTT device 102 during, for example, a registration process) to identify matches and create matched demographics. In some examples, the example demographic comparator 107 matches person-level information (e.g., identifiers, demographics, etc.) from the example database proprietor 104 to person-level information received from the example OTT device 102 (e.g., during registration) based on person identifiers (e.g., name, date of birth, address, etc.). In such examples, the example demographic comparator 107 creates person-level matched demographics. In examples wherein person identifiers are unavailable (e.g., due to privacy concerns), the example demographic comparator 107 matches household-level information (e.g., identifiers, demographics, etc.) from the example database proprietor 104 to household-level information received from the example OTT device 102 based on a household identifier. For example, the example demographic comparator 107 associates demographic information associated with a household identifier from the example database proprietor 104 with a same household identifier from the example OTT device 102. In such examples, the example demographic comparator 107 creates household-level matched demographics. However, in some examples, the demographics from the example database proprietor 104 is different that the demographics from the example OTT device 102 (e.g., the example database proprietor 104 identifies a male having an age between 18 and 20, whereas the example OTT device 102 identifies a male between the age of 13 and 14), even though the household is matched via the household identifier. Therefore, in some examples, the matched demographics form the example demographic comparator 107 need to be corrected.

To find matching data between the example database proprietor 104 and a proprietor of the example OTT device 102 on a person-level, the example demographic comparator 107 determines whether a first data element (e.g., name, email address, credit card number, etc.) identified during registration of the example OTT device 102 matches with a second data element (e.g., name, email address, credit card number, etc.) identified in the example DP database 105. If the first data element matches the second data element, then the example demographic comparator 107 combines (e.g., via data fusion techniques) all data elements received during registration of the example OTT device 102 and all data elements identified in the example DP database 105 to create matched demographics. In some examples, the example demographic comparator 107 generates a table (e.g., a column with OTT device 102 registration information and a column with information from the example DP database 105).

To find matching data between the example database proprietor 104 and a proprietor of the example OTT device 102 on a household-level, the example demographic comparator 107 determines whether a first data element (e.g., OTT device ID) identified during registration of the example OTT device 102 is associated with a second data element (e.g., a household ID) identified in the example DP database 105. If the first data element matches the second data element, then the example demographic comparator 107 combines (e.g., via data fusion techniques) all data elements received during registration of the example OTT device 102 and all data elements identified in the example DP database 105 to create matched demographics. In some examples, the example demographic comparator 107 generates a table (e.g., a column with OTT device 102 registration information and a column with information from the example DP database 105). The example demographic comparator 107 may match demographics before or after the impression collection phase, as described herein. The example demographic comparator 107 sends the matched demographics (e.g., either person-level matched or household-level matched) to an example apparatus 108. In some examples, the matched demographics are associated with impressions collected during the impression collection phase.

In some examples, the example demographic comparator 107 does not identify information from the example DP database 105 that matches with information received during registration of the example OTT device 102 (e.g., the registrant of the example OTT device 102 may not be associated with the example database proprietor 104, the registrant of the example OTT device 102 may have provided false information when registering for at least one of the example OTT device 102 or the example database proprietor 104, etc.). In such examples, the example demographic comparator 107 sends this non-matched demographic data to the example apparatus 108. In some examples, the non-matched demographic data are associated with impressions collected during the impression collection phase.

The example AME 106 operates the example apparatus 108 to correct any differences in demographics associated with impressions. The example apparatus 108 also assigns viewership for the impressions and predicts demographics from information obtained from over-the-top devices and database proprietors where such demographics are not provided (e.g., unknown). The example apparatus 108 includes an example demographic corrector 110, an example viewership assigner 112, an example demographic predictor 114, an example panelist database 116, and an example aggregator 118. In the illustrated example, the example apparatus 108 generates reports 120 based on the example demographic corrector 110, the example viewership assigner 112, and the example demographic predictor 114. The example OTT device 102, an example database proprietor 104, the example AME 106, the example apparatus 108, the example demographic corrector 110, the example viewership assigner 112, and the example demographic predictor 114 are all connected to an example network 122 in the illustrated example.

The example demographic corrector 110 receives matched demographics from the example demographic comparator 107. Depending on whether the demographic data is matched at a household-level or a person-level, the example demographic corrector 110 corrects misattributed demographics in the received demographic data. When the demographic data is matched at a household-level, the example demographic corrector 110 first predicts the actual demographics (e.g., demographic buckets) that exist within a household (e.g., is there at least one person in the household that is a male between ages 18 and 20). Then, the example demographic corrector 110 predicts the number of people having the predicted demographics within the household (e.g., how many people are in the household that are male between ages 18 and 20) based on conditional probabilities from panelist data. For example, a conditional probability is a probability of a person or persons in a household being a particular demographic (e.g., age, gender, etc.) based on a probability that there is at least one person in the household being that particular demographic (e.g., probability there are two females over the age of 65 given that there is at least one female over the age of 65). The example demographic corrector 110 corrects the received matched demographic data based the predicted demographics. In some examples, any differences in the received matched demographic data are adjusted to match the predicted demographics. This is considered a household-level correction.

For a person-level correction based on a household-level match, the example demographic corrector 110 matches household members to panelist household members based on age and gender and corrects the received demographic data based on the differences between the household members and panelists. Also, when the demographic data is matched at a person-level, the example demographic corrector 110 determines missing and extra household members. In some examples, the example demographic corrector 110 corrects demographic information on a quarterly basis (e.g., every three months). Of course, the example demographic corrector 110 may correct demographic information at different frequencies (e.g., daily, weekly, monthly, etc.).

The example viewership assigner 112 obtains household impressions and corrected demographics from the example demographic corrector 110 and/or the example network 122. In the illustrated example, the example viewership assigner 112 obtains donor household viewing history (e.g., panelist viewing history) including probabilities of particular panelist viewers based on demographics. The example viewership assigner 112 identifies probabilities that users having the demographics corrected by the example demographic corrector 110 viewed a media presentation associated with the household impression. In some examples, the example viewership assigner 112 merges the panelist probabilities with the household impression data to obtain probabilities for each user in the household. The example viewership assigner 112 ranks the probabilities of the users and the probabilities of the panelist viewers to determine donor viewing events. A viewing event may be consecutive viewing minutes (e.g., 1-421 minutes) of the same program by the same people in a household. In some examples, the example viewership assigner 112 merges impression data with a table of possible donor viewing events, which provides a list of all possible donors for each OTT viewing event. Thereafter, the example viewership assigner 112 identifies a donor viewing event based on panelist donors having similar probabilities to the users. If there is only one possible match, the example viewership assigner 112 identifies that viewing event as the donor. If there is more than one possible match, the example viewership assigner 112 uses the difference in probabilities to determine the match. If there is more than one viewing event with the same minimum difference in probabilities, then the example viewership assigner 112 randomly selects a viewing event. Alternatively, the most recent viewing event or a viewing event associated with panelists having demographic compositions similar to the users may be chosen. Finally, the example viewership assigner 112 assigns viewership by ranking users within the household and imputes the viewing histories (e.g., viewed or not viewed) of panelist donors having a similar rank. In some examples, all users in a household are assigned viewership, and the example viewership assigner 112 determines whether the media presented associated with the impression conflicts with a user to disqualify that user from viewership (e.g., the user normally doesn't watch the media, the user doesn't watch any media during the time the media was presented, etc.).

The example demographic predictor 114 predicts demographic data to account for the non-matched demographic data received from the example demographic comparator 107. In some examples, the demographic predictor 114 linearly scales the corrected demographics from the example demographic corrector 110. In some examples, the example demographic predictor 114 linearly scales demographic data matched by the example demographic comparator 107 and sends the scaled demographics to the example demographic corrector 110. Additionally or alternatively, the example demographic predictor 114 applies a differential scaling factor (e.g., a scaling factor that is different across numerous demographic buckets).

In operation, the example demographic comparator 107 matches demographic information from the example database proprietor 104 with information received from the example OTT device 102 (e.g., during registration). In some examples, such information is stored by a proprietor of the example OTT device 102 in association with the example OTT device ID or other identifier. The example demographic comparator 107 creates a matched ID to associate the matched demographics with impressions of media presented through the example OTT device 102. The example demographic corrector 110 obtains matched demographics and/or impressions from the example demographic comparator 107. To increase the accuracy of the matched demographics, the example demographic corrector 110 leverages the example panelist database 116. The example demographic corrector 110 utilizes panelist information to correct misattributions in the matched demographics. The corrected demographics and the respective impressions are sent to the example viewership assigner 112. The example viewership assigner 112 associates particular household members with the impression (e.g., whether a particular household member viewed a particular media presentation). The example demographic predictor 114 scales or otherwise predicts non-matched demographic data from the example demographic comparator 107.

After the demographics have been corrected by the example demographic corrector 110, the viewership has been assigned by the example viewership assigner 112, and the unknown demographics are predicted by the example demographic predictor 114, the results are aggregated together by the example aggregator 118. Subsequently, the example apparatus 108 generates and/or exports a plurality of reports 120 with the assigned viewership and corrected/predicted demographics, to report demographic impressions with relatively higher accuracies from OTT devices.

Figure 2:
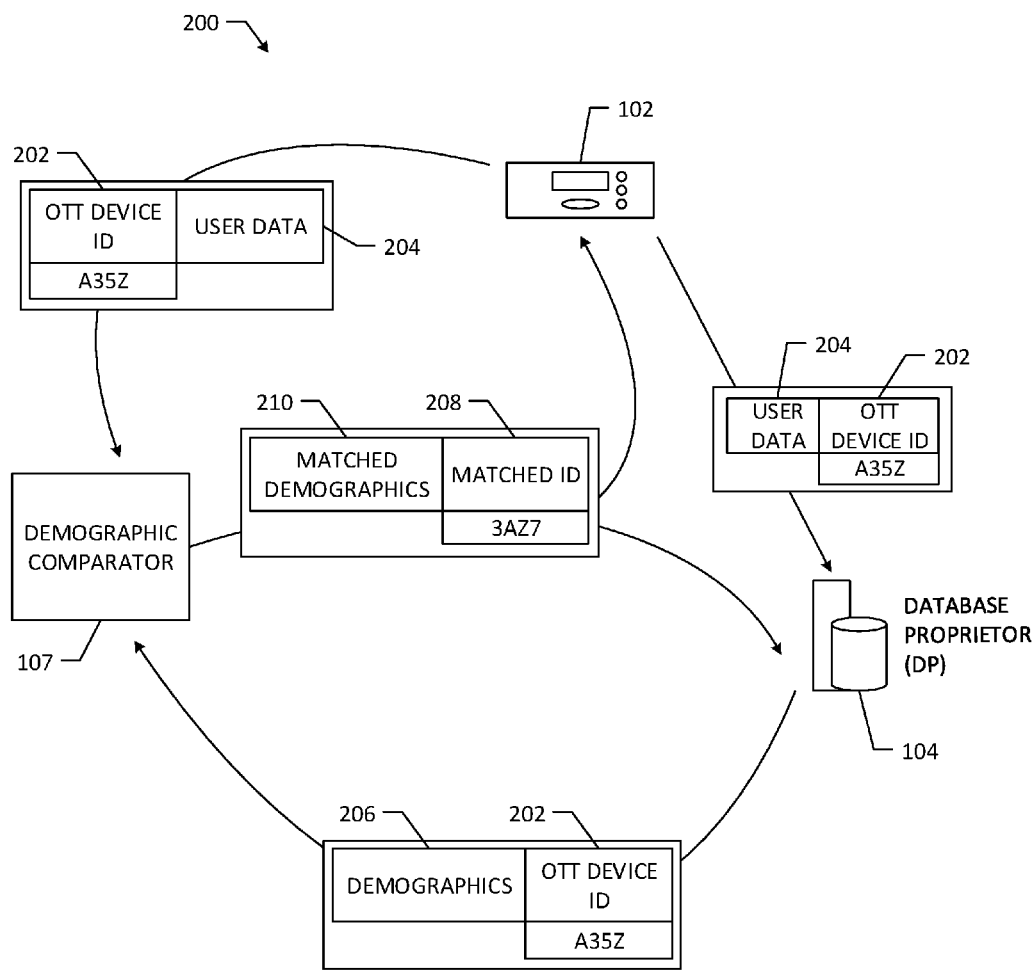
FIG. 2 illustrates an example OTT registration phase to generate an identifier for an OTT device and associate the identifier with demographics of a user that accesses media via the example OTT device.

FIG. 2 illustrates an example OTT registration phase 200 to generate an identifier for the example OTT device 102 and associate the identifier with demographics of a user that accesses media via the example OTT device 102. As shown in FIG. 2, the example OTT device 102 sends an example OTT device ID 202 (e.g., A35Z) along with a first set of data, such as, for example, user data 204, to both the example demographic comparator 107 and the example database proprietor 104. Examples of the example OTT device ID 202 include, without limitation, a device serial number, a unique hardware identifier (e.g., a Roku® device ID), or other known identifier that uniquely identifies the example OTT device 102. The example user data 204 includes a user's name, email address, credit card number, OTT device ID, a matched ID (FIG. 3), and/or other information required during registration of the example OTT device 102. In the illustrated example, the database proprietor 104 matches the example user data 204 to a second set of data, such as, for example, demographics 206 from the example DP database 105. The example demographics 206 include similar and/or different information about the user such as name, age, email address, education, physical address, credit card number, gender, household ID, matched ID (FIG. 3), and/or other information provided during registration for and/or use of a service provided by the example database proprietor 104 (e.g., Facebook®, Experian®, etc.). In some examples, the database proprietor 104 matches the example user data 204 to the example demographics 206 using any common data elements (e.g., name, email address, credit card number, matched ID, etc.) and combines, merges, or otherwise utilizes data fusion to supplement the example user data 204 with the example demographics 206, to supplement the example demographics 206 with the example user data 204, form matched demographics combining the example user data 204 with the example demographics 206, etc. In some examples, the example OTT device 102 communicates directly with the example database proprietor 104, and the example database proprietor 104 compares the demographics 206 to the example OTT device user data 204 and/or the example OTT device ID 202. In yet other examples, the example OTT device 102 does not communicate with the example database proprietor 104, and the example database proprietor 104 sends demographics to the example demographic comparator 107, which performs the demographic comparisons as described herein.

In the illustrated example, the example user data 204 from the example OTT device 102 includes user registration information (e.g., an OTT device ID, a name, an address, an age, a gender, a credit card number, any combination thereof, or any other identifying information). In the illustrated example, the example demographics 206 from the example database proprietor 104 includes user registration/profile information pertaining to a name, an address, an age, a gender, an education, a religion, any combination thereof, or any other identifying information if the user is a subscriber of the example database proprietor 104. In some examples, the example database proprietor 104 associates users that are members of the same household together into a household. In such examples, the example database proprietor generates an example database proprietor household identifier ("DP HH ID") to identify the household. In the illustrated example, the example database proprietor 104 sends the example demographics 206 of the user to the example demographic comparator 107.

The example database proprietor 104 is one of many database proprietors that operate on the Internet and provide services to large numbers of subscribers. Such services may be email services, social networking services, news media services, cloud storage services, streaming music services, streaming video services, online retail shopping services, credit monitoring services, etc. In examples disclosed herein, the example database proprietor 104 maintains user account records corresponding to users registered for Internet-based services provided by the database proprietors. That is, in exchange for the provision of services, subscribers register with the example database proprietor 104. As part of this registration, the subscribers provide detailed demographic information to the example database proprietor 104. Demographic information may include, for example, gender, age, ethnicity, income, home location, education level, occupation, etc.

The example demographic comparator 107 receives or otherwise obtains the example user data 204 from the service provider of the example OTT device 102 (or the example OTT device 102 itself). Additionally, the example demographic comparator 107 receives or otherwise obtains the example demographics 206 from the example database proprietor 104. In examples disclosed herein, the example demographic comparator 107 generates an example secure, encrypted matched ID 208 (e.g., 3AZ7) to associate demographics received from the example OTT device 102 and demographics stored by the example database proprietor 104. When common data elements are identified, the example demographic comparator 107 matches, combines, or otherwise associates the user data 204 with the demographics 206 to create matched demographics 210. In some examples, the example demographic comparator 107 sends the matched demographics 210 with the example matched ID 208 (e.g., 3AZ7) to the example OTT device 102 and the example database proprietor 104.

In the illustrated example, the example demographic comparator 107 identifies matches between the example user data 204 and the example demographics 206 at a household-level. For example, the example demographic comparator 107 determines whether a data element (e.g., OTT device ID) of the example user data 204 from the example OTT device 102 matches a data element (e.g., DP HH ID) of the example demographics 206 from the example database proprietor 104. If the data element from the example user data 204 from the example OTT device 102 matches the data element from the example demographics 206 from the example database proprietor 104, the example demographic comparator 107 generates the example secure, encrypted matched ID 208 linking the example user data 204 from the example OTT device 102 to the example demographics 206 from the example database proprietor 104. The aforementioned matching process is used to create matched demographic impressions as disclosed herein. While the matching is described in conjunction with matching the OTT device ID to a DP HH ID, other data elements may be used to match households and/or users.

In some examples, the example demographic comparator 107 sends the example matched ID 208 to the example OTT device 102, the example database proprietor 104, and the example demographic corrector 110. In some examples, the example demographic comparator 107 associates the example matched ID 208 with the corresponding example matched demographics 210 because the example OTT device ID 202 is capable of being changed, reset, hidden, or otherwise altered to prevent accurate measurement and/or demographic impression association. Thus, the example OTT device 102 and the example demographic corrector 110 rely upon the example matched ID 208 for accurate measurement and demographic impression association.

If the example user data 204 from the example OTT device 102 does not match (e.g., there are no common data elements) the example demographics 206 from the example database proprietor 104, the example demographic comparator 107 sends the example user data 204 and the example demographics 206 to the example demographic predictor 114 (FIG. 1). For example, the example demographic comparator 107 may have a match rate of 73% for 17,552 households. In such examples, the non-matching occurs because the example database proprietor 104 does not have data with which to compare to the user data 204 (e.g., the user of the example OTT device 102 is not associated with the example database proprietor 104). In the illustrated example, the example demographic predictor 114 predicts or otherwise obtains demographic data for unmatched data by scaling matched impressions from the example demographic comparator 107 to accommodate non-matched impressions. In some examples, demographic impressions are matched to particular users via IP addresses of OTT devices of those users (or via IP addresses of a household router, modem, etc.). In such examples, a database proprietor (e.g., eXelate) provides demographics for a particular user based upon the user's IP address. IP demographic matching may occur when the example demographic comparator 107 cannot match the user data 204 to the demographics 206. Alternatively, IP demographic matching occurs in parallel with, or instead of, the example demographic comparator 107. In some examples, the example demographic comparator 107 is operated by the database proprietor 104. In other examples, the example demographic comparator 107 is operated by the example AME 106. In yet other examples, the example demographic comparator 107 is operated by a third party.

The example registration phase of FIG. 2 associates an identifier 202 of the example OTT device 102 (e.g., a client device) with demographics of a user that accesses media via the example OTT device 102. The user may be a head of household, or a person likely to register a device for the household. The example AME 106 identifies a likely profile of the household and/or demographics of other members living in the same household based on the demographics of the user. In examples disclosed herein, a household composition for the household of the user are modeled based on the demographics of the head of household (e.g., demographics of the user), media access characteristics (e.g., name, genre, volume level, application name, application category, time of day of exposure, database household demographics), and models based on known panel family compositions indicated in panel data as likely to access a particular mix of media (e.g., TV shows and/or other programming) that substantially matches the media accessed on the example OTT device in the household of the user.

In some examples, a user registers the example OTT device 102 through an example OTT registration website to access one or more media delivery services via the example OTT device 102. In some examples, when the user configures the example OTT device 102 for use, the example OTT device 102 displays example OTT device registration instructions on an example media presentation device. The example OTT device 102 instructs the user to navigate to the example OTT registration website using a computer, or alternatively through the example OTT device 102 itself. The example OTT device 102 also provides to the user the example OTT device identifier ID 202 (e.g., A35Z) that the user is to enter during registration. When the user enters the example OTT device ID 202 during the example OTT registration, the manufacturer or service provider of the example OTT device 102 links the example OTT device 102 with a user account of the user based on the example OTT device ID 202. By making this association between the particular OTT device 102 and a user account, the user is able to set up media-streaming services on the example OTT device 102 and make purchases via the example OTT device 102. Further, the manufacture or provider of the example OTT device 102 obtains knowledge of who is associated with each OTT device ID 202.

To monitor media accessed via the example OTT device 102, an example AME 104 requires a static identifier (e.g., an identifier that does not change), with which the example OTT device ID 202 fails to conform, in some examples. Therefore, in some examples, the example demographic comparator 107 collects and stores the example OTT device ID 202 of the example OTT device 102 during the example registration phase of FIG. 2. However, because the example OTT device ID 202 is capable of changing, the example demographic comparator 107 creates the example matched ID 208 to be associated with the example OTT device 102. In the illustrated examples, the example demographic comparator 107 uses the example matched ID 208 to associate the demographics 206 received from the example database proprietor 104 and/or the user data 204 received from the example OTT device 102 (e.g., matched demographics 210) with the example OTT device 102 and, thus, impressions subsequently received from the example OTT device 102. In some examples, the example matched ID 208 is the same as the example OTT device ID 202.

In some examples, the example demographic comparator 107 obfuscates the example OTT device ID 202 from the example database proprietor 104. In such examples, the example demographic comparator 107 generates a value for the example matched ID 208 that is different from the example OTT device ID 202. In some examples, the example matched ID 208 may be a hash of the example OTT device ID 202. Of course, as mentioned previously, the example demographic comparator 107 may be part of the example AME 106, the example database proprietor 104, and/or a third entity.

As shown in FIG. 1, the example demographic corrector 110 has access to the example panelist database 116, wherein the example AME 106 can associate the example matched ID 208 with panelist demographics previously collected by the example AME 106 from the user, if the user is a panelist of the example AME 106. For example, the example AME 106 establishes a panel of users who have agreed to provide their demographic information and to have their OTT media access activities monitored. When an individual joins the AME panel, the person provides detailed information concerning the person's identity and demographics (e.g., gender, age, ethnicity, income, home location, occupation, etc.) to the example AME 106. The example AME 106 sets a device/user identifier (e.g., a AME cookie) on the person's television set top box, computer, OTT device, etc. that enables the example AME 106 to identify, for example, the user (e.g., a panelist). An AME panel may be a cross-platform home television/computer (TVPC) panel built and maintained by the example AME 106. In other examples, the AME panel is a computer panel or internet-device panel without corresponding to a television audience panel. In yet other examples, the AME panel may be a cross-platform radio/computer panel and/or a panel formed for other mediums.

Although some examples disclosed herein are described in connection with AME panel members and corresponding panelist demographics, in some examples, none or only some of the audience members of OTT devices are panel members of an AME panel. Examples disclosed herein are useful to collect demographics from database proprietors such as the example database proprietor 104 even when an audience member is not a panel member of the example AME 106. In the illustrated example, the example AME 106 receives subscriber demographics from an example DP 104 as disclosed herein without the example AME 106 also supplying AME panelist demographics. In some examples, the example AME 106 does not provide AME panelist demographics for impressions, and collects demographics only from database proprietors.

Figure 3:
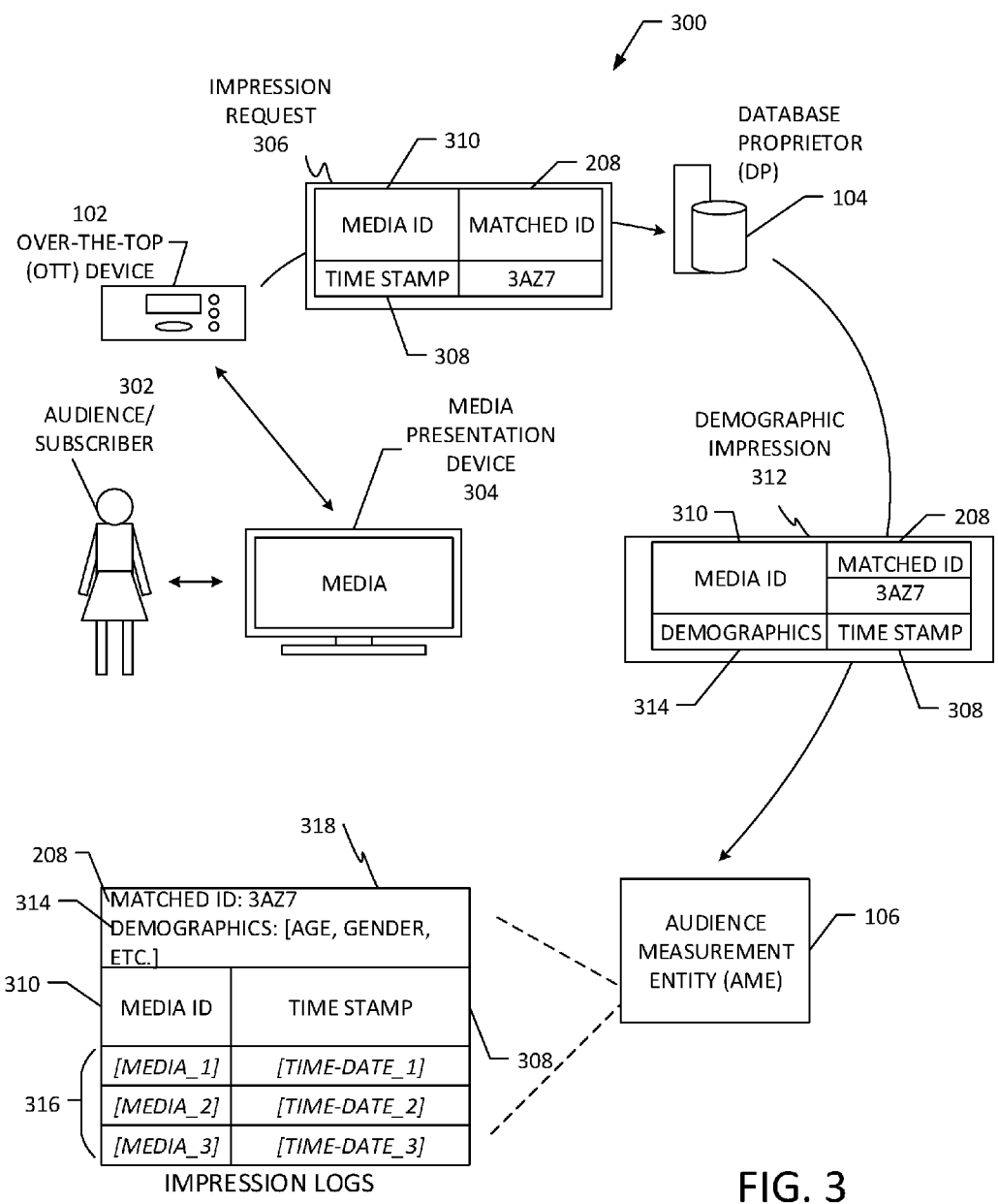
FIG. 3 illustrates an example impression collection phase to collect demographic impressions corresponding to the example OTT device of FIGS. 1-2.

FIG. 3 illustrates an example impression collection phase 300 to collect demographic impressions corresponding to the example OTT device of FIGS. 1-2. In the illustrated example of FIG. 3, the example OTT device 102 receives media from media providers via the Internet over an internet protocol (IP) connection. In the illustrated example, the example OTT device 102 may be any IP-based media delivery device capable of receiving, decoding, and presenting video, audio, and/or images. Example OTT devices include a Roku® media device, an Apple TV® media device, a Samsung Smart TV® media device, a Google® TV media device, a Chromecast media device, an Amazon® TV media device, a gaming console (e.g., a Microsoft® Xbox® gaming console, a Sony® PlayStation® gaming console, a Nintendo® Wii® gaming console, etc.), a smart TV, a smart DVD player, an audio-streaming device, etc.

In the illustrated example, the example media is requested by an audience member 302 (e.g., an OTT device subscriber) through a media presentation device 304. In the illustrated example, the AME 106 and/or the example database proprietor (DP) 104 identify a likely profile of the household and/or demographics of other members living in the same household based on the demographics of the audience member 302. In some examples, a household composition for the household of the audience member 302 is modeled based on the demographics of the head of household (e.g., demographics of the audience member 302), media access characteristics (e.g., genre and/or volume of media being accessed in the household), and/or known panel family compositions indicated in panel data as likely to access a particular mix of media (e.g., TV shows and/or other programming) that substantially matches the media accessed in the household of the audience member 302.

The example media presentation device 304 is connected to the example OTT device 102 in the illustrated example. The example OTT device 102 decodes received media and outputs the decoded media to the media presentation device 304 for presentation. The example media presentation device 304 may be a television, a monitor, an audio receiver, an audio amplifier, etc. In some examples, the example OTT device 102 is integrated in the media presentation device 304.

In an example impression collection phase, like the one shown in FIG. 3, the example AME 106 collects impressions corresponding to media accessed via the example OTT device 102. Examples disclosed herein collect impression information for any type of media including content and/or advertisements. Media may include advertising and/or content such as web pages, streaming video, streaming audio, movies, and/or any other type of content and/or advertisements delivered via satellite, broadcast, cable television, radio frequency (RF) terrestrial broadcast, Internet (e.g., internet protocol television (IPTV)), television broadcasts, radio broadcasts and/or any other vehicle for delivering media.

In the illustrated example, the example OTT device 102 employs media streaming applications (e.g., apps) and/or a web browser to access media, some of which include instructions that cause the example OTT device 102 to report media monitoring information to the example AME 106. That is, when the example OTT device 102 of the illustrated example accesses media, an application and/or web browser of the example OTT device 102 executes instructions in the media to send an impression request 306 to the example database proprietor 104 via, for example, the Internet or any other network. The impression request 306 of the illustrated example includes the example matched ID 208, a time stamp 308, and a media ID 310 that identifies the media accessed at the example OTT device 102 at the time indicated by the time stamp 308. The example time stamp 308 includes the date and time the media was presented. In some examples, the time stamp 308 includes the duration the media was presented. In some examples, the time stamp 308 includes a start time and a stop time.

The example media ID 310 may be a code, a signature, watermark information, a content management system (CMS) tag, or any other identifying information that the example AME 106 pre-defines as being associated with particular media so that subsequently logged impressions based on the media ID 310 (such as the impressions logged during the impression collection phase of FIG. 3) can be used to identify the particular corresponding media. The example impression request 306 allows the example database proprietor 104 to associate (e.g., link) impressions of different media accessed via the example OTT device 102 with demographics corresponding to the example matched ID 208 stored within the example database proprietor 104 database, thus creating a demographic impression 312. For example, for a media presentation within a household, the demographics of the members of the household are associated with a household impression of the media presentation.

In some examples, the example database proprietor 104 sends the example demographic impression 312 to the example AME 106 via, for example, the Internet or any other network. The example demographic impression 312 of the illustrated example includes the example matched ID 208, the media ID 310, demographics 314, and the time stamp 308. In the illustrated example, the example demographics 314 are the matched demographics 210 associated with the example matched ID 208 determined in the example registration phase illustrated in FIG. 2. In the illustrated example, when the example AME 106 receives the example demographic impression 312 from the example database proprietor 104, the example AME 106 logs an example impression 316 in an example impression logs data structure 318 based on the example matched ID 208. The example impression logs data structure 318 includes the example matched ID 208 and the corresponding demographics 314, which the example AME 106 obtains from the example database proprietor 104 in the example demographic impression 312.

In some examples, the example database proprietor 104 aggregates demographic impressions and sends the aggregate impressions to the example AME 106. In other examples, the example database proprietor 104 sends individual, user-level demographic impressions to the example AME 106. In the illustrated example, the example demographic impressions 306 are logged in the example impression logs data structure 318 to associate the media ID 310 with the time stamp 308, the example matched ID 208, and the demographics 314. In this manner, the example AME 106 can compare demographic impressions from the example database proprietor 104 with demographic impressions from panelists, as disclosed herein.

Figure 4:
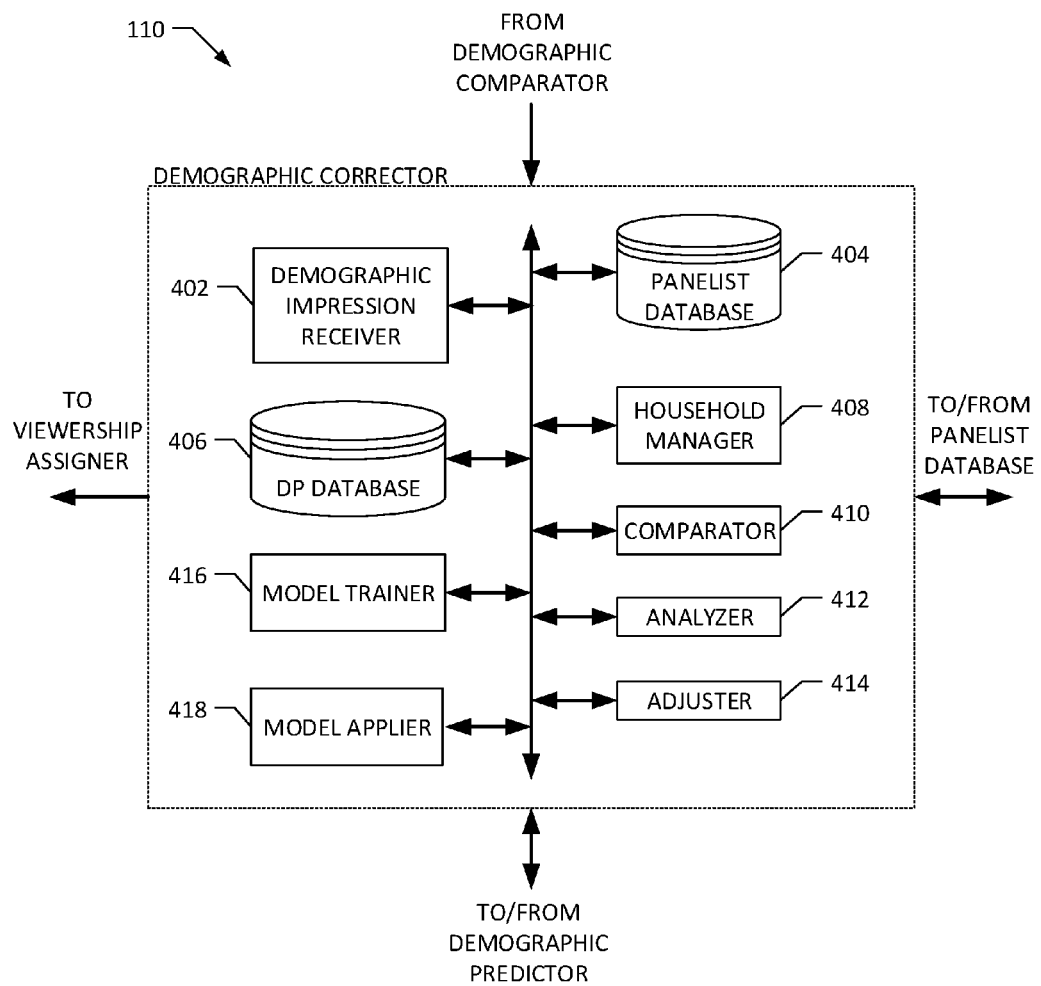
FIG. 4 illustrates an example demographic corrector of FIG. 1 to correct collected demographic impressions.

FIG. 4 illustrates the example demographic corrector 110 of FIG. 1. The example demographic corrector 110 utilizes demographics matched by the example demographic comparator 107 (FIG. 1) along with AME panelist demographic data stored in the example panelist database 116 (FIG. 1). In the illustrated example, the example demographic corrector 110 corrects demographics from the example database proprietor 104 at a household-level. For example, the example database proprietor 104 and the example AME 106 provide demographics for particular households, rather than for every viewer (e.g., person-level data). In the illustrated example, a particular household is made up of numerous demographic buckets (e.g., ages 2-12, 13-14, 15-17, 18-20, 21-24, 25-29, 30-34, 35-39, 40-44, 45-49, 50-54, 55-64, 65+ for each gender).

The example demographic corrector 110 includes an example demographic impression receiver 402, an example panelist database 404, an example DP database 406, an example household manager 408, an example comparator 410, an example analyzer 412, an example adjuster 414, an example model trainer 416, and an example model applier 418.

The example demographic impression receiver 402 of the example demographic corrector 110 receives demographic impressions from the example demographic comparator 107. The example demographic impression receiver 402 stores demographic data associated with matched database proprietor demographic impressions within a DP database 406. Similarly, the example panelist database 404 receives and stores demographic data and/or demographic impression data from the example panelist database 116 (FIG. 1).

The example household manager 408 of the example demographic corrector 110 obtains demographic data from the example panelist database 404 and/or the example DP database 406. The example household manager 408 determines a probability that a first demographic bucket exists in a particular household. In the illustrated example, the example household manager 408 utilizes multiple household-level machine learning models to predict demographic groups (e.g., demographic buckets) actually existing in a particular household.

In the illustrated example, the example model trainer 416 trains an independent binary model (e.g., yes or no) for each age and gender combination corresponding to a demographic bucket (e.g., (male or female)×(ages 2-12, 13-14, 15-17, 18-20, 21-24, 25-29, 30-34, 35-39, 40-44, 45-49, 50-54, 55-64, 65+)), totaling twenty-six binary models. In some examples, short term visitors and members with ages less than two years old are excluded, and models are not trained for these particular people. While the present disclosure discusses twenty-six binary models, any number of models may be used without departing from the scope of the present disclosure. In the illustrated example, the example model trainer 416 utilizes a classification and regression tree ("CART") technique to generate the example models. In some examples, the example model trainer 416 utilizes a 5-folds cross validation to tune the complexity parameter of each CART model. Additionally or alternatively, the example model trainer 416 may use log it, conditional inference tree ("ctree"), random forest, neural networks, bootstrap aggregate decision trees, or other modeling techniques without departing from the scope of the present disclosure. The example model trainer 416 may utilize numerous variables in building the example models, including, without limitation, household ("HH") size, age (mean age of the HH, number of kids, number of teenagers, number of 18-24 year olds, number of 25-34 year olds, number of people over 55, etc.), gender (number of female, male, etc.), person status (number of primary, number of dependents, etc.), income, education, ethnicity, etc. The example models produce a probability that a particular demographic bucket exists in a particular household. The example comparator 410 predicts whether the particular demographic bucket exists in the particular household by comparing the probability to a threshold. The threshold is selected to maximize metrics of interest (e.g., sensitivity, accuracy, precision, etc.). In some examples, the threshold is consistent across all demographic buckets. In the illustrated example, each demographic bucket and the corresponding independent binary model has a unique threshold (e.g., a first threshold of 0.7 may be used for males between the ages of 18 and 20 and a second threshold of 0.55 may be used for females between the ages of 30-34).

In some examples, the existence of certain demographic buckets are dependent on the existence of other demographic buckets (e.g., children demographic buckets are likely dependent on adult demographic buckets). In such examples, a plurality of dependent binary models may be used to accommodate such dependencies. In some examples, a two-stage model is used, such that dependencies are identified by a second set of binary models different from the above identified models.

In some examples, the example model trainer 416 trains an Ensemble of Classifier Chains ("ECC") model to incorporate demographic bucket dependencies in an iterative manner. In the ECC model, the example model trainer 416 trains m classifiers (e.g., C1, C2, C3, . . . , Cm) with a random chain ordering (e.g., a chain arranging the twenty-six demographic buckets described herein) and a random subset of the training set of household data described herein. For example, the example model trainer 416 iteratively adds the demographic bucket(s) determined to exist in the example household (e.g., by the example comparator 410) as a predictor variable to predict the next demographic bucket in the chain ordering for a classifier. Thereafter, the example model trainer 416 aggregates, for each demographic bucket, the predicted demographic buckets across the m chains. Each demographic bucket receives m votes from the m chains. Thereafter, the example comparator 410 compares the aggregate sum to a threshold to determine whether or not the demographic bucket exists in the home. This ECC model may produce a different prediction value than the independent binary model for a particular demographic, thereby incorporating dependency variation information (e.g., adult demographics may be dependent on a child demographics). Therefore, the household manager 408 can predict the existence of particular demographic buckets more accurately when dependencies are accounted for, such as by the example process described herein. Additionally or alternatively, the household manager 408 may utilize multiple label classification methods (e.g., multi label k-nearest-neighbor) to incorporate dependencies.

In the illustrated example the example analyzer 412 calculates probabilities for the number of individuals within the existing demographic buckets for a particular household. The example analyzer 412 determines conditional probabilities for the number of members (e.g., one member, two members, three members, etc.) within the existing demographic buckets based on demographic distributions of panelists within panelist households. For example, the conditional probability may be the probability that there is one member in an existing demographic bucket based on the condition that there is at least one member in the existing demographic bucket (e.g., one of the demographic buckets that the household manager 408 determined exists in the household). The example analyzer 412 defines intervals between zero and one based on the conditional probabilities. The number of internals may be dependent on the number of outcomes (e.g., one person in an existing demographic bucket, two people, three people, four people, etc.). Of course, any number of intervals may be defined. The example analyzer 412 then generates a random number Rn between 0 and 1. The example comparator 410 compares the generated random number Rn to the defined intervals and identifies the number of people in the demographic bucket based on which interval the generated random number Rn falls into. Accordingly, the example demographic corrector 110 predicts which demographics exist within a household and predicts how many people are in each of the existing demographic buckets.

In some examples, person-level matched demographic impressions are available or household-level matched demographic impressions are available and person-level correction is used. In such examples, the number of missing people within a household is predicted prior to correcting the demographics of the DP household members. In some examples, a machine learning and/or statistical model (e.g., decision trees, neural networks, etc.) is used to predict the number of missing people as well as the demographics of the missing people associated with a household. In some examples, missing members can be determined using mean and/or median values in similar HHs to predict the demographics of the missing members. Alternatively, a "missing" label is applied to variables for which the database proprietor does not have data (e.g., no data="missing").

Thereafter, the example demographic corrector 110 corrects demographics from the example database proprietor 104. The example household manager 408 prepares a panelist household member's age to be compared to DP household members' ages where person-level matched data is not available. While the present disclosure discusses matching ages, any other demographic information may be used similarly for finding matches between AME panelists and database proprietor registrants without departing from the scope of this disclosure. In some examples, the example household manager 408 matches a household first by getting both panelist and DP household member impression information associated with the same matched ID.

In some examples, a machine learning and/or statistical model is used to correct individual level database proprietor demographics using variables, such as, for example, DP household size, DP demographic buckets, person status (e.g., head of household, number of adult parents in a household, number of unknown family members in a household), education (e.g., levels of education), age (e.g., number of kids ages 0-12, number of teenagers ages 13-17, number of young adults ages 18-34, number of adults ages 35-45, number of elderly ages 65+), gender (e.g., number of unknown gender, number of males, dominant gender), and ethnicity (e.g., number of Caucasian, Hispanic, African American, dominant ethnicity).

In some examples, extra members can be determined based on age-gender combinations (e.g., a male of age 33 would represent an 'Extra' member where only females and/or males ages 1-27 are present). In other examples, extra members can be determined based on separate models for age and gender (e.g., model 1 for age buckets and model 2 for gender buckets). In such examples, a machine learning and/or statistical model is formed using the person-level matched data to predict for each person, whether that person is "extra" or not. In such examples, different "extra" members may be identified in each example. Therefore, in some examples, the accuracy of "extra" member identification is verified. In other examples, only members identified as "extra" members are considered.

The example comparator 410 of the example demographic corrector 100 compares a panelist to all DP household members for age comparison. The example analyzer 412 of the example demographic corrector 110 determines that the panelist and the DP household member with the closest ages are a possible match. Thereafter, the example analyzer 412 verifies if the matching household members are within a variance of years (e.g., +3, +10, etc.). Examples disclosed herein utilize variances (e.g., +3, +10, etc.) to account for mistakes, lies, and/or other demographic inaccuracies that could lead to misattributions. Using variances provides for a larger number of matches to occur, however, it also highlights the fact that the demographic data is incorrect. Therefore, examples disclosed herein correct such errors in the demographic data.

While the example analyzer 412 determines that a panelist matches with a DP household member, the panelist and DP household member may have different demographics (e.g., age, gender, etc.). In some examples, these differences can be adjusted (e.g., corrected) using the panelist demographic information as truth. For example, if the DP member demographics vary from the panelist demographic information, then the DP member demographics are incorrect and can be corrected by replacing the incorrect demographics with the panelist demographics. The example adjuster 414 of the example demographic corrector 110 corrects the DP household member demographics by determining the difference(s) between the demographic data of the DP household member and the panelist, and correcting the demographics, as discussed above. In other examples, the example adjuster 414 only determines the difference(s) between the demographic data of the DP household member and the panelist. The example model trainer 416 of the example demographic corrector 110 trains a model based on the determined difference(s) in the demographic data of the DP household member and the panelist. The example model applier 418 of the example demographic corrector 110 utilizes models trained by the example model trainer 416 to apply similar corrections to a plurality of demographic impressions, especially those where panelist data is not available. Thus, based on a panelist subset (e.g., a sample population), a statistical model is trained and applied to an entire set (e.g., a universe population). The statistical model may be a machine or computational learning algorithm (e.g., decision trees, neutral network, etc.). In some examples, the statistical model has the ability to perform accurately on new, unseen examples/tasks after having experienced a learning dataset.

In some examples, the example analyzer 412 cannot match a panelist to a DP household member (e.g., HH size in DP only matches AME HH size 20% of the time; 40% of households have missing members; 40% of households have extra members). In the illustrated example, the example adjuster 414 assigns a "missing" label or an "extra" label to the non-matched DP household members, as will be further described below. In some examples, the demographics of missing and/or extra non-matched DP household members are corrected after a model has been trained by the example model trainer 416. Additionally or alternatively, the missing and/or extra non-matched DP household members may have demographics predicted by the example demographic predictor 114, because without a matching panelist it may be difficult to determine whether or not the DP household member's demographics are accurate. In these examples, the example demographic predictor 114 uses television and PC media and viewing history to predict demographics of a missing and/or extra DP household member (e.g., children programming in an all adult household makes it probable there is child impression data missing from in the database proprietor's database). In some examples, households with children are more likely to have missing and/or incorrect impressions.

In some examples, the number of missing people within a household is predicted prior to correcting the demographics of the DP household members. In some examples, there are no missing people in a household, 1 missing person in a household, 2 missing people in a household, or more than 2 missing people in a household. An example distribution is 51% of households have no missing people, 24.5% of households have one missing person, 12.5% of households have two missing people, and 12% of households have more than two missing people. A number of factors affect distributions such as the example distribution above. In some examples, DP household size, DP demographic buckets, person status (e.g., head of household, number of adult parents in a household, number of unknown family members in a household), education (e.g., levels of education), age (e.g., number of kids ages 0-12, number of teenagers ages 13-17, number of young adults ages 18-34, number of adults ages 35-45, number of elderly ages 65+), gender (e.g., number of unknown gender, number of males, dominant gender), and ethnicity (e.g., number of Caucasian, Hispanic, African American, dominant ethnicity) factor into such distributions.

In some examples, extra members can be determined based on demographic buckets having age-gender combinations (e.g., male age 33 would represent 'Extra' in demographic bucket of females and/or males ages 1-27). In other examples, extra members can be determined based on separate models for age and gender (e.g., a first model for age buckets and a second model for gender buckets). Example flow diagrams of example operations of the example demographic corrector 110 are described below in connection with FIGS. 7, 8, and 9A-9C.

Figure 5:
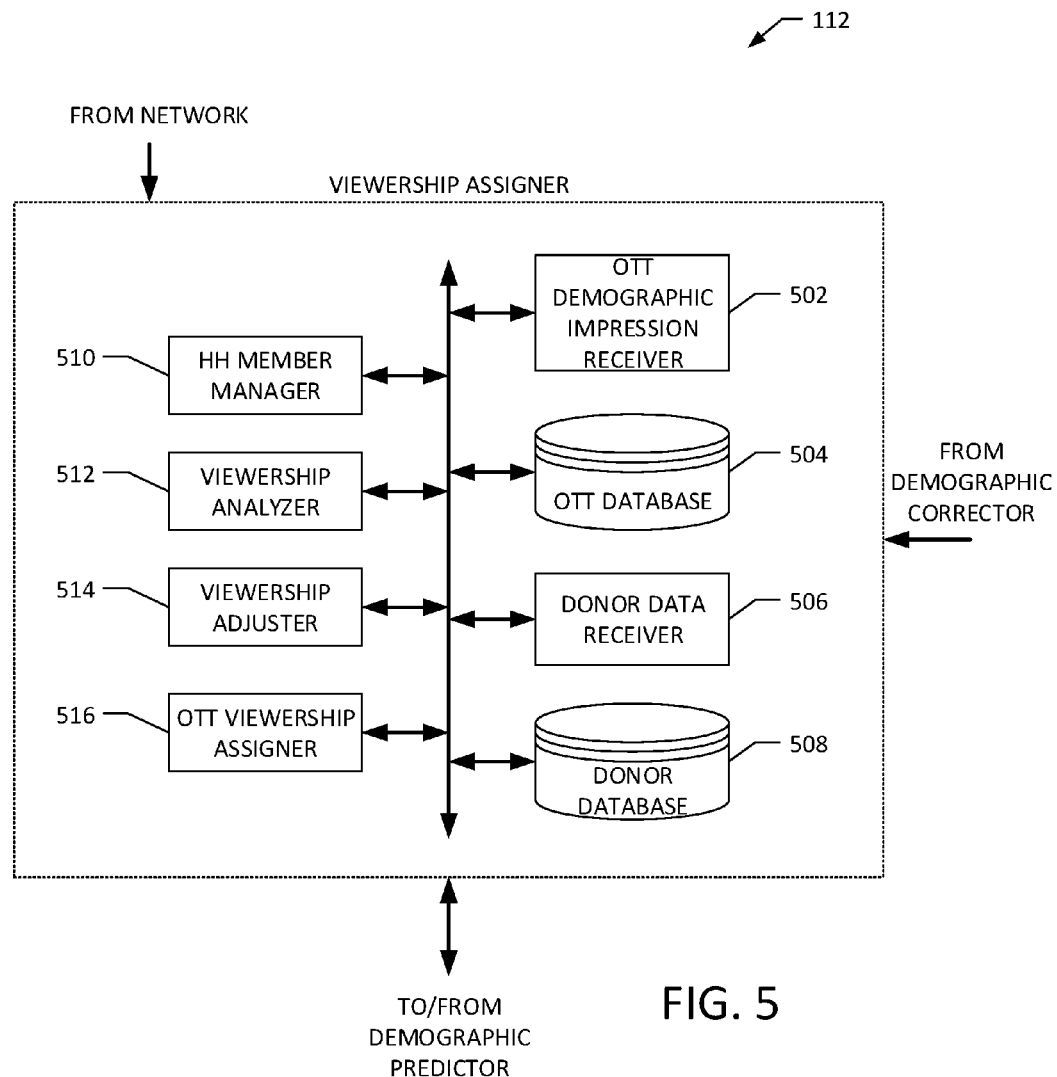
FIG. 5 illustrates an example viewership assigner of FIG. 1 to assign viewership to corrected demographic impressions.

FIG. 5 illustrates the example viewership assigner 112 of FIG. 5. When correcting demographics as disclosed herein, the example demographic impressions are adjusted and/or modeled based on demographics from panelist data. In the illustrated example, viewership for a particular impression is associated with the corrected demographics. As described below in connection with FIG. 5, the example viewership assigner 112 utilizes the corrected demographics from the example demographic corrector 110 to accurately assign viewership to the correct HH members to create corrected demographic impressions. The example viewership assigner 112 of the illustrated example of FIG. 5 includes an example OTT demographic impression receiver 502, an example OTT database 504, an example donor data receiver 506, an example donor database 508, an example household ("HH") member manager 510, an example viewership analyzer 512, an example viewership adjuster 514, and an example OTT viewership assigner 516.

The example OTT demographic impression receiver 502 of the example viewership assigner 112 receives corrected demographics associated with the corrected demographics from the example demographic corrector 110 (FIG. 4), to assign viewership of a particular impression to a particular HH member. Along with the corrected demographics, the example OTT demographic impression receiver 502 receives OTT device information including impressions, times in which a household uses the example OTT device 102, and OTT media information (e.g., name, genre, application name, application category, time of day of exposure, etc.). Accordingly, the example OTT demographic impression receiver 502 sends the received impressions, times, media information, and corrected demographics to an OTT database 504.

Additionally, the example donor data receiver 506 of the example viewership assigner 112 obtains media and viewing history of a panelist obtained through AME metering. In some examples, the example AME 106 (FIG. 1) implements numerous methods to collect media impression information (e.g., media, time, viewership, etc.) from televisions and/or PCs. In some examples, metering applications are installed directly on a television, a set top box, and/or a PC to accurately measure media and viewership directly. Other methods include monitoring media through proxies using proxy logs to determine media, time, viewership, etc. The example donor data receiver 506 receives media and viewing history information from the example AME 106 obtained through these or other alternative methods of collecting television and PC media and viewership. Accordingly, the example donor data receiver 506 sends the received times, media information, and viewing history information to a donor database 508.

In the illustrated example, the example viewership assigner 112 utilizes probabilities based on donor household data (e.g., panelist and/or historical viewing data), such as metering data associated with televisions connected to OTT devices or other metering as described herein. In some examples, the example donor data receiver 506 acquires donor data via the example network 122 (block 1004). The example donor data receiver 506 stores the example donor data in the example donor database 508. The example viewership analyzer 512 uses a plurality of variables to find donor household information in the example donor database 508 that match with data related to the first household. Examples of matching variables include, without limitation, demographics (male ages 2-12, 13-4, 15-17, etc., female ages 40-44, 50-54, etc.), time of day (e.g., prime time, late afternoon/early evening, late evening, weekday morning, weekday daytime, weekend daytime, etc.), specific genre (e.g., musical drama, feature film, comedy variety, children, etc.), HH size, number of adults, number of kids, etc. These matching variables provide, for example, who was viewing what was being viewed, when was it being viewed, and how much was viewed. For example, over a period of six months, televisions connected to OTT devices may provide the program, originator, household identifier, viewing date, time of day, and demographics. In such examples, 930,420 viewing events (e.g., 22 million minutes) from 2,933 panelist spread across 869 homes may provide 12,937 programs of various genres. In some examples, direct metering methods (e.g., people meter, portable people meter, etc.) collect such information. In some examples, attribution via button-pushing provides such information. In some examples, the example viewership adjuster 514 rolls up the variables (e.g., subsequently searches for matching donor household information with less variables used in the search), such that a match may be found. In some examples, initially a donor household must match all matching variables associated with the first household. After the example viewership adjuster 514 rolls up the variables a first time, a donor household must match less variables than before.

The example viewership analyzer 512 accesses the actual demographic buckets that exist within the first household based on the demographics corrected by the example demographic corrector 110. For a first demographic bucket, the example viewership analyzer 512 determines a probability that a viewer in the first household viewed a media presentation by dividing a first time that a person in the donor household matching the first demographic bucket previously viewed the media presentation (e.g., based on panelist viewing history) by a second time that all members in the donor household previously viewed the media presentation. For example, an OTT impression was recorded for the first household on Thursday at 8 pm during The Big Bang Theory. The first household has three people with demographics corrected by the demographic corrector: Linda (F45), Mike (M44), and Eliza (F13). The example viewership assigner 112 determines the probability that Linda was watching the OTT device at the time of the impression by identifying donor data including viewing events associated with the demographic female ages 45-49, during primetime, with a situational comedy viewing genre in a household size of three in a home that has <=two adults and one child. In such examples, the example viewership assigner 112 identifies all viewing events for households with 3 people, <=2 adults, 1 child, and at least one person in the F45-49 demo for situation comedies during primetime. Within this subset, the example viewership assigner 112 calculates the probability of Linda viewing The Big Bang Theory by adding up the total minutes viewed (e.g., by someone in the F45-49 demographic bucket) and dividing by the total possible minutes viewed (e.g., all minutes that the program was on in the subset of households). The example viewership assigner 112 repeats this procedure for Mike and Eliza. Of course, the probability determinations may be calculated and stored in look-up tables for the first household (e.g., in the example OTT database 504) and for the donor households (e.g., in the example donor database 508) such that the probabilities need not be re-calculated over and over.

Thereafter, the example viewership analyzer 512 searches for a donor viewing event matching, for example, the time of day and genre of an impression, and the first household size, number of adults and number of children in the first household. If there is more than one possible match, the example viewership analyzer 512 ranks the first household members and the household members from all donor viewing events from highest probability of viewing the media presentation to lowest. In some examples, such as with households of five or more people, the number of donor viewing events is low as there are not many households with more than five members. In such examples, only the five members with the highest probabilities of viewing the media presentation (of both the donor and recipient homes) are used for matching. For each first household member, the example viewership analyzer 512 subtracts the probability that the household member viewed the media presentation from the probability that the corresponding donor household member viewed the media presentation, taking the absolute value of the difference. The example viewership analyzer 512 adds up the differences in probabilities across all household members. This process is repeated for all possible donor households/viewing events, and the example viewership analyzer 512 selects the donor viewing event with the smallest difference as the donor. In the case of a tie, the donor viewing event is chosen randomly.

When the example viewership analyzer 512 identifies a donor viewing event, the first household members are matched to donor household members with the same rank (e.g., ranked from highest probability of viewing the media presentation to lowest). For example, the first household member with the highest probability of viewing the media presentation is matched to the donor household member with the highest probability of viewing the media presentation. Thereafter, the viewing history (e.g., viewed or did not view the media presentation) from the matched donor household members is imputed onto the members of the first household, thereby assigning viewership for a particular impression of the media presentation. Accordingly, the example viewership analyzer 512 identifies instances of co-viewing (e.g., where more than one person is watching the same media presentation), thereby increasing the number of impressions. For example, where there is one impression per household, but two people are viewing, the example viewership analyzer 512 assigns the impression to two people.

Additionally or alternatively, the example HH member manager 510 of the example viewership assigner 112 utilizes the example OTT device impressions, times, media information, and corrected demographics from the example OTT database 504 and the television and PC times, media information, and viewing history information from the example donor database 508 to predict which HH member is using the example OTT device for each particular impression. The example HH member manager 510 historically extracts media and viewing history from the example donor database 508 to predict and/or match a HH member to a particular impression. In other words, media and viewing history from television and PC is a factor in determining OTT device viewership for similar media and/or during similar times in some examples.

The example HH member manager 510 also distinguishes particular OTT media. In some examples, media impressions that have media information associated therewith (e.g., from the example OTT database 504) are determined to correspond to media accessed using an application (e.g., advertisements embedded in video) running on OTT devices. In other examples, media impressions that have no media information associated therewith (e.g., absent in the example OTT database 504) are determined to correspond to media accessed via a webpage, homepage, channel, or other non-application media.

In some examples, multiple household members are to be assigned to a particular impression (e.g., multiple people are watching the same media at the same time). The example viewership analyzer 512 of the example viewership assigner 112 determines whether multiple HH members are to be assigned viewership in association with a single impression. In some examples, a backward elimination model is used to determine viewership (e.g., all HH members are accounted for and those HH members that are determined not to be viewers are eliminated). In some examples, a viewership adjuster 514 removes HH members that are determined not to be viewers. In some examples, the example viewership adjuster 514 adds HH members that are determined to be viewers.

In some examples, the example viewership analyzer 512 analyzes viewing and household information for a particular household (recipient) and uses panelist viewing (donor) (e.g., OTT media, television, and PC media viewing history) to assign probabilities of viewing to all household members. In some examples, the example viewership analyzer 512 determines a set of donor households based on the recipients' viewing and household characteristics to assign probabilities of viewing to all donor household members. In some examples, the example viewership analyzer 512 compares recipient households to donor households to find matches. In some examples, the matches are compared to a threshold probability. In some examples, viewership is assigned to recipient households based on the assigned viewership of a matched donor household.

In some examples, the example viewership analyzer 512 uses media information (e.g., program, time, etc.) and both household and individual characteristics to assign probabilities of viewing to each household member. In some examples, the example viewership analyzer 512 creates a statistical and/or machine learning model based on panelist viewing history and panelist household and individual characteristics. The example viewership analyzer 512 applies the model to a non-panelist household to assign viewership according to the probabilities of viewing and/or a predetermined threshold.

The example OTT viewership assigner 510 of the example viewership assigner 112 associates an impression to the HH member(s) (and his or her demographic information) that are determined to be viewers by the example viewership adjuster 514 and the example viewership analyzer 512. In some examples, panelist viewership based on television and/or PC media and timestamps is scaled and similarly assigned to OTT device viewership. In other examples, the example OTT viewership assigner 510 does not account for co-viewing and a single impression is associated with a corresponding single HH member. Other examples for accounting for co-viewing may be utilized without departing from the scope of the present disclosure. An example flow diagram illustrating an example implementation of the example viewership assigner 112 is described below in connection with FIG. 9.

Figure 6:
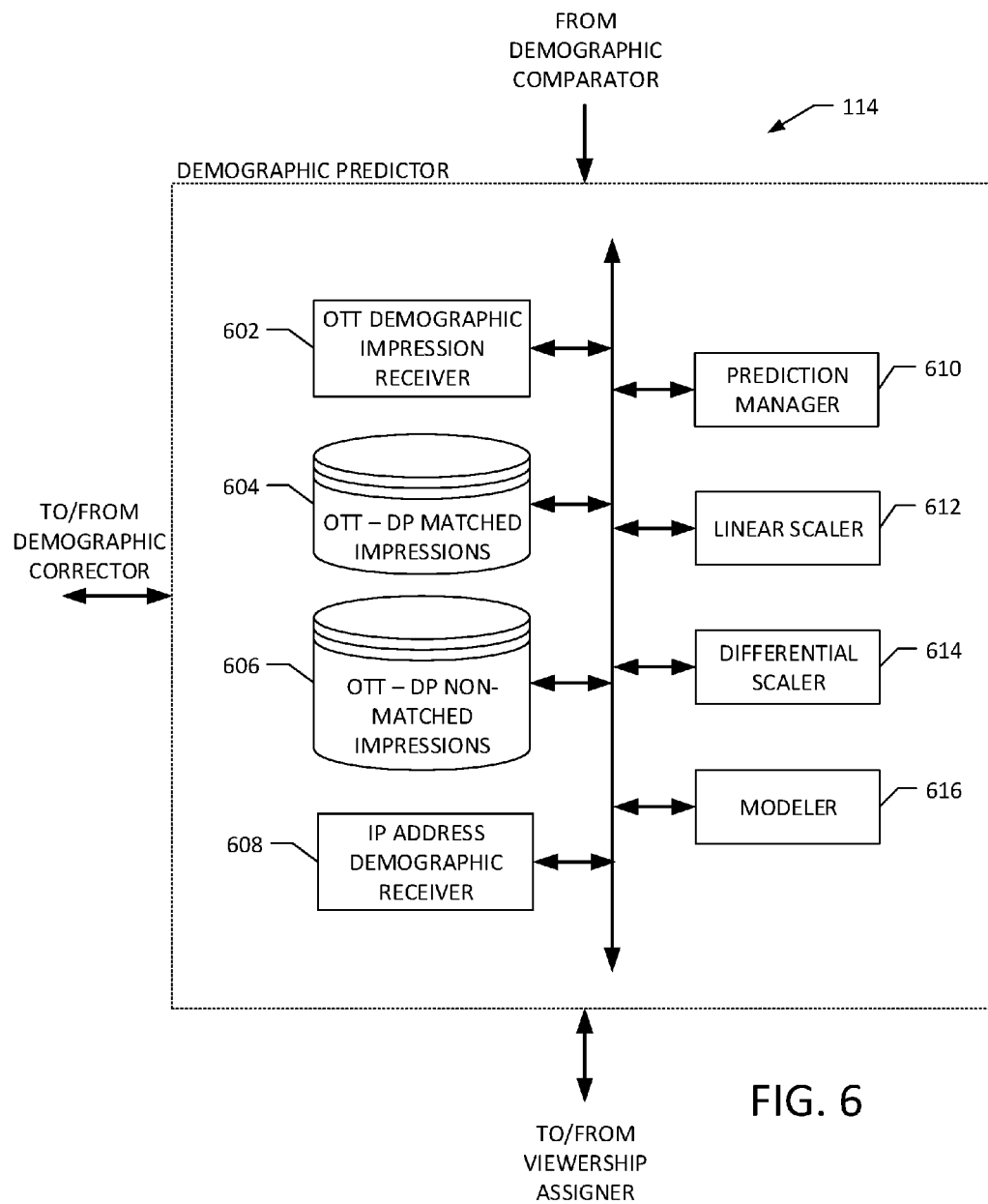
FIG. 6 illustrates an example demographic predictor of FIG. 1 to predict demographics for impressions not corrected by the example demographic corrector.

FIG. 6 illustrates an example demographic predictor of FIG. 1 to predict demographics for impressions not corrected by the example demographic corrector. In some examples, the example demographic comparator 107 (FIG. 2) does not match user data 204 (FIG. 2) from the example OTT device 102 (FIG. 2) to demographics 206 (FIG. 2) from the example database proprietor 104 (FIG. 2), and/or the example demographic corrector 110 (FIG. 4) does not match a panelist HH member to a DP household member, leaving a plurality of unknown demographic impressions. Therefore, to obtain corrected demographic impressions in these examples, the example demographic predictor 114 is utilized. In the illustrated example of FIG. 6, the example demographic predictor 114 predicts demographics for OTT-DP impressions not matched by the example demographic comparator 107.

The example demographic predictor 114 of the illustrated example of FIG. 6 includes an example OTT demographic impression receiver 602, an example OTT-DP matched impression database 604, an example OTT-DP non-matched impression database 606, an example IP address demographic receiver 608, an example prediction manager 610, an example linear scaler 612, an example differential scaler 614, and an example modeler 616.

In the illustrated example, to predict demographics for a particular impression, the example demographic predictor 114 receives the matched and non-matched demographic impressions from the example demographic comparator 107. Accordingly, the example demographic predictor 114 stores the matched demographic impressions in the example OTT-DP example matched impressions database 604. Similarly, the example demographic predictor 114 stores the non-matched demographic impressions in the example OTT-DP non-matched impressions database 606.

In the illustrated example, the prediction manager 610 utilizes the matched impressions from the example OTT-DP matched impressions database 604 to create predictions for non-matched demographic impressions from the example OTT-DP non-matched impressions database 606. In some examples, the demographics from the matched impressions are scaled to make up for missing demographics in the non-matched impressions.

In the illustrated example, the example demographic predictor 114 includes the linear scaler 612 to linearly scale demographics from the matched impressions (e.g., impressions from the example OTT device 102 matched with data from the example database proprietor 104, such as, for example, panelist data). The difference between the scaled demographics and the demographics from the matched impressions can be used to represent the demographics for the non-matched impressions. For example, if 95% of all the impressions are matched and 5% of all the impressions are not matched, the linear scaler 612 can scale the demographics across all demographic buckets from 95% to 100% (e.g., a demographic distribution of the demographics from the matched impressions can be multiplied by 100/95). For example, if the demographic distribution from the above example includes 95 twenty-five year old males associated with the matched impressions, 95 can be multiplied by 100/95 such that the demographic distribution now includes 100 twenty-five year old males (and the additional 5 twenty-five year old males can be used for the non-matched impressions). In such examples, it is presumed that the 5% of the impressions that are not matched are similar to the 95% of the impressions that are matched. The example linear scaler 612 applies a constant scaling factor to all demographic buckets.

In some examples, the constant scaling factor may be based on co-viewing, as determined by the example viewership assigner 112 (e.g., directly obtained from the example viewership assigner 112, received from the example viewership assigner 112 over the example network 122, etc.). For example, the example viewership assigner 112 accounts for co-viewing by identifying multiple household members associated with an impression, thereby counting multiple impressions from a single household impression. Accordingly, the number of impressions determined by the example viewership assigner 112 may be larger than the number of impressions the example OTT demographic impression receiver 502 (FIG. 5) initially receives. The example linear scaler 612 and/or the example differential scaler 614 generates a co-viewing rate ("CVR") based on the number of demographic impressions determined by the example viewership assigner 112 and the number of matched demographic impressions received by the example OTT demographic impression receiver 502 (e.g., the example viewership assigner 112 determines there are 1200 impressions when the example OTT demographic impression receiver 502 received 950 (e.g., out of 1000, such that 50 were not matched by the example demographic comparator 107 (FIG. 1)) such that the co-viewing rate may be CVR=1200/950=1.263). The example linear scaler 612 may scale the non-matched impressions (e.g., 50) based on the co-viewing rate (e.g., 1.263) to account for co-viewing (e.g., 63 impressions). In such examples, the example modeler 616 distributes the co-viewing scaled impressions across the various demographic buckets. Thereafter, the example linear scaler 612 combines the scaled up non-matched impressions (e.g., 63) and the number of impressions determined by the example viewership assigner 112 (e.g., 1263) and divides by the number of impressions determined by the example viewership assigner 112 (e.g., 1200) to obtain the constant scale factor.

In some examples, a unique audience value may be scaled by the example scaling factor. The unique audience value defines a distinct number of people who viewed a media presentation within a given period of time (e.g., identified in panelist data, calculated and/or adjusted after assigning viewership, etc.). The unique audience value may be different from the number of impressions as a unique individual may view the same media presentation multiple times (e.g., there may be a total of 500 impressions but only 255 unique people in a particular demographic bucket). The unique audience value can be scaled to account for co-viewing similarly to the non-matched impressions discussed above. The example linear scaler 612 may divide the number of impressions determined by the example viewership assigner 112 (e.g., 1200) by the unique audience value (e.g., 630) to determine a frequency (e.g., 1.90). Thereafter, the example linear scaler 612 may divide the combined scaled up non-matched impressions and number of impressions determined by the example viewership assigner 112 (e.g., 1263) by the frequency (e.g., 1.90) to determine a scaled unique audience value (e.g., 664). Of course, the non-matched impressions and the unique audience value may be scaled across the various demographic buckets (e.g., male ages 2-12, female ages 2-12, etc.) and/or across the aggregate of the demographic buckets.

In other examples in which the non-matched impressions cannot be accurately scaled linearly, the example demographic predictor 114 includes the example differential scaler 614 to differentially scale demographics from the matched impressions. For example, instead of applying a constant scaling factor to all demographic buckets, the example differential scaler 614 applies a variable scaling factor to each demographic bucket individually. In the illustrated example, the variable scaling factor is based on a match rate of panelists for a particular demographic bucket. For example, if 95% of the male panelists of ages 15-17 are matched by the example demographic comparator 107 (FIG. 1) (e.g., 5% of the male panelists of ages 15-17 are not matched), then the example differential scaler 614 applies a first scaling factor (e.g., 100/95) to the demographic bucket associated with males of ages 15-17. Similarly, if 80% of the female panelists of ages 40-44 are matched by the example demographic comparator 107 (e.g., 20% of the female panelists of ages 40-44 are not matched), then the example differential scaler 614 applies a second scaling factor (e.g., 100/80) to the demographic bucket associated with females of ages 40-44. As discussed above, the difference between the scaled demographics and the demographics from the matched impressions can be used to represent the demographics for the non-matched impressions. Thus, the panelist data match rate is associated with the scaling factor for each demographic bucket.

Additionally or alternatively, the prediction manager 610 receives the corrected demographics from the example demographic corrector 110 (FIG. 4) with the example OTT demographic impression receiver 602. In the illustrated example, the prediction manager 610 utilizes the corrected demographics from the example demographic corrector 110 to create predictions for unknown demographic impressions. In some examples, the corrected demographics are scaled to allow demographic associations to be made with the non-matched impressions. The corrected demographics may be scaled linearly or differentially as disclosed herein.

In some examples, demographic impressions can be matched to particular users via IP addresses. In some examples, an additional or alternate database proprietor (e.g., eXelate) provides demographics for a particular user based upon the user's IP address. In some examples, IP address-based demographic matching occurs when the example demographic comparator 107 cannot match the first set of data to the second set of data. In other examples, IP address-based demographic matching occurs in parallel or in replacement of the example demographic comparator 107. In the illustrated example, the example demographic predictor 114 includes the example IP address demographic receiver 608 to receive demographic data for a particular user based on the user's IP address. Thereafter, the example prediction manager 610 matches the non-matched impressions from the example OTT-DP non-matched impressions database 606 with the user demographic data based on the corresponding IP address of the user's OTT device. Additionally or alternatively, the example prediction manager 610 uses the IP address of a household modem, router, local-area-network, or other private network.

In the illustrated example, the example demographic predictor 114 includes the example modeler 616 to train a prediction model based on the matched impression scaling, the corrected demographic scaling, and/or the IP address demographic matching described above. In some examples, the example modeler 616 applies the prediction model to the example OTT-DP matched impressions from the example OTT-DP matched impressions database 604, the example OTT-DP non-matched impressions from the example OTT-DP non-matched impressions database 606, and/or the corrected OTT demographics from the example demographic corrector 110. In the illustrated example, the modeler 616 trains the prediction model using an AME panelist subset, and the prediction model is applied to aggregate demographic impressions. The aggregate demographic impressions may or may not include the AME panelist subset. In this manner, the example demographic predictor 114 predicts the demographics for non-matched impressions.

In examples disclosed herein, after the demographics have been corrected by the example demographic corrector 110 (FIG. 4), the viewership has been assigned by the example viewership assigner 112 (FIG. 5), and the unknown impressions are predicted by the example demographic predictor 114 (FIG. 6), the results are aggregated together by an example aggregator 118 (FIG. 1). Subsequently, the example apparatus 108 (FIG. 1) generates and/or exports a plurality of reports 120 with the assigned viewership and corrected/predicted demographics, to report demographic impressions with relatively higher accuracies from OTT devices.

While an example manner of implementing the example demographic corrector 110 of FIG. 1 is illustrated in FIG. 4, an example manner of implementing the example viewership assigner 112 of FIG. 1 is illustrated in FIG. 5, and an example manner of implementing the example demographic predictor 114 of FIG. 1 is illustrated in FIG. 6, one or more of the elements, processes and/or devices illustrated in FIGS. 4, 5, and 6 may be combined, divided, re-arranged, omitted, eliminated and/or implemented in any other way. Further, the example demographic impression receiver 402, the example panelist database 404, the example DP database 406, the example household manager 408, the example comparator 410, the example analyzer 412, the example adjuster 414, the example model trainer 416, the example model applier 418, and/or, more generally, the example demographic corrector 110 of FIG. 4; the example OTT demographic impression receiver 502, the example OTT database 504, the example donor database 508, the example household member manager 510, the example OTT viewership assigner 510, the example viewership analyzer 512, the example viewership adjuster 514, the example donor data receiver 506, and/or, more generally, the example viewership assigner 112 of FIG. 5; and/or the example OTT demographic impression receiver 602, the example OTT-DP matched impression database 604, the example OTT-DP non-matched impression database 606, the example prediction manager 610, the example linear scaler 612, the example differential scaler 614, the example modeler 616, the example IP address demographic receiver 608, and/or, more generally, the example demographic predictor 114 of FIG. 6 may be implemented by hardware, software, firmware and/or any combination of hardware, software and/or firmware. Thus, for example, any of the example demographic impression receiver 402, the example panelist database 404, the example DP database 406, the example household manager 408, the example comparator 410, the example analyzer 412, the example adjuster 414, the example model trainer 416, the example model applier 418, and/or, more generally, the example demographic corrector 110 of FIG. 4; the example OTT demographic impression receiver 502, the example OTT database 504, the example donor database 508, the example household member manager 510, the example OTT viewership assigner 510, the example viewership analyzer 512, the example viewership adjuster 514, the example donor data receiver 506, and/or, more generally, the example viewership assigner 112 of FIG. 5; and/or the example OTT demographic impression receiver 602, the example OTT-DP matched impression database 604, the example OTT-DP non-matched impression database 606, the example prediction manager 610, the example linear scaler 612, the example differential scaler 614, the example modeler 616, the example IP address demographic receiver 608, and/or, more generally, the example demographic predictor 114 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example demographic impression receiver 402, the example panelist database 404, the example DP database 406, the example household manager 408, the example comparator 410, the example analyzer 412, the example adjuster 414, the example model trainer 416, the example model applier 418, and/or, more generally, the example demographic corrector 110 of FIG. 4; the example OTT demographic impression receiver 502, the example OTT database 504, the example donor database 508, the example household member manager 510, the example OTT viewership assigner 510, the example viewership analyzer 512, the example viewership adjuster 514, the example donor data receiver 506, and/or, more generally, the example viewership assigner 112 of FIG. 5; and/or the example OTT demographic impression receiver 602, the example OTT-DP matched impression database 604, the example OTT-DP non-matched impression database 606, the example prediction manager 610, the example linear scaler 612, the example differential scaler 614, the example modeler 616, the example IP address demographic receiver 608, and/or, more generally, the example demographic predictor 114 of FIG. 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example demographic corrector 110 of FIG. 4, the example viewership assigner 112 of FIG. 5, and/or the example demographic predictor 114 of FIG. 6 may include one or more elements, processes and/or devices in addition to, or instead of, those illustrated in FIGS. 4, 5, and/or 6, and/or may include more than one of any or all of the illustrated elements, processes and devices.

Figure 10:
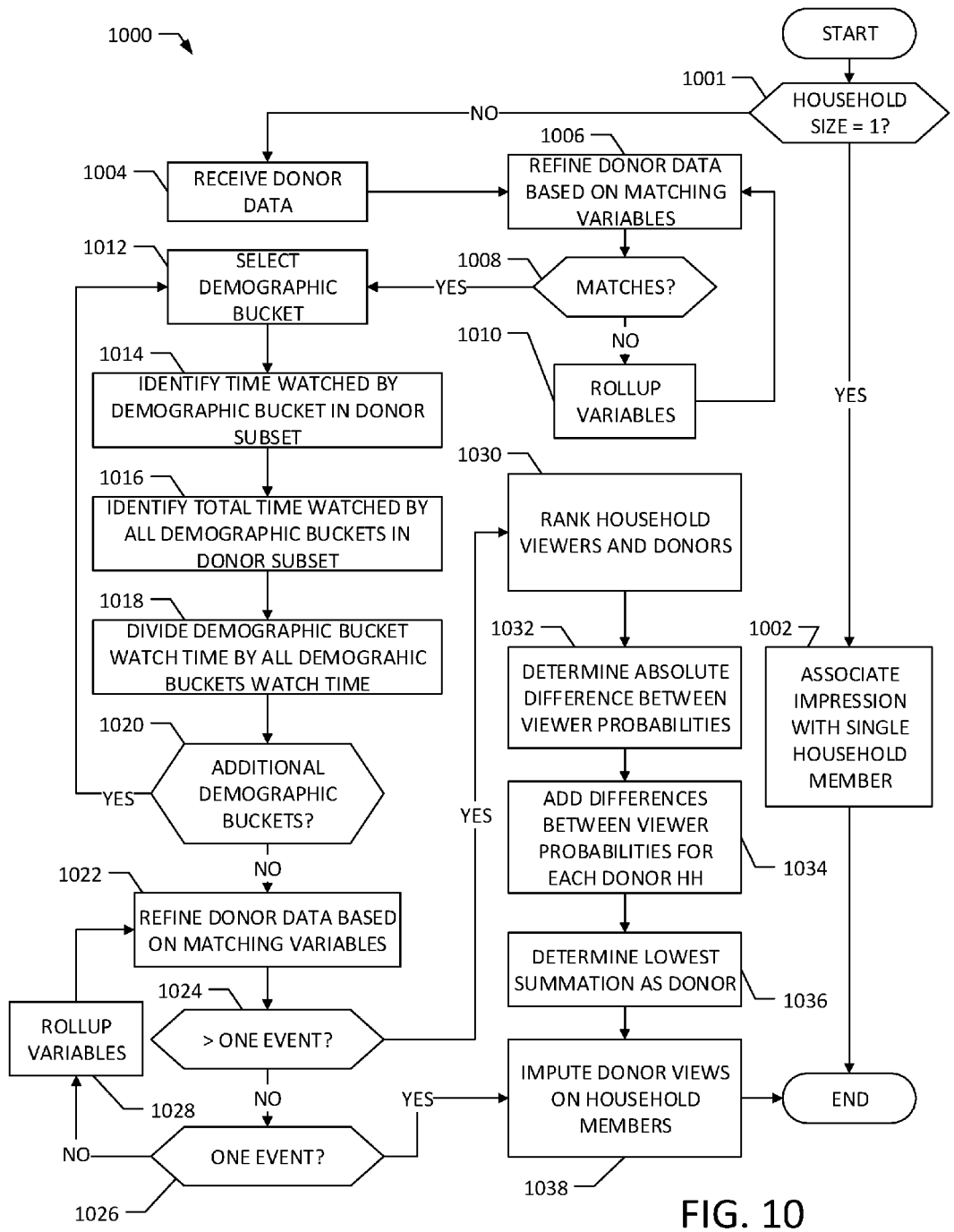
FIG. 10 is a flow diagram representative of example machine readable instructions that may be executed to implement the example viewership assigner of FIGS. 1 and 5.
Figure 11:
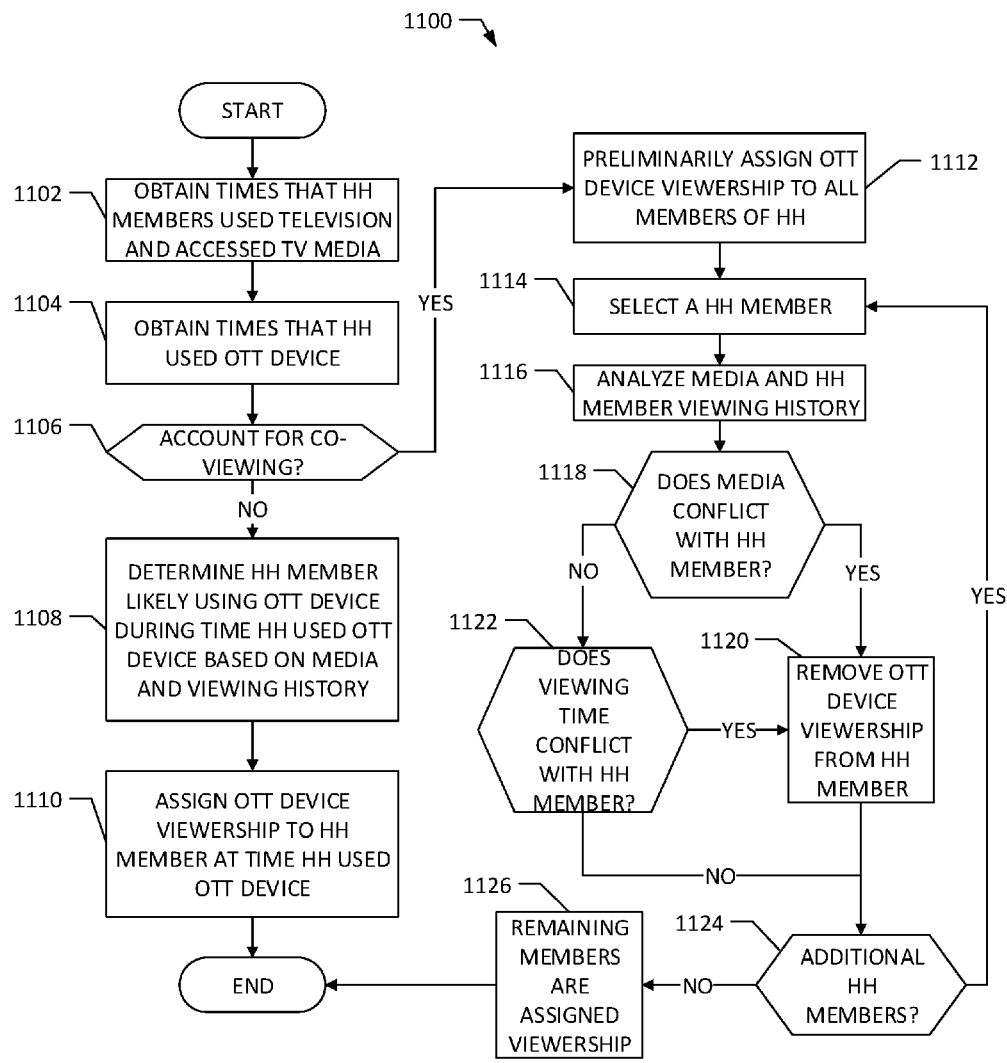
FIG. 11 is another flow diagram representative of example machine readable instructions that may be executed to implement the example viewership assigner of FIGS. 1 and 5.
Figure 12:
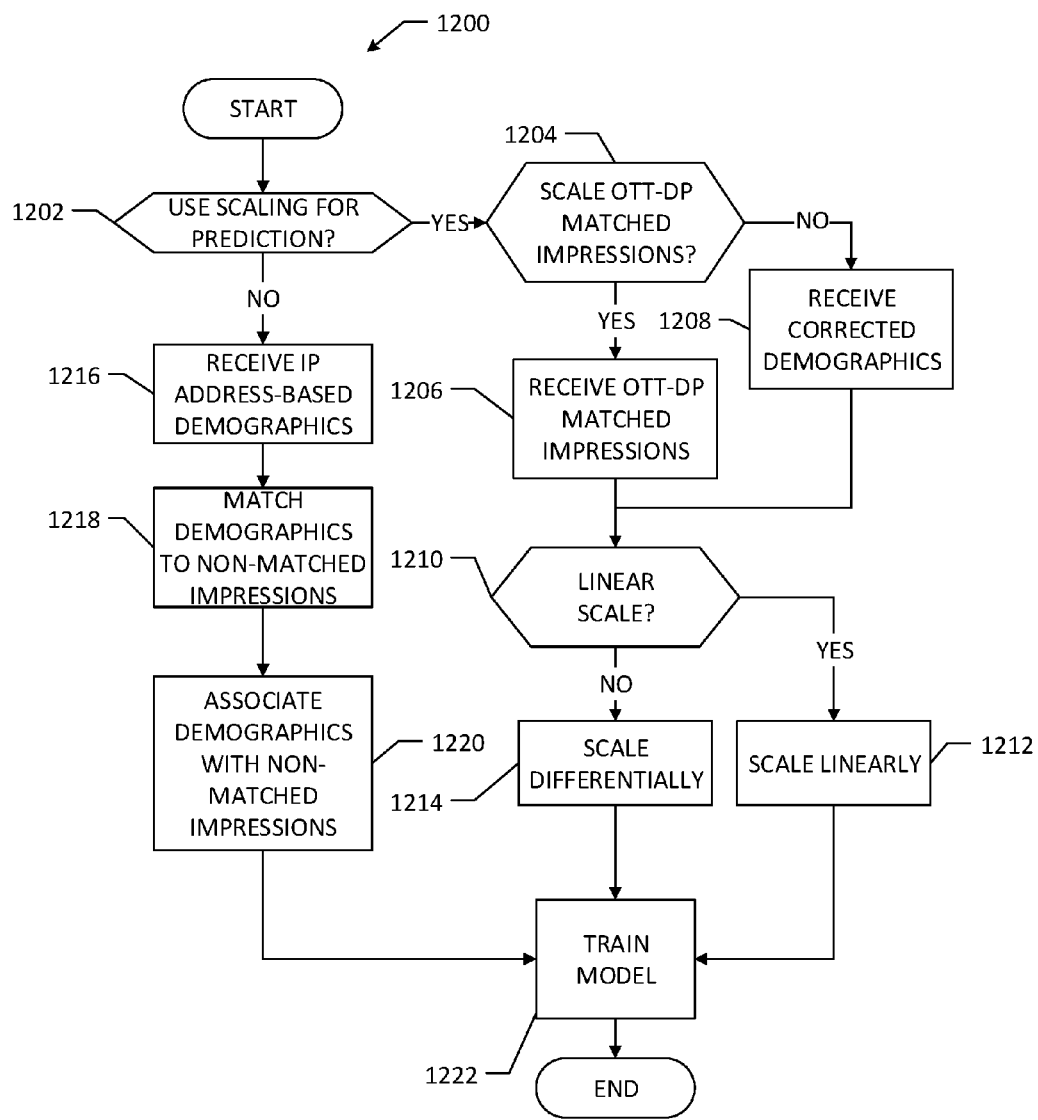
FIG. 12 is a flow diagram representative of example machine readable instructions that may be executed to implement the example demographic predictor of FIGS. 1 and 6.

Flowcharts representative of example machine readable instructions for implementing the example demographic corrector 110 of FIGS. 1 and 4 to correct demographics associated with OTT-DP matched impressions are shown in FIGS. 7, 8, and 9A-9C. Flowcharts representative of example machine readable instructions for implementing the example viewership assigner 112 of FIGS. 1 and 5 to assign viewership to a corresponding single impression based on the corrected demographics from the example demographic corrector 110 are shown in FIGS. 10-11. A flowchart representative of example machine readable instructions for implementing the example demographic predictor 114 of FIGS. 1 and 6 to predict demographics for the example OTT-DP impressions that were not matched is shown in FIG. 12. In these examples, the machine readable instructions comprise programs for execution by a processor such as the processor 1112 shown in the example processor platform 1100 discussed below in connection with FIG. 13. The programs may be embodied in software stored on a tangible computer readable storage medium such as a CD-ROM, a floppy disk, a hard drive, a digital versatile disk (DVD), a Blu-ray disk, or a memory associated with the processor 1112, but the entire programs and/or parts thereof could alternatively be executed by a device other than the processor 1112 and/or embodied in firmware or dedicated hardware. Further, although the example programs are described with reference to the flowcharts illustrated in FIGS. 7, 8A-8C, 9, and 10, many other methods of implementing the example demographic corrector 110, the example viewership assigner 112, and/or the example demographic predictor 114 may alternatively be used. For example, the order of execution of the blocks may be changed, and/or some of the blocks described may be changed, eliminated, or combined.

As mentioned above, the example processes of FIGS. 7, 8, 9A-9C, 10, 11, and 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7, 8, 9A-9C, 10, 11, and 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 7:
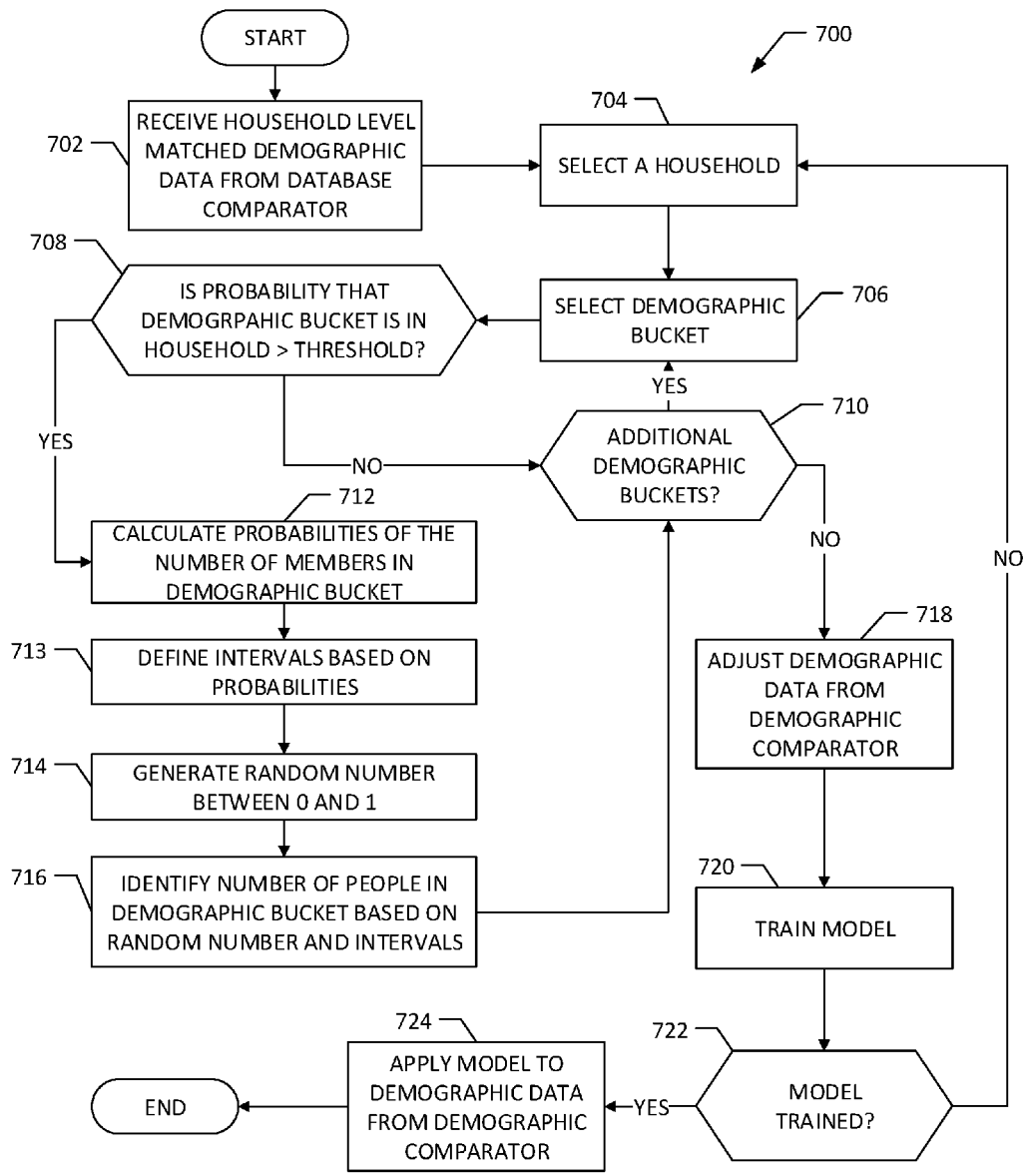
FIG. 7 is a flow diagram representative of example machine readable instructions that may be executed to implement the example demographic corrector of FIGS. 1 and 4.

FIG. 7 is a flow diagram representative of example machine readable instructions that may be executed to implement the example demographic corrector 110 of FIGS. 1 and 4. The example program 700 begins at block 702 at which the example demographic impression receiver 402 receives household-level matched OTT-DP impressions matched by the example demographic comparator 107 (FIG. 1). The example demographic impression receiver 402 stores demographic data associated with each household in the example DP database 406. The example panelist database 404 receives panelist demographic data associated with panelist households from the example panelist database 116 (FIG. 1).

From the example demographic data of household stored in the example DP database 406, the example household manager 408 selects a household (block 704). The example demographic corrector 110 trains a model using a training set of household data from a number of households. Thereafter, the example demographic corrector 110 applies the trained model to all the households to correct demographics stored by the example database proprietor.

Once a household has been selected, the example household manager 408 identifies a demographic bucket to which a household member associated with the demographic data from the example database proprietor 104 belongs (block 706). For example, from the example demographic data in the example DP database 406, the example household manager 408 selects a first demographic bucket (e.g., male ages 2-12) to determine whether a particular member from the selected household is associated with the first demographic bucket. As discussed above, each demographic bucket has an independent binary model associated therewith.

The example household manager 408 identifies the probability that the first demographic bucket exists (e.g., there is at least one household member of that demographic) in the particular household based on the example model corresponding to the first demographic bucket (e.g., 80% likelihood the first demographic bucket exists in the selected household). In some examples, the models corresponding to each demographic bucket are trained using panelist data to minimize the differences between panelist data (e.g., truth) and the probabilities that the demographic buckets exist in a particular household. In such examples, the models are trained until the differences are minimized. Thereafter, subsequent demographic data corresponding to non-panelists may be adjusted, predicted, or otherwise corrected using these models. As described herein, machine learning algorithms, such as, for example, CART, log it, ctree, random forest, neural networks, or bootstrap aggregate decision trees are used to determine the probabilities that a demographic bucket is in a household. Other known methods of determining the probabilities that a demographic bucket is in a household may be used.

To determine whether a particular demographic exists in a particular household, the example comparator 410 determines whether the probability that the first demographic bucket is within the household satisfies a first threshold (e.g., 67%) (block 708). If the probability that the first demographic bucket is within the household is not above the first threshold (block 708: NO), then control proceeds to block 710. At block 710, the example household manager 408 determines if there are additional demographic buckets to test. If there are additional demographic buckets to test (block 710: YES), control returns to block 706. In some examples, the first threshold is consistent across all demographic buckets. In the illustrated example, each demographic bucket has a unique threshold (e.g., the first threshold is 0.67 for males between the ages of 18 and 20 and the first threshold is 0.6 for females between the ages of 30-34). Accordingly, the first threshold may vary based on the demographic bucket. In some examples, the first threshold is based on a probability distribution of panelists within panelist households. For example, there may be a female aged between 30 and 34 in 60% of panelist households, so the first threshold for females aged between 30 and 34 may be set to 0.6. Of course, the first threshold may be determined using other known methods, such as, an output of a machine learning algorithm, based on statistical analysis, etc.

If the probability that the first demographic bucket is within the household is above the first threshold (block 708: YES), then control proceeds to block 712. At block 712, the example analyzer 412 calculates probabilities for the number of individuals within the first demographic bucket. The example analyzer 412 determines conditional probabilities for the number of members (e.g., one member, two members, three members, etc.) within the first demographic bucket based on demographic distributions of panelists within panelist households. For example, the conditional probability may be the probability that there is one member in the first demographic bucket on the condition that there is at least one member in the first demographic bucket (e.g., that the first demographic bucket is in the household (block 708)). In such examples, the probability that there is one person in the first demographic bucket may be 0.70, the probability that there are two people in the first demographic bucket may be 0.15, the probability that there are three people in the first demographic bucket may be 0.15. Of course, various other probability distributions may be used as the distribution may be based on the outcomes (e.g., number of people in the demographic bucket) and the probability of the occurrences of the outcomes.

In some examples, the example model trainer 416 train models using machine learning algorithms to determine the conditional probabilities for the number of members (e.g., one member, two members, three members, etc.) within the demographic buckets. As discussed herein, the models may be trained using based panelist information within panelist households. In such examples, the models are trained using the panelist information as truth to minimize the difference between the calculated probabilities for the number of members in a demographic bucket and the number of panelists in demographic buckets in panelist homes. The example models are trained until such differences are minimized. Thereafter, subsequent demographic data corresponding to non-panelists may be adjusted, predicted, or otherwise corrected using these models. As described herein, machine learning algorithms, such as, for example, CART, log it, ctree, random forest, neural networks, or bootstrap aggregate decision trees are used to determine the conditional probabilities of the number of members within each demographic bucket (e.g., determined via block 708). Other known methods of determining the probabilities that a demographic bucket is in a household may be used.

In some examples, the process of block 712 is dependent on the process of block 708. In some examples, the processes of blocks 708 and blocks 712 may be combined to determine the number of people in demographic buckets that exist within a household in a single step. In such examples, the example model trainer 416 creates a single model using a machine learning algorithm such as, for example, CART, log it, ctree, random forest, neural networks, or bootstrap aggregate decision trees, etc., to directly predict which demographic buckets exist within a household and how many members are in each demographic bucket.

In the illustrated example, the example analyzer 412 defines intervals between zero and one based on the probabilities calculated at block 712 (block 713). For example, the example analyzer 412 defines a first interval from 0 to 0.69 corresponding to the probability that there is one person in the first demographic bucket (e.g., 0.7), defines a second interval from 0.7 to 0.84 corresponding to the probability that there are two people in the first demographic bucket (e.g., 0.15), and defines a third interval from 0.85 to 1 corresponding to the probability that there are three people in the first demographic bucket (e.g., 0.15). Of course, any number of intervals may be defined to accommodate the number of outcomes (e.g., one person, two people, three people, four people, etc.). The example analyzer 412 generates a random number Rn between 0 and 1 (block 714). The example comparator 410 compares the generated random number Rn to the defined intervals and identifies the number of people in the demographic bucket based on which interval the generated random number Rn falls into (block 716). For example, if $0 \leq Rn \leq 0.69$, the example comparator 410 identifies that there is one person in the first demographic bucket, if $0.7 \leq Rn \leq 0.84$, the example comparator 410 identifies that there are two people in the first demographic bucket, and if $0.85 \leq Rn \leq 1$, the example comparator 410 identifies that there are three people in the first demographic bucket. Thereafter, control returns to block 710.

Alternatively, the example comparator 410 may determine, for each number of members (e.g., one, two, three, etc.), whether the probability that the number of members are in the first demographic bucket satisfies a second threshold (e.g., 75%). For example, when the probability that there is one person in the first demographic bucket is 0.80 and the probability that there are two people in the first demographic bucket is 0.15, only the probability that there is one person in the first demographic bucket satisfies the second threshold of 0.75. Therefore, if the probability that the number of members are in the first demographic bucket is above the second threshold, then the example analyzer 412 determines that that number of members (e.g., one) is within the first demographic bucket (block 716) and control returns to block 710. If there are multiple numbers of members having probabilities satisfying the second threshold (e.g., second threshold is 30%, the probability of two members in the first demographic bucket is 35% and the probability of one member in the first demographic bucket is 40%), the second threshold may be adjusted (e.g., increased to 36%). Additionally or alternatively, the example analyzer 412 identifies the number of members having the highest probability (e.g., 40% probability that one member is in the first demographic bucket) as being in the first demographic bucket. For any number of members having a probability of being in the first demographic bucket lower than the second threshold, these number of members are excluded from being in the first demographic bucket and control returns to block 710. In some examples, the second threshold is the same across all demographic buckets. In the illustrated example, each demographic bucket has a unique threshold (e.g., the second threshold is 0.75 for males between the ages of 18 and 20 and the second threshold is 0.7 for females between the ages of 30-34).

At block 710, if there are no additional demographic buckets to test (block 710: NO), the control proceeds to block 718. In some examples, the example model trainer may utilize a machine learning algorithm to create a corrective model to adjust the demographic data received from the demographic comparator 107. In such examples, the example adjuster 414 adjusts the demographic data received from the example database proprietor 104 based on the demographic buckets identified in block 708 and the number of members in each demographic bucket identified in block 716 (block 718). The example model trainer 416 trains the corrective model based on the adjustments made in block 718 (block 720). If a sufficient amount of households have not been used to train the example model (block 722: NO), control returns to block 704. The sufficient amount of households may be determined to minimize the differences between the corrected demographics and a panelist distribution, for example.

This process may continue for a number of training iterations until the example model performs accurately on unseen data (e.g., machine learning process). The example model trainer 416 may utilize any machine learning algorithm, such as, for example, CART, log it, ctree, random forest, neural networks, or bootstrap aggregate decision trees, etc. After the model has been trained by a sufficient amount of households (block 722: YES), the example model applier 418 applies the trained model to the remaining demographic data from the example database proprietor 104 matched by the example demographic comparator 107 (block 724). In some examples, the example model applier 418 applies the trained model to new data received after the model(s) have been trained. For example, once the models described above have been trained (e.g., perform accurately on unseen tasks), the example model applier 418 can apply new data to the models to correct the same. Additionally or alternatively, the example models may be adjusted using the techniques described herein after being trained to increase the accuracy of the models as new data is provided. Thereafter, example program 700 ceases.

Figure 8:
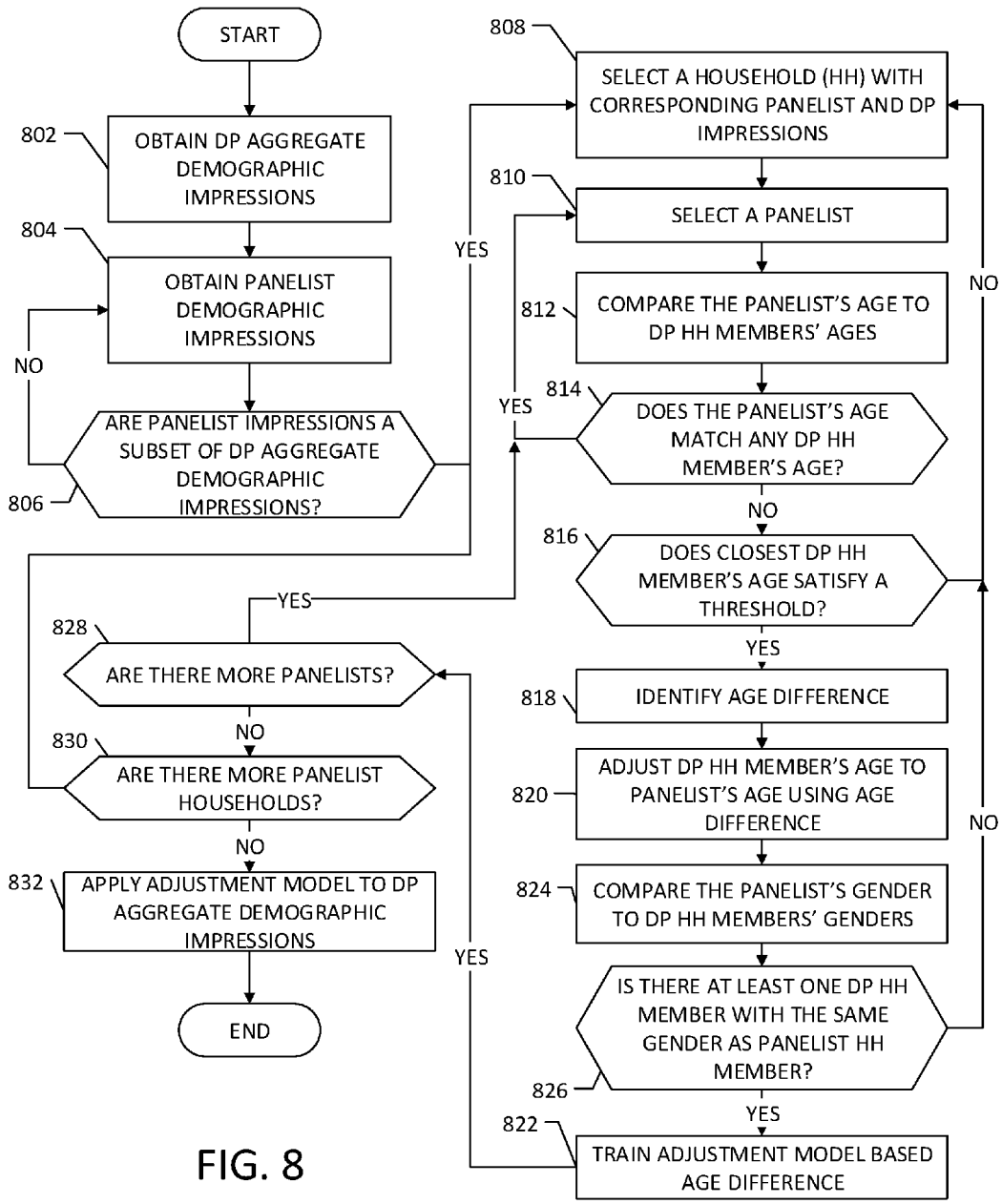
FIG. 8 depicts another flow diagram representative of example machine readable instructions that may be executed to implement the example demographic corrector of FIGS. 1 and 4.

FIG. 8 is another flow diagram representative of example machine readable instructions that may be executed to implement the example demographic corrector 110 of FIGS. 1 and 4. The example program 800 begins at block 802 at which the example OTT demographic impression receiver 402 (FIG. 4) receives or otherwise obtains aggregate demographic impressions from the example database proprietor 104 (FIG. 1) (block 802). The example OTT demographic impression receiver 402 further receives panelist demographic impressions from the example panelist database 116 (FIG. 1) (block 804). For example, the example demographic impression receiver 402 receives matched OTT-DP impressions matched by the example demographic comparator 107 (FIG. 1). In some examples, aggregate demographic impressions are unavailable. In such examples, demographic impressions are created with the example viewership assigner 114, as disclosed herein.

In examples where aggregate demographic impressions are available, aggregate demographic impressions received or otherwise obtained from the example database proprietor 104 are stored in the temporary database proprietor database 406 (FIG. 4). Similarly, panelist demographic impressions from the example panelist database 116 (FIG. 1) are stored in the temporary panelist database 404 (FIG. 4). In some examples, the panelist demographic impressions are a subset of the aggregate database proprietor demographic impressions. As such, the example household manager 408 determines whether the panelist demographic impressions are indeed a subset of the aggregate database proprietor demographic impressions (block 806). If the example household manager 408 determines that the panelist impressions are a subset of the aggregate database proprietor demographic impressions (block 806: YES), control proceeds to block 808. If the example household manager 408 determines that the panelist impressions are not a subset of the aggregate database proprietor demographic impressions (block 806: NO), control returns to block 804, where additional panelist impressions are received. This cycle repeats until the panelist impressions are a subset of the aggregate database proprietor demographic impressions.

In some examples, the example OTT-DP matched impressions provide person-level characteristics (e.g., demographics) that the example demographic corrector 110 matches to panelists on an individual level (e.g., at a user level). In these examples, the example demographic corrector 110 identifies the true error between the demographics of the example OTT-DP matched impressions and the panelist impressions. In other examples, the example OTT-DP matched impressions do not provide user-level demographics, for privacy reasons. In such other examples, the example OTT-DP matched impressions provide household-level demographics that the example demographic corrector 110 uses to match AME panelists to DP household members and to identify errors in the household-level demographics. In some instances, this results in misattribution because the matching between panelists and DP household members may not be correct.

In other examples, to match DP household-level demographics to AME panelist demographics, the example household manager 408 (FIG. 4) selects a household with corresponding panelist and database proprietor demographic impressions (block 808). In some examples, the example panelist database 404 stores household demographic impressions for each panelist. In some examples, the example DP database 406 stores household demographic impressions related to a corresponding panelist household (because the panelists are a subset of the database proprietor users). In some examples, a panelist household demographic impression may be matched to a database proprietor household demographic impression via the example matched ID discussed in detail above. Thereafter, the example household manager 408 selects a panelist from the panelist household (block 810). In some examples, once a panelist is selected by the example household manager 408, the example household manager 408 sends the age of the panelist to the example comparator 410. In additional examples, the example household manager 408 sends the corresponding database proprietor household demographic impressions to the example comparator 410. The example comparator 410, in some examples, compares the panelist's age to all members of the household detailed by the database proprietor household demographic impressions (e.g., one member of a panelist household is compared to all members of the corresponding database proprietor household) (block 812). As disclosed by the examples herein, this is done to detect errors in the database proprietor's demographic impressions.

Once the age comparison is made, the example comparator 410 sends the comparison data to the example analyzer 412. The example analyzer 412 analyzes the age comparison data and at least determines if the panelist's age is an exact match to any of the database proprietor household members' ages (block 814), if the closest database proprietor household member's age satisfies a threshold (e.g., within three years of the panelist's age) (block 816), and/or if there is at least one database proprietor household member with the same gender as the panelist (block 824).

In some examples, if the example analyzer 412 determines that the panelist's age is an exact match to any of the database proprietor household members' ages (block 814: YES), then the example analyzer 412 determines that the database proprietor demographic impression is correct in terms of age and control returns to block 810 to select another panelist from the panelist household. However, often the panelist's age does not match any of the database proprietor household members' ages (block 814: NO).

In some examples, if the example analyzer 412 determines that the panelist's age does not match any of the database proprietor household members' ages exactly, the example analyzer 412 compares the panelist's age to the closest matching database proprietor household member's age. If the example analyzer 412 determines that the closest matching database proprietor household member's age is within the threshold (e.g., a variance of ±3 years, +10 years, etc.) (block 816: YES), control proceeds to block 818. However, if the closest matching database proprietor household member's age is not within the threshold (block 816: NO), then the example analyzer 412 determines that the database proprietor demographic impression is not a correct match to the panelist's demographic impression and a different panelist household impression may be compared to its corresponding database proprietor's household demographic impressions (e.g., control returns to block 808).

In some examples, the threshold discussed above is meant to identify incorrect recorded demographic information. Incorrect demographic information may be recorded for a number of reasons including, without limitation, disinterested user input, minimum demographic requirements, accident, user input error, recording error, or the like. Example methods and apparatus disclosed herein identify such incorrect recorded demographic information from a database proprietor and adjust the incorrect demographic information with panelist demographic information.

At block 818, the example analyzer 412 determines that the database proprietor demographic impression is a correct match to the panelist's demographic impression and determines the age difference between the matching members. Thereafter, the example analyzer 412 sends the impression data and an age correction signal to the example adjuster 414. In some examples, the example adjuster 414, replaces a database proprietor's incorrectly recorded age with a panelist's correctly recorded age (block 820). In other examples, the example adjuster 414 only stores the age difference for future applications.

Additionally or alternatively in other examples, the example comparator 410 compares a panelist's gender to the gender of the household members' genders as recorded by the database proprietor. (Block 824). In many examples, gender is less misattributed than age. Therefore, in the examples described herein, the example analyzer 412 determines whether there is at least one database proprietor household member with the same gender as the panelist. (Block 826). If there is at least one database proprietor household member with the same gender as the panelist (block 826: YES), then the example analyzer 412 determines that the database proprietor demographic impression is a correct match to the panelist's demographic impression and control proceeds to block 822. However, if there is no database proprietor household member with the same gender as the panelist (block 826: NO), then the example analyzer 412 determines that the database proprietor demographic impression is not a correct match to the panelist's demographic impression and control returns to block 808. Accordingly, in some examples, if there is at least one incorrect match among household members, then it is presumed that the household-level impressions between the panelists and the database proprietor do not match. (Blocks 816, 826: NO). As such, the example program 800 moves to the next household.

When there is at least one database proprietor household member with the same gender as the panelist (block 826: YES), the example adjuster 414 sends the age adjustment data identified in block 818 and block 820 to the example model trainer 416, in some examples. Based on the panelists' age adjustment data (from block 818 and block 820), the example model trainer 416 trains an adjustment model (block 822). After many iterations of the example program 800, the trained model is applied to the remaining set of demographic impressions that are not the panelist subset. In this way, the example methods and apparatus of the present disclosure can correct age variations amongst all OTT device users. Of course, while the examples disclose herein refer to age and OTT devices, different demographic data and devices may be utilized without departing from the scope of the present disclosure.

When the example analyzer 412 determines a correct match between the database proprietor demographic impression and the panelist's demographic impression for both age and gender, the example analyzer 412 determines whether there are more panelists in a given household. If the example analyzer 412 determines that there are more panelists in the given household (block 828: YES), control returns to block 810. If there are no more panelists in the household (block 828: NO), control proceeds to block 830. At block 830, the example analyzer 412 determines whether there are any additional panelist households. If the example analyzer 412 determines that there are more panelist households (block 830: YES), control returns to block 808. However, if the example analyzer 412 determines that there are no more panelist households (block 830: NO), control proceeds to block 832.

At block 832, the example program 800 has ran for a number of iterations. Therefore, the example model trainer 416 has trained the adjustment model for the same number of iterations using the age adjustments as a learning (e.g., training) dataset. Accordingly, the adjustment model is ready to be applied to the aggregate demographic impressions (or remainder thereof if the demographics of the database proprietor panelist subset registrants have been corrected by the example program 800). With reference to FIG. 4, the example model applier 418 receives the adjustment model from the example model trainer 416. Additionally, the example model applier 418 (FIG. 4) receives the aggregate database proprietor demographic impressions from the example DP database 406 (FIG. 4).

As discussed above, the adjustment model has the ability to perform accurately on new, unseen examples/tasks (e.g., the aggregate demographic impressions for the example DP database 406) after having experienced a learning dataset (e.g., the iterative age adjustments for the panelist subset of the aggregate demographic impressions). In this manner, example model applier 418 (FIG. 4) applies the adjustment model to the entirety of the database proprietor demographic impressions to correct the ages (block 832). In some examples, the example model applier 418 (FIG. 4) outputs the corrected aggregate demographic impressions. Thereafter, the example program 800 ceases. Of course, while the example program 800 discusses age identification, correction, model training, etc., other demographic information may be corrected similarly using the example program 800. Thus, the example program 800 should not be limited in this manner.

Figure 9A:
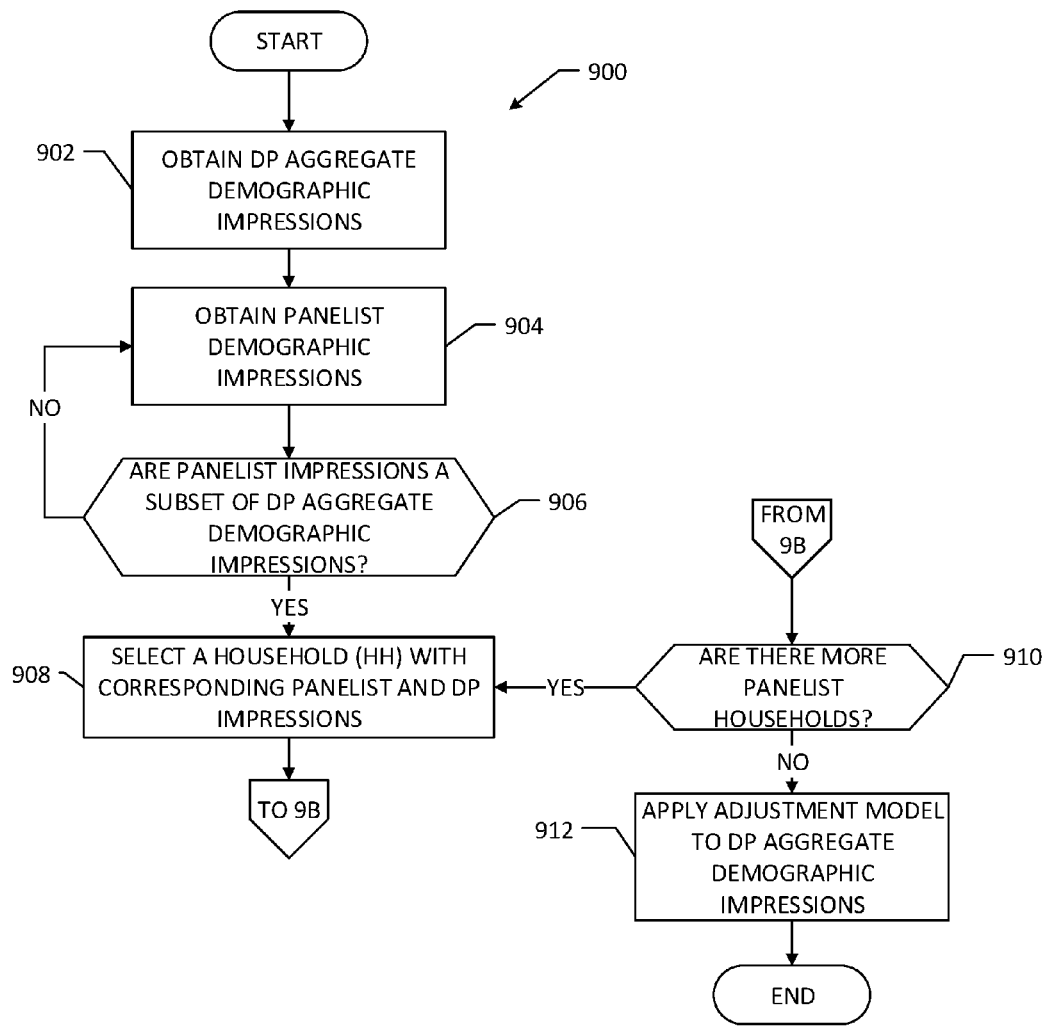
FIGS. 9A-9C depict another flow diagram representative of example machine readable instructions that may be executed to implement the example demographic corrector of FIGS. 1 and 4.
Figure 9B:
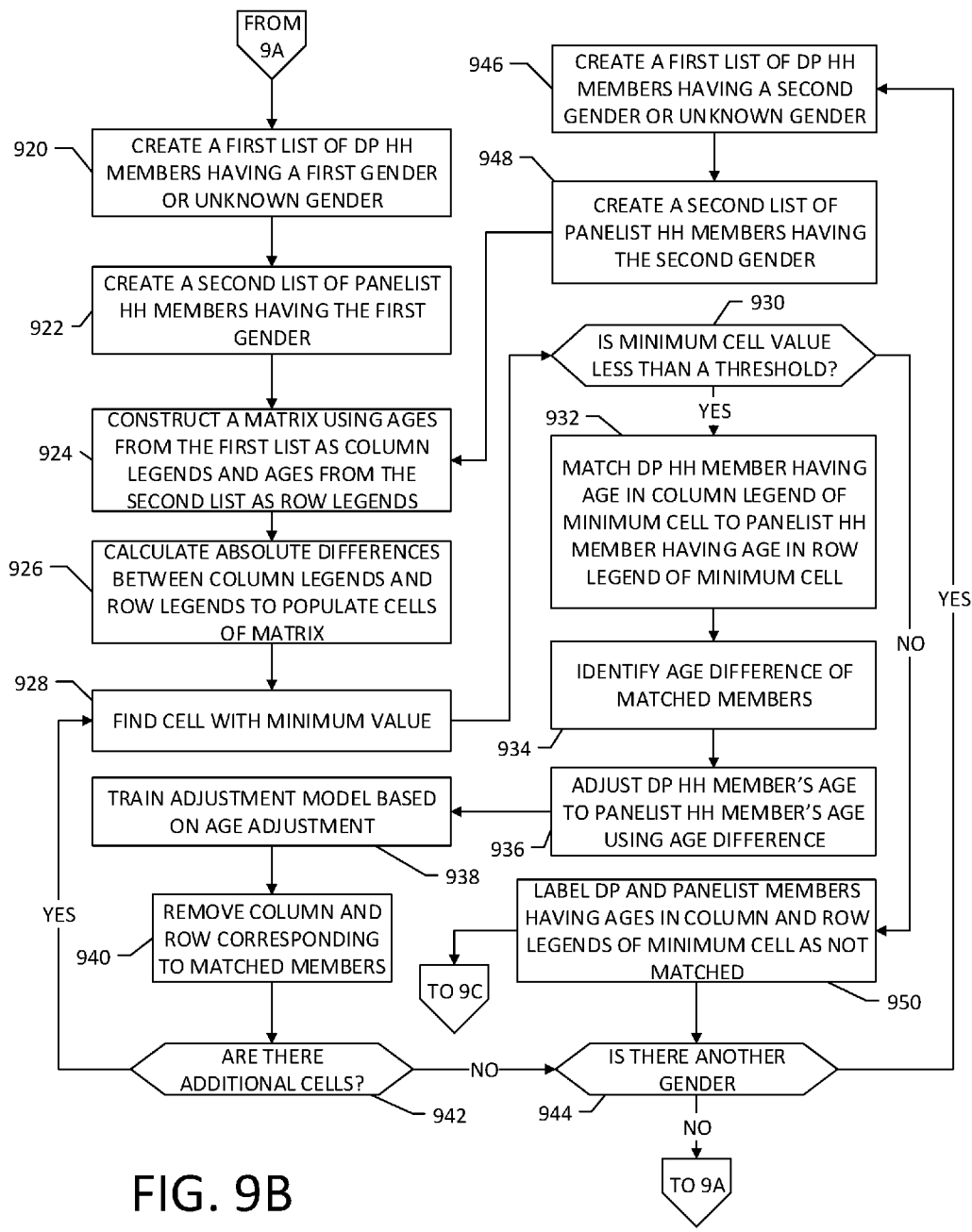
Figure 9C:
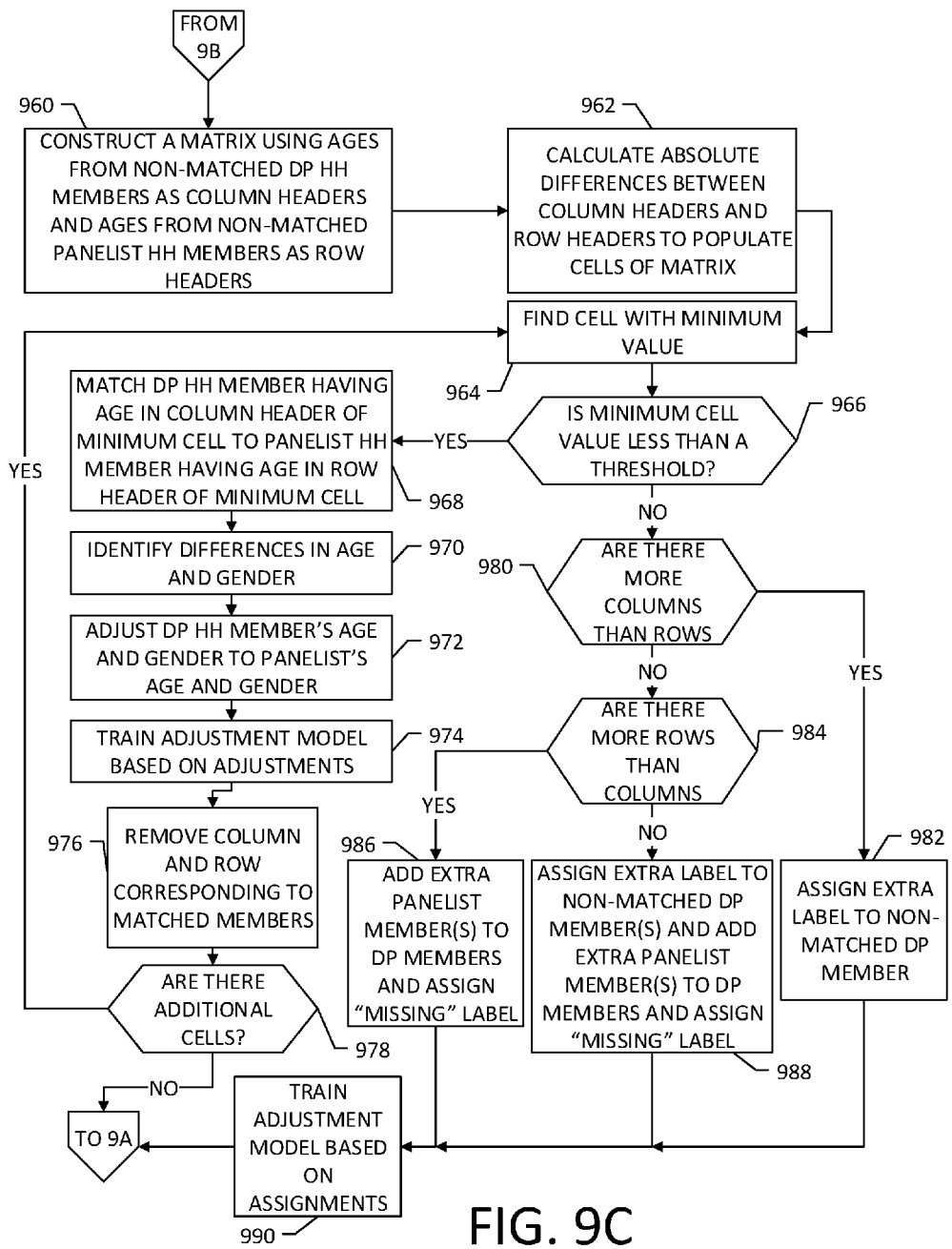

FIGS. 9A-9C depict another flow diagram representative of example machine readable instructions that may be executed to implement the example demographic corrector 110 of FIGS. 1 and 4. The example program 900 begins at block 902. The example demographic impression receiver 402 receives or otherwise obtains aggregated demographic impressions from the example database proprietor 104 (FIG. 1) (block 902) and panelist demographic impressions from the example panelist database 116 (FIG. 1) (block 904). In some examples, aggregate demographic impressions are unavailable. In such examples, demographic impressions are created with the example viewership assigner 114, as disclosed herein.

In some examples, the example demographic impression receiver 402 distributes the aggregated demographic impressions from the example database proprietor 104 collected at block 902 to the example DP database 406 (FIG. 4). In other examples, the example demographic impression receiver 402 (FIG. 4) distributes the panelist demographic impressions from the example panelist database 116 collected at block 904 to the internal panelist database 404 (FIG. 4). From here, the example household manager 408 (FIG. 4) retrieves demographic impressions from the example panelist database 404 and/or the example DP database 406. In some examples, the example household manager 408 initially determines whether the panelist impressions are a subset of the DP aggregate demographic impressions (block 906). In some examples, the panelist impressions correspond to panelists with OTT devices and therefore are likely a subset of the DP aggregate demographic impressions. If the example household manager 408 determines that the panelist impressions are a subset of the DP aggregate demographic impressions (block 906: YES), control proceeds to block 908. However, if for some reason the example household manager 408 determines that the panelist impressions are not a subset of the DP aggregate (block 906: NO), control returns to block 804 to find panelist impressions that are a subset of the DP aggregate demographic impressions. At block 908, a household having a number of impressions associated therewith is selected by the example household manager 408.

Once a household is selected, control proceeds to block 920, shown in FIG. 9B. The example household manager 408, in some examples, organizes a first list of DP household ("HH") members having a first or unknown gender (e.g., the first gender is female in some examples) (block 920). In additional examples, the example household manager 408 organizes a second list of panelist HH members having the first gender (block 922). In some examples, the DP HH members are registrants of the example database proprietor 104 (FIG. 1) that corresponds to AME panelist registrants. In such examples, the example database proprietor 104 has demographic data for the DP HH members and the example panelist database 116 (FIG. 1) has demographic data for the Panelist HH members. The example household manager 408 thereafter constructs a first matrix using the first and second lists. The example household manager 408 uses the ages of the DP HH members from the first list as column legends and the ages of the panelist HH members from the second list as row legends (block 924). Thereafter, the example comparator 410 compares each column legend to each row legend and calculates the absolute difference (e.g., absolute difference=column−row, if column>row; absolute difference=row−column, if row>column) between them, in some examples, to populate a plurality of cells (e.g., the corresponding intersections of the columns and rows) of the first matrix (block 926).

Thereafter, in some examples, the example analyzer 412 analyzes the populated matrix from block 926 to find the cell with the lowest value (e.g., minimum absolute difference) (block 928). Further, the example analyzer 412 determines whether the value found in block 928 is below (e.g., less than) a threshold (e.g., 10 years) (block 930). If the example analyzer 412 determines the value from block 928 is above the threshold (block 930: NO), control proceeds to block 950. If the example analyzer 412 determines the value from block 928 is below the threshold (block 930: YES), control proceeds to block 932.

In some examples, one or more of the DP HH members have no age data available. In these examples, the DP HH members with no age data (e.g., a corresponding column in the matrix) are ignored until the rest of the DP HH members are matched as described herein. In some examples, a single panelist HH member and DP HH member remain in the matrix. In such examples, the unknown age for the DP HH member is corrected with the age of the remaining panelist HH member's age. In other examples, multiple panelist HH members and multiple ageless DP HH members remain in the matrix after an iteration. In such examples, additional information (e.g., media data, timestamp data, etc.) may be required to predict or otherwise match ageless DP HH members to the panelist HH members.

At block 950, the example analyzer 412 determines that the DP HH member corresponding to the column legend from the first list is not a match to the Panelist HH member corresponding to the row legend from the second list. The example analyzer 412 labels each member as not matched, in some examples, and control proceeds to block 944. In some examples, the non-matched HH members are analyzed at block 960, as discussed in connection with FIG. 9C. Additionally or alternatively, the non-matched HH members are sent to the example demographic predictor 114 (FIG. 6), in some examples.

At block 944, the example analyzer 414 (FIG. 4) determines whether there is another gender for which to perform analysis (e.g., if a matrix was created and analyzed for males, then a matrix still needs to be created and analyzed for females and vice-a-versa). If the example analyzer 414 determines that there is another gender for which to perform analysis (block 944: YES), control proceeds to block 946.

At block 946, the example household manager 408 organizes a first list of DP household ("HH") members having a second or unknown gender. In additional examples, the example household manager 408 organizes a second list of panelist HH members having the second gender (block 948). Thereafter, control returns to block 924, where the example household manager 408 constructs a second matrix using the first and second lists. The example household manager 408 uses the ages of the DP HH members from the first list as column legends and the ages of the panelist HH members from the second list as row legends (block 924).

When the example analyzer 412 determines the value from block 928 is below the threshold (block 930: YES), the example analyzer 412 determines that the DP HH member corresponding to the column legend from the first list is a match to the Panelist HH member corresponding to the row legend from the second list (block 932). In some examples, the example analyzer 412 identifies the age difference between the matched members (e.g., the value from block 928) and sends the age difference to the example adjuster 414 (block 934). In some examples, the example adjuster 414 adjusts the DP HH member's age according to the age difference obtained from the example analyzer 412 at block 934 (block 936). At block 936, the example adjuster 414 relays the age adjustment to the example model trainer 416, which trains an adjustment model based on the age adjustment (block 938). After the adjustment model has been trained with the age adjustment from block 938, the example analyzer 412 removes the column and row corresponding to the DP HH member and the panelist HH member matched in block 932 from the matrix (block 940). If the example analyzer 412 determines that there are additional cells left in the matrix (block 942: YES), control returns to block 928 where the remaining cells are analyzed by the example analyzer 412 to find the cell with the lowest, or minimum value. This process continues for as many iterations as there are cells in the matrix.

If the example analyzer 412 determines that there are no more cells in the matrix after block 940 (block 942: NO), control proceeds to block 944. At block 944, the example analyzer 414 determines whether there is another gender to perform analysis for (e.g., if a matrix was created and analyzed for males, then a matrix still needs to be created and analyzed for females and vice-a-versa). If the example analyzer 414 determines that there is another gender for which to perform analysis (block 944: YES), control proceeds to block 946. If the example analyzer 414 determines that analysis has been done for all genders (block 944: NO), then control proceeds to block 910, shown in FIG. 9A.

As further shown in FIG. 9C, block 960 accounts for the HH members not-matched previously. The example household manager 408 further constructs a third matrix using the ages from non-matched DP HH members (e.g., from block 950) as column legends and the ages from non-matched panelist HH members as row legends (e.g., from block 950) similarly to the process described in connection to block 924 (block 960).

Once the example processor 408 constructs the third matrix, the example comparator 410 compares and calculates the absolute difference between the column legends and the row legends to populate the cells of the third matrix (block 962). In some examples, this is similar to the process described in connection to block 926. The example analyzer 412 then identifies the cell with the lowest or minimum value (block 964). Subsequently, the example analyzer 412 determines whether the value identified in block 964 is below (e.g., less than) a threshold (e.g., 10 years) (block 966). If the example analyzer 412 determines that the value identified in block 964 is below the threshold (block 966: YES), control proceeds to block 968. If the example analyzer 412 determines that the value identified in block 964 is above the threshold (block 966: NO), control proceeds to block 980.

When the example analyzer 412 determines that the value identified in block 964 is below the threshold (block 966: YES), the example analyzer 412 determines the DP HH member corresponding to the column legend is a match to the panelist HH member corresponding to the row legend (block 968). In some examples, the example analyzer 412 identifies the age difference between the matched DP HH member and panelist HH member (e.g., the value from block 964) and sends the age difference to the example adjuster 414 (block 970). Thereafter, the example adjuster 414 adjusts the DP HH member's age according to the age difference obtained from the example analyzer 412 at block 970 (block 972). The example adjuster 414 relays the age adjustment to the example model trainer 416, which trains an adjustment model based on the age adjustment (block 974). After the adjustment model has been trained with the age adjustment from block 974, the example analyzer 412 removes the column and row corresponding to the DP HH member and the panelist HH member matched in block 968 from the third matrix (block 976). If there are no more cells in the third matrix after block 976 (block 978: NO), then control proceeds to block 910, shown in FIG. 9A. If the example analyzer 412 determines that there are additional cells left in the third matrix (block 978: YES), control returns to block 964 where the remaining cells are analyzed by the example analyzer 412 to find the cell with the lowest, or minimum value. This process continues for as many iterations as there are cells in the third matrix.

At block 980, the example analyzer 414 determines whether there are more columns than rows in the third matrix. If the example analyzer 412 determines that there are more columns than rows in the third matrix (block 980: YES), control proceeds to block 982. If the example analyzer 412 determines that there are not more columns than rows in the third matrix (e.g., the same amount of rows and columns, or less columns than rows; block 980: NO), control proceeds to block 984. At block 984, the example analyzer 414 determines whether there are more rows than columns in the third matrix. If the example analyzer 412 determines that there are more rows than columns in the third matrix (block 984: YES), control proceeds to block 986. If the example analyzer 412 determines that there are not more rows than columns (e.g., same amount of rows and columns; block 984: NO), control proceeds to block 988.

When the example analyzer 412 determines that there are more columns than rows in the third matrix (block 966: NO; block 980: YES), then the example adjuster 414 assigns an "EXTRA" label to the non-matched DP HH member(s) (block 982). In some examples, this indicates that the database proprietor is accounting for a person, or persons, that should not be accounted for within a particular household (e.g., a guest, friend, or other non-resident). In such examples, this indication is based upon the accuracy of the panelist impression data, including the number of residents within a panelist's household (e.g., the panelist household has less members than the corresponding database proprietor household; therefore the DP HH has extra members). Next, the example model trainer 416 trains an adjustment model based on the assignments by the example adjuster 414 (block 990). Thereafter, control proceeds to block 910, shown in FIG. 9A.

When the example analyzer 412 determines that there are more rows than columns in the third matrix (block 966: NO; block 980: NO; block 984: YES), then the example adjuster 414 adds the panelist(s) associated with the extra row(s) to the DP HH members and assigns a "MISSING" label to the panelist(s) (block 986). In some examples, this indicates that the database proprietor is not accounting for a person, or person, that they should be accounting for within a particular household (e.g., a minor, an elder, or another resident). In these examples, this indication is based upon the accuracy of the panelist impression data, including the number of residents within a panelist's household (e.g., the panelist household has more members than the corresponding database proprietor household; therefore a panelist is missing from the DP HH). Next, the example model trainer 416 trains an adjustment model based on the assignments by the example adjuster 414 (block 990). Thereafter, control proceeds to block 910, shown in FIG. 9A.

In some examples, when the example analyzer 412 determines that there equal rows and columns in the third matrix (block 966: NO; block 980: NO; block 984: NO), then the example analyzer 412 assigns an "EXTRA" label to the non-matched DP HH member(s). In other examples, the example adjuster 414 adds the panelist(s) associated with the remaining row(s) to the DP HH members and assigns "MISSING" label(s) to the panelist(s). Such examples indicate that the database proprietor is accounting for a person, or persons, that should not be accounted for within a particular household (e.g., a guest, friend, or other non-resident) and/or the database proprietor is not accounting for a person, or persons, that the DP should be accounting for within a particular household (e.g., a minor, an elder, or another resident). Next, the example model trainer 416 trains an adjustment model based on the assignments by the example adjuster 414 (block 990). Thereafter, control proceeds to block 910, shown in FIG. 9A. As described above, the example adjustment model trained by the example model trainer 416 at block 990 accounts for variances in the members of a particular household.

Returning to block 910, as shown in FIG. 9A, the example program 900 has evaluated a household and has matched DP HH members to panelist HH members or has labeled the non-matching members accordingly, in some examples. Thereafter, the example analyzer 412 (FIG. 4) determines if there are additional households with impressions. If the example analyzer 412 determines that there are additional households with impressions (block 910: YES), control returns to block 908 where another household having a number of impressions associated therewith is selected by the example household manager 408 (FIG. 4). If the example analyzer 412 determines there are no additional households to analyze (block 910: NO), then the adjustment model trained by the example model trainer 416 (FIG. 4) is sent to the example model applier 418 (FIG. 4) (block 912).

At block 912, the example model applier 418 applies the adjustment model to the DP aggregate demographic impressions from the example DP database 406. In some examples, the adjustment model corrects any age discrepancies in the DP aggregate demographic impressions using the model trained by the subset of panelist impressions at block 938. In other examples, the adjustment model corrects gender discrepancies in the DP aggregate demographic impressions using the model trained by the subset of panelist impressions at block 974. In even further examples, the adjustment model corrects HH member variances when there are missing and/or extra members accounted in the DP aggregate demographic impressions.

FIG. 10 is a flow diagram representative of example machine readable instructions that may be executed to implement the example viewership assigner 112 of FIGS. 1 and 5. In the illustrated example, the example viewership assigner 112 uses the corrected demographics from the example demographic corrector 110 to create demographic impressions assigned to household members. In the illustrated example, the example OTT demographic impression receiver 502 receives household impression information and corrected demographics from the example demographic corrector 110. The example OTT database 504 associates and stores the household impression information and corrected demographics for manipulation by an example program 1000. The example program 1000 assigns particular household members to demographic impressions previously assigned to the household.

The example program 1000 begins at block 1001. At block 1001, the example HH member manager 510 determines whether, for a first household associated with an impression of a media presentation, the size of the first household is equal to one. If only one member exists in the first household (block 1001: YES), then the example OTT viewership assigner 516 associates the first household impression with the single household member (block 1002) because there are no other household members that could possibly have viewed the media presentation besides the single household member. However, when size of the first household is not equal to one (block 1001: NO), control proceeds to block 1004 in order to determine which household member actually viewed the media presentation.

In order to determine which household member viewed the media presentation, the example viewership assigner 112 utilizes conditional probabilities based on donor (e.g., panelist and/or historical viewing data) household data. Therefore, the example donor data receiver 506 acquires donor data via the example network 122 (block 1004). The example donor data receiver 506 stores the example donor data in the example donor database 508. The example viewership analyzer 512 uses a plurality of variables to find donor household information in the example donor database 508 that match with data related to the first household. Examples of matching variables include, without limitation, demographics (male ages 2-12, 13-4, 15-17, etc., female ages 40-44, 50-54, etc.), time of day (e.g., prime time, late afternoon/early evening, late evening, weekday morning, weekday daytime, weekend daytime, etc.), specific genre (e.g., musical drama, feature film, comedy variety, children, etc.), HH size, number of adults, number of kids, etc. The example viewership analyzer 512 refines the donor data based on the matching variables for a donor household that has similar matching variables with the first household (block 1006). If no matching donor households are located (block 1008: NO), then control proceeds to block 1010.

At block 1010, there are no donor households that match with all the matching variables associated with the first household. Accordingly, the example viewership adjuster 514 rolls up the variables, such that a match may be found. In the illustrated example, rollup refers to iteratively removing variables until a match can be found. In some examples, initially a donor household must match all matching variables associated with the first household. After the example viewership adjuster 514 rolls up the variables a first time, only demographics, time of day, general genre (e.g., children, comedy, drama, news, sports, etc.), HH size, number of adults, and number of kids must match. After the example viewership adjuster 514 rolls up the variables a second time, only demographics, time of day, general genre, HH size, and number of kids must match. After the example viewership adjuster 514 rolls up the variables a third time, only demographics, time of day, general genre, and number of kids must match. After the example viewership adjuster 514 rolls up the variables a fourth time, only demographics, time of day, general genre, and the presence of kids (e.g., binary yes or no) must match. After the example viewership adjuster 514 rolls up the variables a fifth time, only demographics, time of day, and general genre must match, etc. After the example viewership adjuster 514 rolls up the matching variables (block 1010), control returns to block 1006 where the example viewership analyzer 512 refines the donor data based on the rollup variables.

However, when a matching donor household is found (block 1008: YES), control proceeds to block 1012. At block 1012, the example viewership analyzer 512 selects a first demographic bucket (e.g., male ages 18-20). As discussed in conjunction with the demographic corrector 110, the example viewership analyzer 512 has access to the actual demographic buckets that exist within the first household. Therefore, the example viewership analyzer 512 selects a demographic bucket that actually exists in the first household, rather than an arbitrary demographic bucket. For the first demographic bucket, the example viewership analyzer 512 identifies a first time that a person in the donor household matching the first demographic bucket previously viewed the media presentation (e.g., based on panelist viewing history) (block 1014). Additionally, the example viewership analyzer 512 identifies a second time that all members in the donor household previously viewed the media presentation (block 1016). Thereafter, the example viewership analyzer 512 divides the first time by the second time to determine a probability that the first demographic bucket viewed the media presentation (block 1018). At block 1020, the example viewership analyzer 512 determines if there are additional demographic buckets for which to determine probabilities. If there are additional demographic buckets (block 1020: YES), control returns to block 1012. If there are no additional demographic buckets (block 1020: YES), control proceeds to block 1022.

At block 1022, all probabilities for the existing demographic buckets within the first household have been determined. Thereafter, the example viewership analyzer 512 searches for a donor viewing event. The example viewership analyzer 512 refines the donor data similarly to block 1006 using matching variables such as, for example, a time of day, genre, household size, number of adults, and number of children (e.g., demographic matching is left out in some examples) (block 1022). The example viewership analyzer 512 determines if there are more than one matching viewing event located in the example donor database 508 (block 1024). If there is not more than one viewing event (block 1024: NO), the example viewership analyzer 512 determines if there is just one matching viewing event (block 1026). If there is not one matching viewing event (block 1026: NO), then no viewing events were found and control proceeds to block 1028. At block 1028, the example viewership adjuster 514 rolls up the matching variables as described above and control returns to block 1022, where the example viewership analyzer 512 refines the donor data based on the rollup variables.

If there are more than one matching viewing event (block 1024: YES), then control proceeds to block 1030 to determine which viewing event to use as a donor viewing event. The example viewership analyzer 512 ranks both the donor household members and the first household members according to their respective probabilities determined in block 1018 (block 1030). The example viewership analyzer 512 then determines the absolute difference between the probabilities of the household members from the first household and the probabilities of the donor household members (e.g., historical probability data) (block 1032). For example, the absolute difference between the first ranked household member (e.g., ranked via block 1030) of the first household and the first ranked household member of the donor household is determined, the absolute difference between the second ranked household member of the first household and the second ranked household member of the donor household is determined, etc. The example viewership analyzer 512 adds the differences determined via block 1032 for each donor viewing event (block 1034). The example viewership analyzer 512 then selects the donor viewing event associated with the lowest summation determined via block 1034 as the donor viewing event for the first household (block 1036).

After selecting the donor viewing event via block 1036 or if there is just one matching viewing event (block 1026: YES), control proceeds to block 1038. At block 1038, the example OTT viewership assigner 516 imputes donor viewing (e.g., known historical data) to respective first household members. For example, if the first ranked household member of the donor household (e.g., ranked via block 1030) had viewed the media then the example OTT viewership assigner 516 assigns the first ranked household member of the first household as having viewed the media presentation. Thereafter, the example program 1000 ceases. Of course, the example program 1000 may be ran again for another demographic impression.

FIG. 11 is another flow diagram representative of example machine readable instructions that may be executed to implement the example viewership assigner 112 of FIGS. 1 and 5. In some examples, assigning viewership to a particular household member is based on the media presented, the time of the media presentation, and/or household characteristics of a particular household. An example program 1100 for implementing the example viewership assigner 112 is shown in FIG. 9 and starts at block 1102. At block 1102, the example donor data receiver 506 (FIG. 5) receives times (and media at those times) that the donor household members were using the television. The example viewership assigner 112, in some examples, receives this information from the AME's 106 (FIG. 1) television meters. Alternatively, the media and time information may be processed and stored prior to use by the example viewership assigner 112.

After receiving the television media and times, the donor data receiver 506 stores the media and time information into a donor database 508 (FIG. 5) and control proceeds to block 1104. Next, the example OTT demographic impression receiver 502 (FIG. 5) receives the corrected demographic impressions (e.g., corrected age and gender for each demographic impression) from the example demographic corrector 110 (FIG. 4). The corrected demographic impressions may additionally include at least the times that the recipient household used the example OTT device 102 (FIG. 1) along with the corrected demographic impressions (block 1104). In some examples, the example OTT demographic impression receiver 502 stores at least the example OTT device 102 use times in the example OTT database 504 (FIG. 5).

The example methods and apparatus disclosed herein utilizes historical extraction to predict the media of the example OTT device 102 at the times the example OTT device 102 was used. In some examples, the household member manager 510 extracts the viewing history and media of television and PC views obtained from the donor data receiver 506. The donor data receiver 506 receives media and timestamps of television media for particular panelists from panelist metering methods (e.g., watermarking media, encoding media, attaching cookies to media, etc.) in some examples. In other examples, the media and timestamps of television media is estimated or predicted from statistical models based upon panelist metering methods. The media and timestamps are retrieved over the example network 122 in some examples.

In some examples, the example HH member manager 510 predicts that the usage of the example OTT device 102 is similar to the historical usage (e.g., media and time associated with a particular viewer) of the television or PC. For example, if a particular viewer frequently watched music videos on MTV and YouTube.com, then that particular viewer would be likely to use the example OTT device 102 to watch music videos through particular device channels and/or on a YouTube application on the example OTT device. The example viewership assigner 112 has access to television and PC media and viewing times of that media. The television and PC media includes genre, program name, program rating, advertisements, timestamps, metadata, and other information in some examples.

In some examples, the example viewership assigner 112 accounts for co-viewing (e.g., more than one household member is viewing the particular media for which the impression represents.). Thus, the example household member manager 510 has the option to account for co-viewing (block 1106). If co-viewing is to be accounted for (block 1106: YES), control proceeds to block 1112 and the household member manager 510 sends data to the example viewership analyzer 512. Otherwise (block 1106: NO), control proceeds to block 1108 the household member manager 510 sends data to the example OTT viewership assigner 510.

When co-viewing is not required (block 1106: NO), then the example OTT viewership assigner 510 determines which household member is likely using the example OTT device during the time the household used the example OTT device (block 1108). As discussed above, the example viewership assigner 510 utilizes television and PC media in some examples, to match household members to a particular OTT viewing (e.g., if, historically, adult females watch the Lifetime network on TV, it is likely that similar OTT media is also watched by adult females). In other examples, the viewership assigner 510 utilizes the time of the television and/or PC media to match household members to a particular OTT device viewing (e.g., if, historically, media watched from 3-5 P.M. is watched by children after school, OTT media watched during the same time is likely watched by children). Once the viewership assigner 510 has determined which particular household member is using the example OTT device, then the viewership assigner 510 assigns viewership of a particular impression associated with the time the example OTT device was used to the particular household member (block 1110). Thereafter the example program 1100 ceases. Of course, the example program 1100 may be run again.

In some examples co-viewing is to be accommodated (block 1106: YES). Of course, many methods may be used to account for co-viewing without departing from the scope of the present disclosure. In backward elimination examples, shown in FIG. 11, the example viewership analyzer 512 preliminarily assigns to all members of a household viewership of a particular OTT media impression (block 11). From there, the example viewership analyzer 512 selects a household member for an elimination analysis (block 1114). In some examples, the example viewership analyzer 512 analyzes and compares the media and time of the example OTT media impression to the household member's television and PC media and viewing history (block 1116). If the example viewership analyzer 512 determines that the media of the example OTT media impression conflicts with the HH member's television and PC media history (block 1118: YES), control proceeds to block 1120. If the example viewership analyzer 512 determines that the media of the example OTT media impression does not conflict with the HH member's television and PC media history (block 1118: NO), control proceeds to block 1122.

When the example viewership analyzer 512 determines that the media of the example OTT media impression conflicts with the HH member's television and PC media history (block 1118: YES), the example viewership adjuster 514 removes viewership of the particular OTT media impression from the HH member (block 1120). If the example viewership analyzer 512 determines that additional HH members exist (block 924: YES), then the next HH member is selected at block 11 and control proceeds from there. However, if the example viewership analyzer 512 determines that no additional HH members exist (block 1124: NO), then the example OTT viewership assigner 510 permanently assigns the remaining HH members viewership of the particular OTT media impression (block 1126). Thus, the example program 1100 assigns particular household members (including co-viewers) to impressions such that demographics for corresponding impressions from OTT devices are associated with relatively higher accuracies. Thereafter the example program 1100 ceases. Of course, the example program 1100 may be run again.

When the example viewership analyzer 512 determines that the media of the example OTT media impression does not conflict with the HH member's television and PC media history (block 1118: NO), the example viewership analyzer 512 determines whether the example OTT impression viewing time conflicts with the HH member's television and PC viewing history (block 1122). If the example viewership analyzer 512 determines that the example OTT impression viewing time conflicts with the HH member's television and PC viewing history (block 1122: YES), control returns to block 1120. In some examples, the example viewership adjuster 514 removes viewership of the particular OTT media impression from the HH member when the example OTT impression viewing time conflicts with the HH member's television and PC viewing history. Thereafter, the example viewership analyzer 512 determines if there are any additional HH members. If the example viewership analyzer 512 determines that additional HH members exist (block 1124: YES), then the next HH member is selected at block 1114 and control proceeds from there. If the example viewership analyzer 512 determines that no additional HH members exist (block 1124: NO), then the example OTT viewership assigner 510 permanently assigns the remaining HH members to the particular OTT media impression (block 1126). Thereafter, the example program 1100 ceases. Of course, the example program 1100 may be run again.

If the example viewership analyzer 512 determines that the example OTT impression viewing time does not conflict with the HH member's television and PC viewing history (block 1122: NO), then the example viewership analyzer 512 checks if there are any more HH members left to analyze (block 1124). If the example viewership analyzer 512 determines that there are additional HH members (block 1124: YES), the control returns to block 1114. If the example viewership analyzer 512 determines that no additional HH members exist (block 1124: NO), then the example OTT viewership assigner 510 permanently assigns the remaining HH members to the particular OTT media impression (block 1126). Thereafter, the example program 1100 ceases. Of course, the example program 1100 may be run again. As discussed above, additional or alternative methods of assigning viewership to a household member may be utilized without departing from the scope of the present disclosure.

FIG. 12 is a flow diagram representative of example machine readable instructions that may be executed to implement the example demographic predictor 114 of FIGS. 1 and 6. The example demographic predictor 114, in some examples, predicts the demographics of DP HH members not matched with OTT device 102 user data 204 (FIG. 2). Presumptively, if demographics from the example database proprietor 104 (FIG. 2) is not matched with user data from the example OTT device 102 (FIG. 2), then the corresponding DP HH members using an OTT device will not have demographic data available to correct by the example demographic corrector 110. Therefore, the example demographic predictor 114 utilizes a plurality of methods to make up for any deficits in demographic data as further described below.

An example program 1200 begins at block 1202, wherein the example prediction manager 610 determines whether to use a scaling method to predict the demographics of DP HH members not matched with OTT device 102 user data 204 (e.g., OTT-DP non-matched impressions). If the example prediction manager 610 determines a scaling method is to be used (block 1202: YES), control proceeds to block 1204.

At block 1204, the example prediction manager 610 determines whether to scale the example OTT-DP matched impressions to account for the non-matched impressions. If the example prediction manager 610 determines to scale the example OTT-DP matched impressions (block 1204: YES), then the example prediction manager receives the example OTT-DP matched impressions from the example OTT-DP matched impressions database 604 (block 1206). After receiving the example OTT-DP matched impressions, the prediction manager 610, in some examples, determines whether to apply a linear scaling method on the example OTT-DP matched impressions (block 1210). If the prediction manager 610 determines a linear scaling method is to be applied (block 1210: YES), control proceeds to block 1212. A linear scaling method is useful where the unknown or non-matched OTT-DP impressions are presumptively similar to the example OTT-DP matched impressions for all demographic buckets. For example, when 95% of the example OTT-DP matched impressions cover a diverse plurality of demographics (e.g., all demographic buckets are accounted for), the example OTT-DP matched impressions can be linearly scaled to 100%. At block 1212, the example linear scaler 612 scales the example OTT-DP matched impressions linearly to 100%. For example, the unknown or non-matched OTT-DP impressions are replaced with impressions statistically representative of the example OTT-DP matched impressions, according to a linear scale. Thereafter, the example modeler 616 trains a prediction model based on the linear scaling at block 1222.

If the prediction manager 610 determines a linear scaling method is not sufficient (block 1210: NO), control proceeds to block 1214. In some examples, the prediction manager 610 applies a differential scaling method when a linear scaling method is insufficient. A differential scaling method is useful where the unknown or non-matched OTT-DP impressions are likely not similar to the example OTT-DP matched impressions for each demographic bucket. For example, when 95% of the example OTT-DP matched impressions do not cover a diverse plurality of demographics (e.g., one or more demographics are not accounted for, one or more demographics have different match rates, etc.), linearly scaling will not account for the lack of diversity. Thus at block 1214, the example differential scaler 614 scales the example OTT-DP matched impressions differentially (e.g., according to a panelist data match rate of each demographic bucket as discussed in conjunction with FIG. 6). Thereafter, the example modeler 616 trains a prediction model based on the differential scaling at block 1222.

If the example prediction manager 610 determines not to scale the example OTT-DP matched impressions (block 1204: NO), control proceeds to block 1208. At block 1208, the example OTT demographic impression receiver 602 receives the corrected demographics from the example demographic corrector 110. The prediction manager 610, in some examples, determines whether to apply a linear scaling method on the corrected demographics from the demographic corrector 110 (block 1210). If the prediction manager 610 determines a linear scaling method is to be applied (block 1210: YES), control proceeds to block 1212. A linear scaling method is useful where the unknown or unmatched demographics are presumptively similar to the corrected demographics. For example, when 95% of the corrected OTT demographic impressions cover a diverse plurality of demographics (e.g., all demographic buckets are accounted for), the corrected demographics can be linearly scaled to 100%. At block 1212, the example linear scaler 612 scales the corrected demographics linearly to 100%. For example, the unknown or unmatched demographics are replaced with demographics statistically representative of the corrected demographics, according to a linear scale. Thereafter, the example modeler 616 trains a prediction model based on the linear scaling at block 1222.

If the prediction manager 610 determines a linear scaling method is not sufficient (block 1210: NO), control proceeds to block 1214. In some examples, a differential scaling method is applied when a linear scaling method is insufficient. A differential scaling method is useful where the unknown or unmatched demographics are likely not similar to the corrected demographics. For example, when 95% of the corrected OTT demographic impressions do not cover a diverse plurality of demographics (e.g., one or more demographics are not accounted for), linearly scaling will not account for the lack of diversity. Thus at block 1214, the example differential scaler 614 scales the corrected demographics differentially (e.g., according to a panelist data match rate of each demographic bucket as discussed in conjunction with FIG. 6). Thereafter, the example modeler 616 trains a prediction model based on the differential scaling at block 1222.

If the example prediction manager 610 determines a scaling method is not sufficient (block 1202: NO), control proceeds to block 1216. At block 1216, the example prediction manager 610 receives demographic information associated with a HH member's IP address from the IP address demographic receiver 608. The IP address demographics come from an additional or alternative database proprietor (e.g., eXelate), different from the example database proprietor 104, in some examples, because the example database proprietor 104 lacks demographic data for the HH member. Thereafter, the example prediction manager 610 matches the demographics received by the example IP address demographic receiver 608 to the non-matched impressions (block 1218). In some examples, the prediction manager 610 matches the demographics to the non-matched impressions similarly to the aforementioned example demographic comparator 107 in the example registration phase in FIG. 2. In other examples, the prediction manager 610 matches the demographics to the non-matched impressions using the IP address associated with the HH member and the example OTT device's IP address or the IP address of an internet router that the example OTT device 102 accesses.

Thereafter, in some examples, the prediction manager 610 associates the demographics with the non-matched impressions similarly to how the example database proprietor 104 (FIG. 3) creates the example demographic impressions 306 (FIG. 3) as shown in the example impression collection phase in FIG. 3. (Block 1220). The example modeler 616 subsequently trains a prediction model based on the demographic association at block 1222. The example modeler 616 applies any models trained (e.g., from linear scaling, differential scaling, and/or IP address demographic association) to the aggregate demographic impressions (block 1222).

Figure 13:
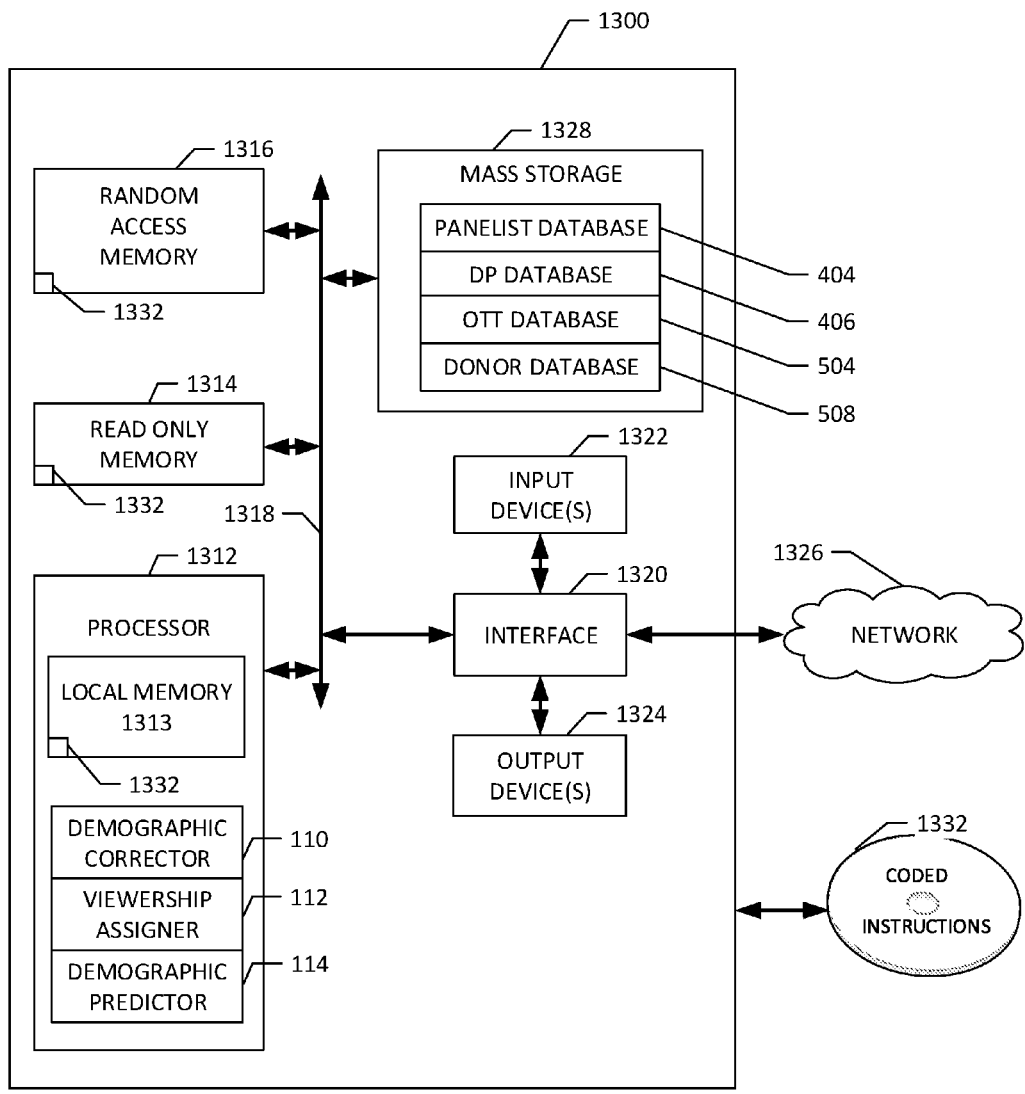
FIG. 13 illustrates an example processor system structured to execute the example instructions of FIGS. 7, 8, 9A-9C, 10, 11, and 12 to implement the example apparatus of FIG. 1 to correct demographic impressions, assign viewership, and predict demographics from information obtained from OTT devices and database proprietors.

FIG. 13 is a block diagram of an example processor platform 1300 capable of executing the instructions of FIGS. 7, 8, 9A-9C, 10, 11, and 12 to implement the example apparatus 108 of FIG. 1, the example demographic corrector 110 of FIG. 4, the example viewership assigner 112 of FIG. 5, and the demographic predictor 116 of FIG. 6. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller. The processor 1312 of the illustrative example further includes the example demographic corrector 110 (FIG. 4), the example viewership assigner 112 (FIG. 5), and the example demographic predictor 114 (FIG. 6) as disclosed herein.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The mass storage devices 1328 include the example panelist database 404, the example DP database 406, the example OTT database 504, and the example donor database 508.

The coded instructions 1332 of FIGS. 7, 8, 9A-9C, 10, 11, and 12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods and apparatus advantageously discover errors in demographics associated with database proprietors in connection with impressions associated with OTT devices, correct the errors in the demographics, assign viewership to impressions based on the corrected demographics, predict demographics for impressions lacking associated demographics, and, more generally, provide more accurate reporting of demographics for market research and applications thereof.

Examples disclosed herein solve problems arising from uses of computer technologies. Namely, automated information gathering systems (e.g., computer data gathering systems) do not differentiate between true and false user information. For example, a computing system accepts user input data, such as data received via a registration process as described herein, as truth. Where such data is not truthful (e.g., wherein a subscriber to a database proprietor mistakenly or intentionally provides false information), the untrue data is unknowingly processed by the computing system as truth. Such untrue data processing can be compounded when the untrue data is manipulated and/or analyzed to create conclusions and/or new data (e.g., false demographics associated with an impression lead to false conclusions and incorrect and/or unreliable predictions or audiences exposed to media based on the demographic impression data). For example, if a 12-year old male subscribes to a database proprietor (e.g., Facebook®) as an 18-year old, then an impression for a media presentation of SpongeBob SquarePants may be incorrectly associated with an 18-year old. Parties receiving this data may incorrectly assume 18-year old males are interested in SpongeBob SquarePants and may develop marketing campaigns directly targeting this demographic. These marketing campaigns would likely not have the anticipated impact because they are based on defective data unbeknownst to the computer data gathering system.

Examples disclosed herein are useful to compensate and/or correct for reception of defective data by providing countermeasures, which effectively convert instances of untrue user input into accurate truthful representations. These accurate truthful representations are associated with household impressions. Further, household members are assigned viewership of the impressions. The example methods and apparatus build models using the above-disclosed corrections and assignments of viewership as a training set. Thereafter, the models are applied to database proprietor demographic databases to correct the untrue demographic data and correctly associate the demographics with impressions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A method comprising:
identifying, by executing an instruction via a processor, a first set of impression data received from a computer at a first data source, the first set of impression data having matched demographic data from users registered with both an over-the-top (OTT) device and a database proprietor, the first set of impression data different from a second set of data from a second data source, the computer producing a misattribution error in the first set of impression data, the misattribution error based on a demographic data error in the first set of impression data, the demographic data error based on a difference between reported demographic data in the first set of impression data and actual demographic data corresponding to the first set of impression data;
generating, by executing an instruction via the processor, a third set of data based on the second set of data from the second data source;
generating, by executing an instruction via the processor, an independent binary model based on a difference between the first set of impression data and the third set of data;
correcting the demographic data error in the first set of impression data by applying, by executing an instruc- tion via the processor, the independent binary model to the first set of impression data to generate corrected demographic data; and correcting the misattribution error produced by the computer by assigning, by executing an instruction via the processor, viewership to an impression associated with the first set of impression data using the corrected demographic data.

2. The method as defined in claim 1, wherein the generating of the third set of data includes:
identifying a demographic bucket;
determining whether the demographic bucket exists in a household based on the independent binary model; and
determining the number of members in the household associated with the demographic bucket based on a demographic distribution associated with the second set of data.

3. The method as defined in claim 2, wherein the independent binary model is a machine learning algorithm generated based on at least one of a household size, an age, a gender, a person status, an income, an education, or an ethnicity.

4. The method as defined in claim 3, wherein the machine learning algorithm is at least one of a classification and regression tree, a log it function, a conditional inference tree, a random forest, a neural network, or a bootstrap aggregate decision tree.

5. The method as defined in claim 1, wherein the first set of impression data from the first data source has a fourth set of data missing, further including linearly scaling the first set of impression data to accommodate for the missing fourth set of data.

6. A method comprising:
identifying, by executing an instruction via a processor, a first set of impression data received from a computer at a first data source, the first set of impression data different from a second set of data from a second data source, the computer producing a misattribution error in the first set of impression data, the misattribution error based on a demographic data error in the first set of impression data, the demographic data error based on a difference between reported demographic data in the first set of impression data and actual demographic data corresponding to the first set of impression data;
generating, via the processor, a third set of data based on the second set of data from the second data source;
generating, via the processor, an independent binary model based on a difference between the first set of impression data and the third set of data; and
correcting the demographic data error in the first set of impression data by applying, via the processor, the independent binary model to the first set of impression data to generate corrected demographic data; and
correcting the misattribution error produced by the computer by assigning, via the processor, viewership to an impression associated with the first set of impression data using the corrected demographic data, the assigning of the viewership to the impression includes:
identifying viewing history associated with the second set of data;
determining a first time associated with a first demographic viewing a media presentation in a first household associated with the second set of data;
determining a second time associated with the first demographic and a second demographic viewing the media presentation in the household;
determining a first probability that the first demographic viewed the media presentation by dividing the first time by the second time;
identifying a first person in the first household associated with the second set of data having a second probability similar to the first probability; and
imputing a viewing history of the first person to a second person in a second household associated with the first set of impression data.

7. The method as defined in claim 6, wherein the identifying of the first person in the first household associated with the second set of data having the second probability similar to the first probability includes:
identifying a third person in the first household associated with the second set of data;
ranking the first and third person based on a first highest probability;
identifying a fourth person in the second household associated with the first set of impression data;
ranking the second and fourth person based on a second highest probability; and
identifying the first person has the second probability similar to the first probability when the first person has the first highest probability and the second person has the second highest probability.

8. An apparatus comprising:
a demographic corrector to:
identify a first set of impression data received from a computer at a first data source, the first set of impression data having matched demographic data from users registered with both an over-the-top (OTT) device and a database proprietor, the first set of impression data different from a second set of data from a second data source, the computer producing a misattribution error in the first set of impression data, the misattribution error based on a demographic data error in the first set of impression data, the demographic data error based on a difference between reported demographic data in the first set of impression data and actual demographic data corresponding to the first set of impression data;
generate a third set of data based on the second set of data from the second data source;
generate an independent binary model based on a difference between the first set of impression data and the third set of data; and
correct the demographic data error in the first set of impression data by applying the independent binary model to the first set of impression data to generate corrected demographic data; and
a viewership assigner to correct the misattribution error produced by the computer by assigning viewership to an impression associated with the first set of impression data using the corrected demographic data, in which at least one of the demographic corrector or the viewership assigner is a logic circuit.

9. The apparatus as defined in claim 8, wherein to generate the third set of data, the demographic corrector is to:
identify a demographic bucket;
determine whether the demographic bucket exists in a household based on the independent binary model; and
determine the number of members in the household associated with the demographic bucket based on a demographic distribution associated with the second set of data.

10. The apparatus as defined in claim 9, wherein the independent binary model is a machine learning algorithm generated based on at least one of a household size, an age, a gender, a person status, an income, an education, or an ethnicity.

11. The apparatus as defined in claim 10, wherein the machine learning algorithm is at least one of a classification and regression tree, a log it function, a conditional inference tree, a random forest, a neural network, or a bootstrap aggregate decision tree.

12. The apparatus as defined in claim 8, wherein the first set of impression data from the first data source has a fourth set of data missing from the first set of impression data, further including a demographic predictor to linearly scale the first set of impression data to accommodate for the missing fourth set of data.

13. An apparatus comprising:
a demographic corrector to:
identify a first set of impression data received from a computer at a first data source, the first set of impression data different from a second set of data from a second data source, the computer producing a misattribution error in the first set of impression data, the misattribution error based on a demographic data error in the first set of impression data, the demographic data error based on a difference between reported demographic data in the first set of impression data and actual demographic data corresponding to the first set of impression data;
generate a third set of data based on the second set of data from the second data source;
generate a model based on a difference between the first set of impression data and the third set of data; and
correct the demographic data error in the first set of impression data by applying the model to the first set of impression data to generate corrected demographic data; and
a viewership assigner to correct the misattribution error produced by the computer by assigning viewership to an impression associated with the first set of impression data using the corrected demographic data, the viewership assigner is to assign viewership to the impression by:
identifying viewing history associated with the second set of data;
determining a first time associated with a first demographic viewing a media presentation in a first household associated with the second set of data;
determining a second time associated with the first demographic and a second demographic viewing the media presentation in the household;
determining a first probability that the first demographic viewed the media presentation by dividing the first time by the second time;
identifying a first person in the first household associated with the second set of data having a second probability similar to the first probability; and
imputing a viewing history of the first person to a second person in a second household associated with the first set of impression data, at least one of the demographic corrector or the viewership assigner is a logic circuit.

14. The apparatus as defined in claim 13, wherein to identify the first person in the first household associated with the second set of data having the second probability similar to the first probability, the viewership assigner is to:

identify a third person in the first household associated with the second set of data;
rank the first and third person based on a first highest probability;
identify a fourth person in the second household associated with the first set of impression data;
rank the second and fourth person based on a second highest probability; and
identify the first person has the second probability similar to the first probability when the first person has the first highest probability and the second person has the second highest probability.

15. A tangible computer readable storage medium comprising instructions that, when executed, cause a machine to at least:
identify a first set of impression data received from a computer at a first data source, the first set of impression data having matched demographic data from users registered with both an over-the-top (OTT) device and a database proprietor, the first set of impression data different from a second set of data from a second data source, the computer producing a misattribution error in the first set of impression data, the misattribution error based on a demographic data error in the first set of impression data, the demographic data error based on a difference between reported demographic data in the first set of impression data and actual demographic data corresponding to the first set of impression data;
generate a third set of data based on the second set of data from the second data source;
generate an independent binary model based on a difference between the first set of impression data and the third set of data;
correct the demographic data error in the first set of impression data by applying the independent binary model to the first set of impression data to generate corrected demographic data; and
correct the misattribution error produced by the computer by assigning viewership to an impression associated with the first set of impression data using the corrected demographic data.

16. The tangible computer readable storage medium as defined in claim 15, wherein the instructions, when executed, further cause the machine to: identify a demographic bucket; determine whether the demographic bucket exists in a household based on the independent binary model; and determine the number of members in the household associated with the demographic bucket based on a demographic distribution associated with the second set of data.

17. The tangible computer readable storage medium as defined in claim 16, wherein the independent binary model is a machine learning algorithm generated based on at least one of a household size, an age, a gender, a person status, an income, an education, or an ethnicity.

18. The tangible computer readable storage medium as defined in claim 15, wherein the first set of impression data from the first data source has a fourth set of data missing from the first set of impression data, the instructions, when executed, to further cause the machine to linearly scale the first set of impression data to accommodate for the missing fourth set of data.

19. A tangible computer readable storage medium comprising instructions that, when executed, cause a machine to at least:
identify a first set of impression data received from a computer at a first data source, the first set of impression data different from a second set of data from a second data source, the computer producing a misattribution error in the first set of impression data, the misattribution error based on a demographic data error in the first set of impression data, the demographic data error based on a difference between reported demographic data in the first set of impression data and actual demographic data corresponding to the first set of impression data;

generate a third set of data based on the second set of data from the second data source;

generate an independent binary model based on a difference between the first set of impression data and the third set of data;

correct the demographic data error in the first set of impression data by applying the independent binary model to the first set of impression data to generate corrected demographic data;

correct the misattribution error produced by the computer by assigning viewership to an impression associated with the first set of impression data using the corrected demographic data;

identify viewing history associated with the second set of data;

determine a first time associated with a first demographic viewing a media presentation in a first household associated with the second set of data;

determine a second time associated with the first demographic and a second demographic viewing the media presentation in the household;

determine a first probability that the first demographic viewed the media presentation by dividing the first time by the second time;

identify a first person in the first household associated with the second set of data having a second probability similar to the first probability; and impute a viewing history of the first person to a second person in a second household associated with the first set of impression data.

20. The tangible computer readable storage medium as defined in claim 19, wherein the instructions, when executed, further cause the machine to: identify a third person in the first household associated with the second set of data;

rank the first and third person based on a first highest probability; identify a fourth person in the second household associated with the first set of impression data; rank the second and fourth person based on a second highest probability; and identify the first person has the second probability similar to the first probability when the first person has the first highest probability and the second person has the second highest probability.

* * * * *

UNITED STATES PATENT AND TRADEMARK OFFICE
CERTIFICATE OF CORRECTION

PATENT NO.        : 10,045,082 B2
APPLICATION NO.   : 14/967355
DATED             : August 7, 2018
INVENTOR(S)       : Kumar Nagaraja Rao Page 1 of 1

It is certified that error appears in the above-identified patent and that said Letters Patent is hereby corrected as shown below:

Column 55, Line 26 Claim 4 delete "log it" and add -- logit --.

Column 57, Line 8 Claim 11 delete "log it" and add -- logit --.

Signed and Sealed this
Ninth Day of April, 2019

Andrei Iancu
*Director of the United States Patent and Trademark Office*